(12) United States Patent
Boduch et al.

(10) Patent No.: US 10,135,560 B2
(45) Date of Patent: Nov. 20, 2018

(54) OPTICAL DEVICES FOR THE CONSTRUCTION OF COMPACT OPTICAL NODES

(71) Applicants: Mark E. Boduch, Geneva, IL (US); Kimon Papakos, Evanston, IL (US)

(72) Inventors: Mark E. Boduch, Geneva, IL (US); Kimon Papakos, Evanston, IL (US)

(*) Notice: Subject to any disclaimer, the term of this patent is extended or adjusted under 35 U.S.C. 154(b) by 0 days.

(21) Appl. No.: 15/497,380

(22) Filed: Apr. 26, 2017

(65) Prior Publication Data
US 2017/0302397 A1 Oct. 19, 2017

Related U.S. Application Data

(63) Continuation-in-part of application No. 15/160,171, filed on May 20, 2016, now Pat. No. 9,667,374, which is a continuation of application No. 15/004,139, filed on Jan. 22, 2016, now Pat. No. 9,374,186, which is a continuation of application No. 14/639,208, filed on Mar. 5, 2015, now Pat. No. 9,276,695, which is a continuation of application No. 13/924,542, filed on Jun. 22, 2013, now Pat. No. 9,008,514.

(51) Int. Cl.
| | |
|---|---|
| *H04J 14/00* | (2006.01) |
| *H04J 14/02* | (2006.01) |
| *H04B 10/079* | (2013.01) |
| *H04Q 11/00* | (2006.01) |

(52) U.S. Cl.
CPC .... *H04J 14/0221* (2013.01); *H04B 10/07957* (2013.01); *H04J 14/021* (2013.01); *H04J 14/0217* (2013.01); *H04J 14/0212* (2013.01); *H04Q 11/0005* (2013.01); *H04Q 2011/0016* (2013.01)

(58) Field of Classification Search
CPC ...... H04J 14/02; H04J 14/0212; H04J 14/021; H04J 14/0215; H04J 14/0216; H04J 14/0217; H04J 14/0221; H04J 14/0202; H04J 14/0204; H04Q 11/0005; H04Q 11/0066; H04Q 11/0067
USPC ........ 398/79, 45, 48, 49, 83, 82, 50, 56, 59, 398/84, 85, 87; 385/24, 37, 16, 17, 18
See application file for complete search history.

(56) References Cited

U.S. PATENT DOCUMENTS

| | | | |
|---|---|---|---|
| 7,274,873 B2* | 9/2007 | Bortz | H04J 14/02 398/45 |
| 7,310,461 B2* | 12/2007 | Maigne | H04Q 11/0005 385/16 |
| 7,630,634 B1 | 12/2009 | Boduch | |
| 8,165,468 B2 | 4/2012 | Boduch et al. | |
| 8,190,027 B2 | 5/2012 | Boduch et al. | |
| 8,320,759 B2 | 11/2012 | Boduch | |
| 8,401,348 B2 | 3/2013 | Boduch | |

(Continued)

OTHER PUBLICATIONS

Yasuki Sakurai et al., LCOS-based Gridless Wavelength Blocker Array for Broadband Signals at 100Gbps and Beyond. Published in: Optical Fiber Communication Conference and Exposition (OFC/NFOEC), 2012 and the National Fiber Optic Engineers Conference.

(Continued)

*Primary Examiner* — Hanh Phan

(57) ABSTRACT

Example embodiments of the present invention relate to optical wavelength directing devices used to construct compact optical nodes.

22 Claims, 48 Drawing Sheets

(56) References Cited

U.S. PATENT DOCUMENTS

| | | |
|---|---|---|
| 8,428,461 B2 | 4/2013 | Boduch et al. |
| 8,447,183 B2 | 5/2013 | Boduch et al. |
| 2003/0133641 A1* | 7/2003 | Yoo ................... B82Y 20/00 385/14 |
| 2010/0092172 A1* | 4/2010 | Chung ............... H04J 14/0204 398/50 |
| 2012/0106970 A1 | 5/2012 | Boduch et al. |
| 2013/0051726 A1 | 2/2013 | Wagener et al. |
| 2015/0086203 A1 | 3/2015 | Boduch et al. |
| 2017/0078042 A1 | 3/2017 | Boduch et al. |

OTHER PUBLICATIONS

Yasuki Sakurai et al., LCOS-Based Wavelength Blocker Array With Channel-by-Channel Variable Center Wavelength and Bandwidth. Published in: IEEE Photon. Technol. Let. 23 (2011), pp. 989-991.
Bergman et al., Photonic Network-on-Chip Design. Springer Science+Business Media New York 2014. ISBN 978-1-4419-9334-2.

* cited by examiner

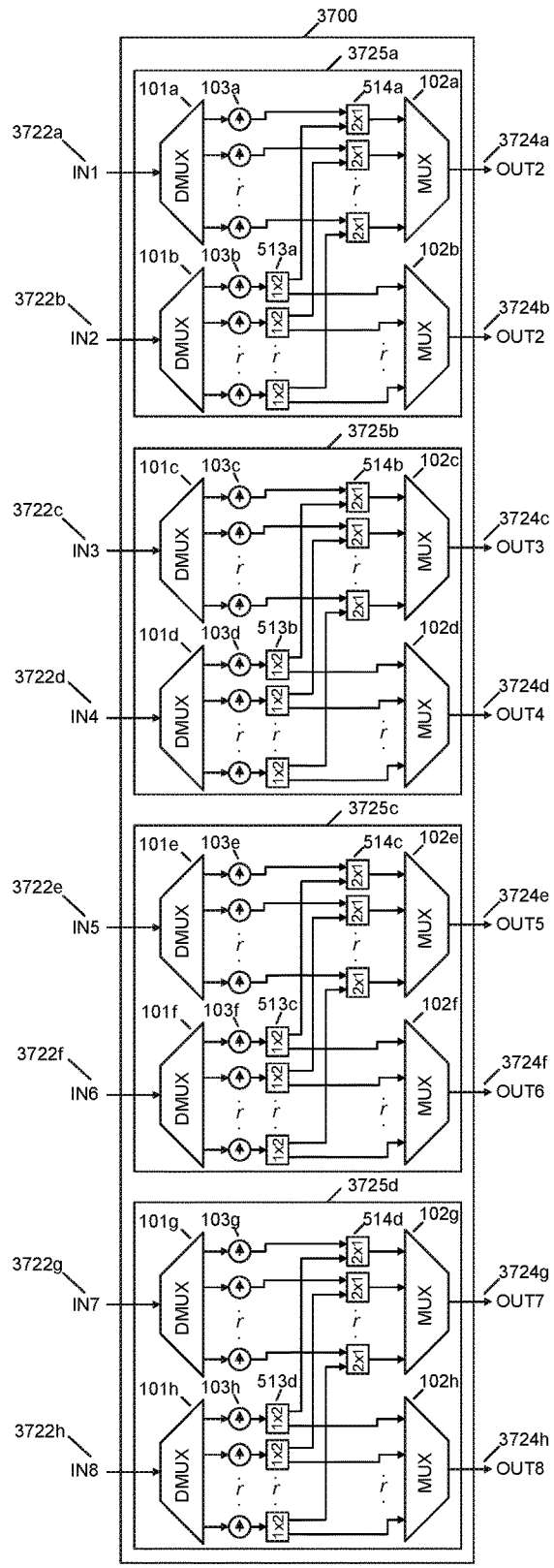
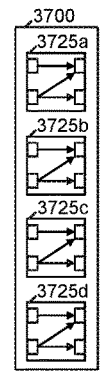
FIG. 37B
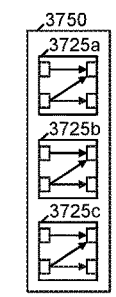
FIG. 37C
FIG. 37A

OPTICAL DEVICES FOR THE CONSTRUCTION OF COMPACT OPTICAL NODES

RELATED APPLICATION

This application is a continuation-in-part of U.S. application Ser. No. 15/160,171 filed May 20, 2016, which is a continuation of U.S. application Ser. No. 15/004,139 filed Jan. 22, 2016, now U.S. Pat. No. 9,374,186, which is a continuation of U.S. application Ser. No. 14/639,208, filed Mar. 5, 2015, now U.S. Pat. No. 9,276,695, which is a continuation of U.S. application Ser. No. 13/924,542, filed Jun. 22, 2013, now U.S. Pat. No. 9,008,514.

BACKGROUND

As the bandwidth needs of end customers increases, larger amounts of optical bandwidth will need to be manipulated closer to the end customers. A new breed of optical processing equipment will be needed to provide high levels of optical bandwidth manipulation at the lower cost points demanded at the networks closest to the end customers. This new breed of optical processing equipment will require new levels of optical signal processing integration.

SUMMARY

A method and corresponding apparatus in an example embodiment of the present invention relates to providing a means of manipulating optical signals at the lowest possible cost points. The example embodiment includes a compact light processing apparatus—utilizing wavelength equalizing arrays—whose level of equipment redundancy matches the economics associated with the location of the apparatus within provider networks.

According to an embodiment of the present invention, there is provided an optical node comprising of at least two optical degrees, a plurality of directionless add/drop ports, and at least one wavelength equalizing array; wherein the at least one wavelength equalizing array is used to both select wavelengths for each optical degree and to perform directionless steering for the plurality of directionless add/drop ports. According to another embodiment of the invention, an apparatus referred to as a ROADM circuit pack is described. The ROADM circuit pack is comprised of a least two optical degrees and a port common to the at least two optical degrees, wherein the common port is connectable to a plurality of directionless add/drop ports, and wherein wavelengths from the common port may be directed to any of the at least two degrees residing on the circuit pack. The ROADM circuit pack may additionally comprise of at least one wavelength equalizing array, wherein the at least one wavelength equalizing array is used to both select wavelengths for each degree, and to perform directionless steering of wavelengths to and from the plurality of directionless add/drop ports. The at least one equalizing array may further be utilized to aid in providing additional functionality to the ROADM circuit pack, including, but not limited to, a channel monitoring function and the functionality of at least one embedded transponder.

The invention also provides a method for constructing an optical node utilizing a wavelength equalizing array. The method comprises of allocating a first set of wavelength equalizers for selection of a first set of wavelengths for transmission from a first optical degree, and allocating at least a second set of wavelength equalizers for selection of at least a second set of wavelengths for transmission from at least a second optical degree; wherein the number of optical degrees comprising the node is used to determine the number of wavelength equalizers assigned to each set. The method further includes allocating an additional set of wavelength equalizers for selection of an additional set of wavelengths for transmission from a common port connectable to a plurality of directionless add/drop ports. The method may additionally include allocating wavelength equalizers for a channel monitoring function and for an embedded transponder function.

The present invention provides various advantages over conventional methods and apparatus for construction of optical nodes. The advantages arise from the use of a single wavelength equalizing array that allows for the construction of highly integrated optical nodes.

BRIEF DESCRIPTION OF THE DRAWINGS

The foregoing will be apparent from the following more particular description of example embodiments of the invention, as illustrated in the accompanying drawings in which like reference characters refer to the same parts throughout the different views.

The drawings are not necessarily to scale, emphasis instead being placed upon illustrating embodiments of the present invention.

FIG. 37A is an illustration of a wavelength equalizing array containing eight wavelength equalizers that can be configured to be any combination of 1 by 1 wavelength selective switches or 2 by 1 wavelength selective switches or 1 by 2 wavelength selective switches.

FIG. 37B is a simplified schematic diagram of the wavelength equalizing array of FIG. 37A.

FIG. 37C is a simplified schematic diagram of a wavelength equalizing array like that of FIG. 37A, except it only contains six wavelength equalizers.

DETAILED DESCRIPTION

A description of example embodiments of the invention follows.

Figure 1:
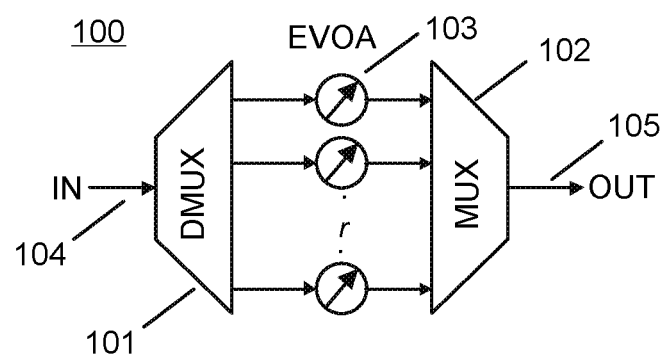
FIG. 1 is an illustration of a wavelength equalizer, also often referred to as a wavelength blocker.

FIG. 1 is an illustration of a wavelength equalizer 100 comprising of; a wavelength de-multiplexer (DMUX) 101 that is used to separate a composite Wavelength Division Multiplexed (WDM) signal arriving at input 104 into r number of individual wavelengths, a plurality of Electrical Variable Optical Attenuators (EVOAs) 103 used to partially or fully attenuate the individual wavelengths, and a wavelength multiplexer (MUX) 102 that is used to combine r number of individual wavelengths into a composite Wavelength Division Multiplexed (WDM) signal for transmission at output 105. In addition to its optical elements (MUX, DMUX, and EVOAs), the wavelength equalizer 100 contains electronic circuitry (not shown) used to control the EVOAs, and a user interface (not shown) that is used to program the electronic circuitry of the EVOAs. The optical processing of each individual wavelength may be independently controlled. The optical power level of each individual wavelength may be attenuated by a programmable amount by sending a command through the user interface. The command is used by the electronic circuitry to set the attenuation value of the appropriate EVOA. Additionally, each individual EVOA can be program to substantially block the light associated with an incoming optical wavelength. Controlled attenuation ranges for typical EVOAs are 0 to 15 dB, or 0 to 25 dB. Blocking attenuation is typically 35 dB or 40 dB.

The device 100 is referred to as a wavelength equalizer because the EVOAs 103 can be used to equalize the power levels of all the wavelengths inputted into the device. Therefore, if wavelengths with unequal power levels are applied to input 104, the EVOAs can be configured so that the wavelengths exiting at 105 have substantially the same optical power level with respect to one another. The device 100 is also often referred to as a wavelength blocker, or as a one-by-one wavelength selective switch.

Figure 2:
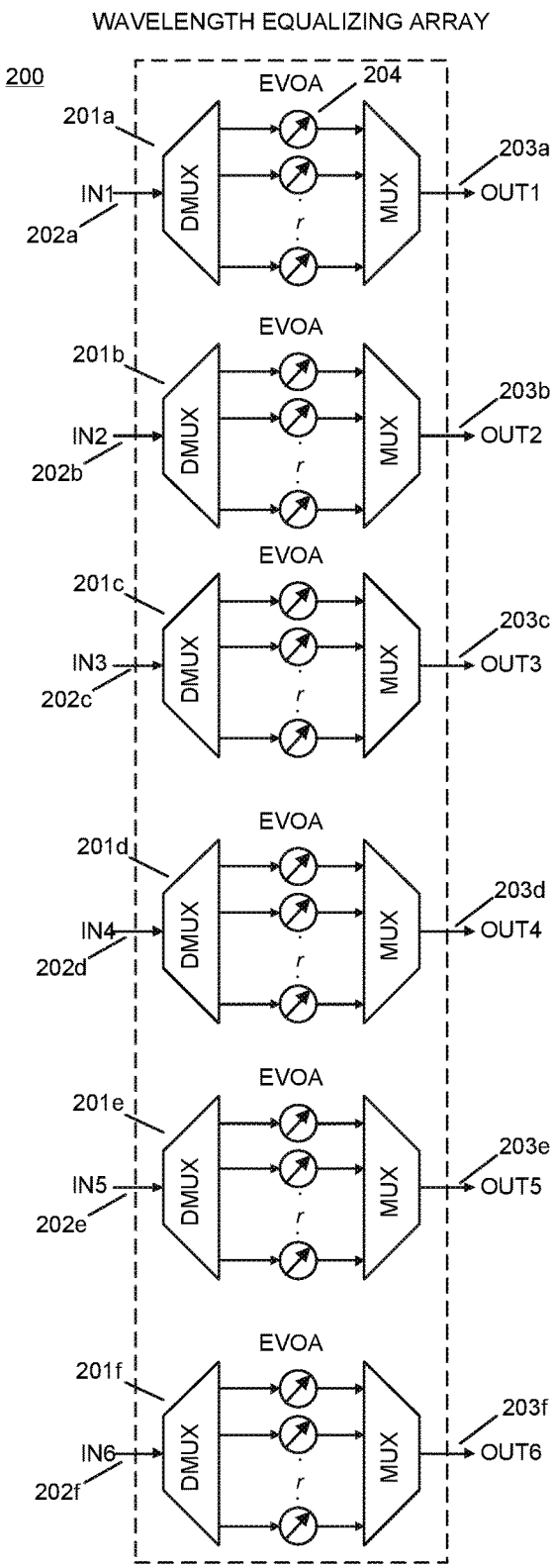
FIG. 2 is an illustration of a wavelength equalizing array containing six wavelength equalizers.

FIG. 2 is an illustration of a wavelength equalizing array 200 contained within a single device. The wavelength equalizing array 200 contains six wavelength equalizers 201a-f that may be of the type 100 illustrated in FIG. 1. The wavelength equalizing array 200 contains six optical inputs (IN1-IN6) 202a-f that are attached to the inputs of the wavelength equalizers, and six optical outputs (OUT1-OUT6) 203a-f that are attached to the outputs of the wavelength equalizers. The electronic circuitry (not shown) used to control the EVOAs 204 may reside within the wavelength equalizing array device, or may reside external to the wavelength equalizing array device.

Figure 3:
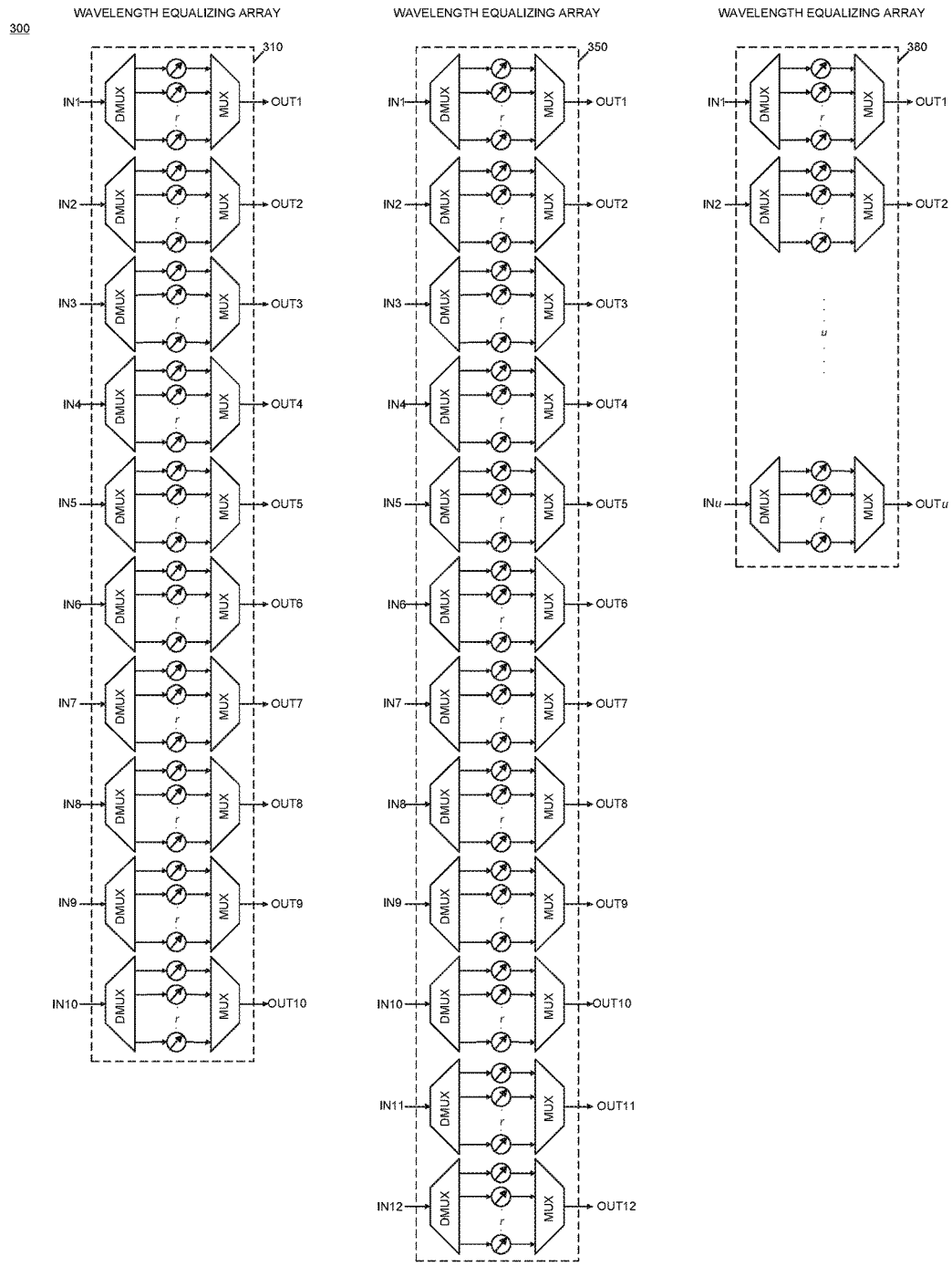
FIG. 3 is an illustration of three wavelength equalizing arrays; one containing ten wavelength equalizers, one containing twelve wavelength equalizers, and one containing u wavelength equalizers.

FIG. 3 (300) is an illustration of three different wavelength equalizing arrays 310 350, and 380. Each array may be contained within a single device. Wavelength equalizing array 310 contains ten wavelength equalizers that may be of the type 100 illustrated in FIG. 1. Wavelength equalizing array 350 contains twelve wavelength equalizers that may be of the type 100 illustrated in FIG. 1. Wavelength equalizing array 380 contains u wavelength equalizers that may be of the type 100 illustrated in FIG. 1 (wherein u can be any integer value). Although wavelength equalizing arrays 200, 310, 350 and 380 illustrate arrays with six, ten, twelve and u wavelength equalizers respectively, in general there is no limit to the number of wavelength equalizers that can be placed within a single device. Therefore, arrays with sixteen, twenty-four, or thirty-two wavelength equalizers may be possible.

Multiple different technologies may be used to implement the wavelength equalizing arrays 200, 310, 350 and 380, including Planer Lightwave Circuit (PLC) technology and various free-space optical technologies such as Liquid Crystal on Silicon (LCoS). A single Liquid Crystal on Silicon substrate may be used to implement a wavelength equalizing array containing any number of wavelength equalizers. The Wavelength Processing Array (WPA-12) from Santec Corporation is an example of a commercially available wavelength equalizing array containing twelve wavelength equalizers. The wavelength equalizing arrays 200, 310, 350 and 380 may be implemented by placing PLC based EVOAs and multiplexers (Arrayed Waveguide Gratings (AWG)) on a single substrate.

Figure 4:
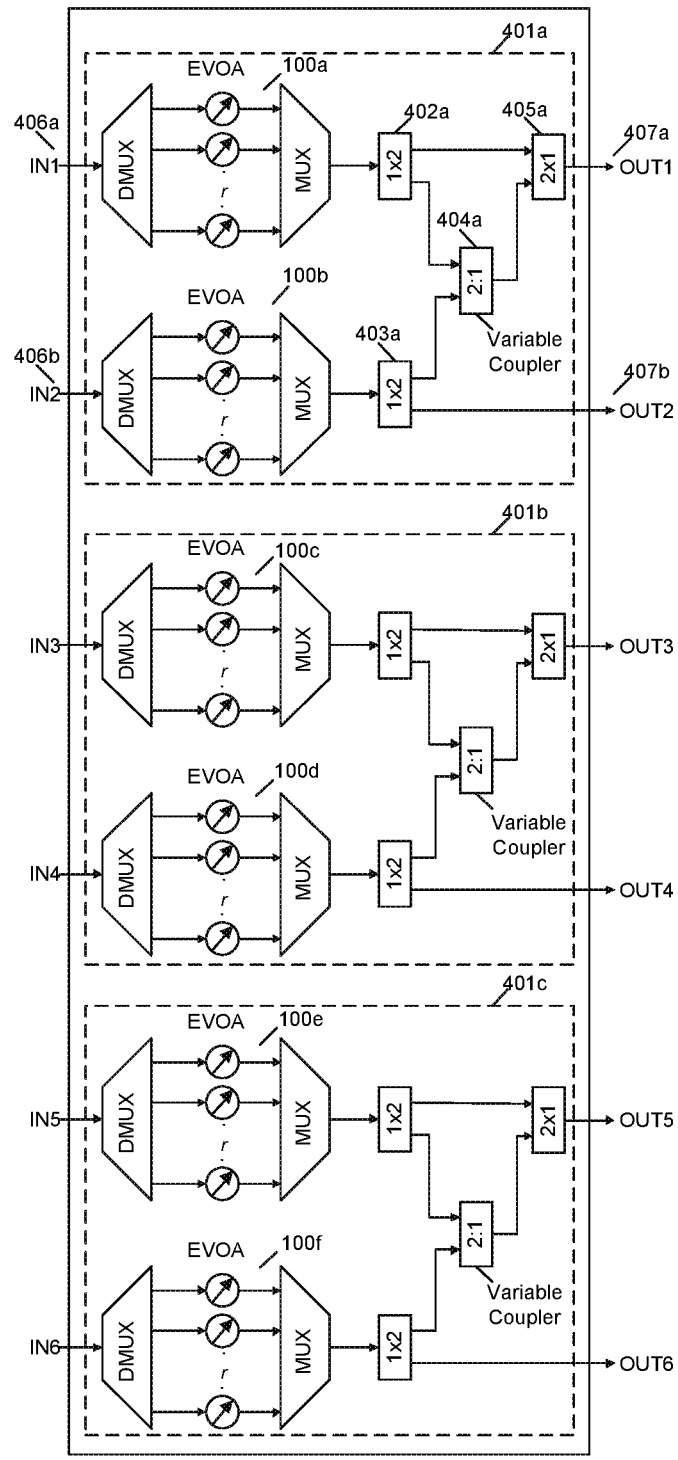
FIG. 4 is an illustration of a first embodiment of a wavelength equalizing array containing six wavelength equalizers that can be configured to be any combination of 1 by 1 wavelength selective switches or 2 by 1 wavelength selective switches.

PLC based technologies and free-space optical technologies also provide the means to augment the wavelength equalizing arrays with additional components in order to realize additional functionality. An example of this is illustrated in FIG. 4. FIG. 4 illustrates a wavelength equalizing array 400 that contains six wavelength equalizers 100a-f augmented with some additional optical components comprising of 1×2 optical switches, 2×1 optical switches, and variable optical couplers. The additional components provide the ability for two wavelength equalizers to perform either a 2 by 1 or 1 by 2 wavelength selective switch (WSS) function. A 1 by p wavelength selective switch is defined to be an optical device—with one WDM input port and p WDM output ports—that can be configured to direct individual wavelengths arriving on its input port to any of its p output ports. Similarly, a p by 1 wavelength selective switch is defined to be an optical device—with one WDM output port and p WDM input ports—that can be configured to direct individual wavelengths arriving on any of its input ports to its single output port.

In FIG. 4 three 2 by 1 WSS functions are implemented 401a-c. For 2 by 1 WSS 401a, the variable coupler 404a is used to combine the wavelengths from wavelength equalizers 100a and 100b. For this case, 1 by 2 optical switches 402a and 403a are both configured to forward their incoming wavelengths to variable coupler 404a, and variable coupler 404a is configured as a 50/50 optical coupler (i.e., a coupler that forwards an equal amount of light from each of its two inputs). If wavelength number 1 (with frequency 1) is routed from IN1 406a to OUT1 407a, then wavelength number 1 (with frequency 1) arriving at IN2 406b must be blocked by wavelength equalizer 100b so as not to cause contention with the wavelength number 1 exiting wavelength equalizer 100a. By appropriately blocking and passing wavelengths through 100a and 100b, up to r number of wavelengths may exit through port OUT1 407a.

The variable coupler 404a provides the ability to forward unequal amounts of light from wavelength equalizers 100a and 100b to output port OUT1. This may be a useful feature when, for example, the wavelengths arriving at input port IN1 406a all have substantially lower optical power levels than the wavelengths arriving at input port IN2 406b. For this case, variable attenuator 404a may be programmed to allow more light from 100a and less light from 100b. Alternatively, the variable coupler 404a may be replaced with a fixed coupler that forwards an equal amount of light from each of its two inputs.

In FIG. 4, optical switches 402a, 403a, and 405a, provide the ability for the two wavelength equalizers 100a and 100b to be configured as either individual 1 by 1 WSS functions or a single 2 by 1 WSS function. When switches 402a and 403a are configured to switch their input light to coupler 404a, then the two wavelength equalizers 100a and 100b are configured as a single 2 by 1 WSS. When switches 402a and 403a are configured to switch their input light away from coupler 404a, then the two wavelength equalizers 100a and 100b are configured as individual 1 by 1 WSS functions. Switch 405a is used to switch the output port OUT1 407a between the two functionalities (i.e., either a single 2 by 1 WSS or a single 1 by 1 WSS function).

The optical circuitry within the optical block 401a is used to direct optical wavelengths from the inputs 406a-b of the optical block to the outputs 407a-b of the optical block. Therefore, the optical circuitry within the optical block 401a can be referred to as a wavelength directing function, or simply a wavelength director. The first optical input 406a is used to provide a first source of wavelengths to the wavelength directing function within 401a, and the second optical input 406b is used to provide a second source of wavelengths to the wavelength directing function within 401a. The first optical output 407a is used to output a first set of wavelengths from the wavelength directing function within 401a, and the second optical output 407b is used to output a second set of wavelengths from the wavelength directing function within 401a.

It may also be stated that the wavelength directing function 401a is operable to implement a first mode and a second mode. The wavelength directing function is placed in the first mode by configuring optical switch 402a to direct its input signal to optical switch 405a (and not to coupler 404a), and by configuring optical switch 405a to direct its input signal from switch 402a to the first optical output 407a, and by configuring optical switch 403a to direct its input signal to the second optical output 407b (and not to the coupler 404a). In this first mode of operation, the wavelength directing function operates as two independent 1 by 1 WSS functions. The first 1 by 1 WSS function comprises: wavelength equalizer 100a, optical input 406a, and optical output 407a. The first optical input 406a is used to provide a source of wavelengths to the wavelength equalizer 100a. The wavelength equalizer 100a is operable to pass and block individual wavelengths from the input 406a to the output 407a. A given wavelength at input 406a is blocked from appearing at output 407a by programming the EVOA associated with the given wavelength such that the EVOA substantially blocks the light associated with given wavelength. A given wavelength at input 406a is passed to output 407a by programming the EVOA associated with the given wavelength to not attenuate the given wavelength, or by programming the EVOA associated with the given wavelength to only partially attenuate the give wavelength. The second 1 by 1 WSS function comprises: wavelength equalizer 100b optical input 406b, and optical output 407b. The second optical input 406b is used to provide a source of wavelengths to the wavelength equalizer 100b. The wavelength equalizer 100b is operable to pass and block individual wavelengths from the input 406b to the output 407b. A given wavelength at input 406b is blocked from appearing at output 407b by programming the EVOA associated with the given wavelength such that the EVOA substantially blocks the light associated with the given wavelength. A given wavelength at input 406b is passed to output 407b by programming the EVOA associated with the given wavelength to not attenuate the given wavelength, or by programming the EVOA associated with the given wavelength to only partially attenuate the give wavelength. Each individual wavelength present at input 406a may be individually and independently programmed to be either passed to the output 407a or blocked from appearing at the output 407a, as each of the r number of EVOAs (one for each of the r possible number of wavelengths present at input 406a) is able to be independently programmed with no regard to how any of the other EVOAs within 100a are programmed. Similarly, each individual wavelength present at input 406b may be individually and independently programmed to be either passed to the output 407b or blocked from appearing at the output 407b.

When in the first mode, the wavelength directing function is not operable to pass and block individual wavelengths from the first optical input 406a to the second optical output 407b. This is because there no optical path exists between input 406a and 407b within 401a. When in the first mode, the wavelength directing function is not operable to pass and block individual wavelengths from the second optical input 406b to the first optical output 407a. This is because optical switch 403a is set to direct all wavelengths exiting wavelength equalizer 100b to optical output 407b.

The wavelength directing function of 401a is placed in the second mode by configuring optical switch 402a to direct its input signal to coupler 404a (and not to optical switch 405a), and by configuring optical switch 405a to direct its input signal from coupler 404a to the first optical output 407a, and by configuring optical switch 403a to direct its input signal to the coupler 404a (and not to the second optical output 407b). In this second mode of operation, the wavelength directing function operates as a 2 by 1 WSS function. The 2 by 1 WSS function comprises: wavelength equalizer 100a, wavelength equalizer 100b, optical coupler 404a, optical input 406a, optical input 406b, and optical output 407a. The first optical input 406a is used to provide a first source of wavelengths to the 2 by 1 WSS function, and the second optical input is used to provide a second source of wavelengths to the 2 by 1 WSS function. The coupler 404a is used to combine the wavelengths programmed to pass through wavelength equalizer 100a with wavelengths programmed to pass through wavelength equalizer 100b. Therefore, it can be stated that the wavelength equalizer 100a is operable to pass and block individual wavelengths from the input 406a to the output 407a, and wavelength equalizer 100b is operable to pass and block individual wavelengths from the input 406b to the output 407a, or more generally, when in the second mode, the wavelength directing function within 401a is operable to pass and block wavelengths from the first optical input 406a to the first optical output 407a, and the wavelength directing function within 401a is operable to pass and block wavelengths from the second optical input 406b to the first optical output 407a. Since there is no optical path from the first optical input 406a to the second optical output 407b, when in the second mode, the wavelength directing function is not operable to pass and block individual wavelengths from the first optical input 406a to the second optical output 407b. Also, since when in the second mode optical switch 403a directs all wavelengths exiting wavelength equalizer 100b to the optical coupler 404a (and not to the output 407b), when in the second mode, the wavelength directing function within 401a is not operable to pass and block individual wavelengths from the second optical input 406b to the second optical output 407b.

The operation of optical switches 402a, 403a, and 405a may be controlled using electrical signals. In one embodiment, a first electrical signal controls the state of optical switch 402a. When the first electrical signal is set to a first state, the optical switch 402a directs its input signal (including all wavelengths) to its output signal connected to optical switch 405a. When the first electrical signal is set to a second state, the optical switch 402a directs its input signal (including all wavelengths) to its output signal connected to optical coupler 404a. In a similar manner, the state of optical switch 403a may be controlled by a second electrical signal, and the state of optical switch 405a may be controlled by a third electrical signal. The second electrical signal will have a first state (that connects the output of wavelength equalizer 100b to the optical output 407b), and a second state (that connects the output of wavelength equalizer 100b to the coupler 404a). Similarly, the third electrical signal will have a first state (that connects the output of optical switch 402a to optical output 407a) and a second state (that connects the output of optical coupler 404a to the optical output 407a). Since the first electrical signal, the second electrical signal, and the third electrical signal each have two states, the state of each of the three electrical signals may be controlled via a bit within a software register (one bit for each electrical signal, for a total of three bits). When software is used to program a given electrical signal to its first state, a logic zero may be written to the bit within the register associated with the given electrical signal. Similarly, when software is used to program a given electrical signal to its second state, a logic one may be written to the bit within the register associated with the given electrical signal. Therefore, in this manner the first mode and the second mode are software programmable. In order to program the wavelength directing function to the first mode, a logic zero is written to the three register bits associated with the first, second, and third electrical signals, and in order to program the wavelength directing function to the second mode, a logic one is written to the three register bits associated with the first, second, and third electrical signals. Since all three bits are always written with the same value (either three zeros or three ones), a single register bit may be used to control the mode of the wavelength directing function of 401a. This is done by electrically connecting together the first electrical signal, the second electrical signal, and the third electrical signal, and then by driving this combination of signals using a signal register bit.

If coupler 404a is a fixed coupler, no software control is required for it. If coupler 404a is a variable optical coupler, then its coupling ratio may be controlled by an analog voltage signal that varies the coupling ratio based upon changing the amplitude of the analog voltage signal. A digital-to-analog converter may be used to control the analog voltage applied to the variable optical coupler. This would allow software to write a digital value to the digital-to-analog converter in order to set the coupling ratio of the variable optical coupler.

As illustrated in FIG. 4, wavelength equalizing array 400 comprises of three independently controlled wavelength directing functions 401a-c. The second wavelength directing function within 401b is operable to implement a third mode and a fourth mode (which are independent of the first and second mode of the first wavelength directing function of 401a). A third optical input (IN3) to the wavelength equalizing array 400 is used to provide a first source of wavelengths to the second wavelength directing function 401b, and a fourth optical input (IN4) to the wavelength equalizing array 400 is used to provide a second source of wavelengths to the second wavelength directing function 401b. A third optical output from the wavelength equalizing array 400 (OUT3) is used to output a first set of wavelengths from the second wavelength directing function, and a fourth optical output from the wavelength equalizing array 400 (OUT4) is used to output a second set of wavelengths from the second wavelength directing function. The three optical switches within 401b operate in an identical manner as the three switches within 401a, and therefore may be used to place the second wavelength directing function in the third mode and the fourth mode. When programmed to be in the third mode, the second wavelength directing function operates as two independent 1 by 1 WSS functions, in a manner identical to the first mode of the first wavelength directing function 401a. When programmed to be in the fourth mode, the second wavelength directing function operates as a 2 by 1 WSS function, in a manner identical to the second mode of the first wavelength directing function 401a. Therefore, when in the third mode, the second wavelength directing function 401b is operable to pass and block individual wavelengths from the third optical input (IN3) to the third optical output (OUT3) and from the fourth optical input (IN4) to the fourth optical output (OUT4), and the second wavelength directing function is not operable to pass and block individual wavelengths from the third optical input (IN3) to the fourth optical output (OUT4) and from the fourth optical input (IN4) to the third optical output (OUT4), and wherein when in the fourth mode, the second wavelength directing function 401b is operable to pass and block individual wavelengths from the third optical input (IN3) to the third optical output (OUT3) and from the fourth optical input (IN4) to the third optical output (OUT3), and the second wavelength directing function 401b is not operable to pass and block individual wavelengths from the third optical input (IN3) to the fourth optical output (OUT4). Additionally, when in the fourth mode, the second wavelength directing function 401b is not operable to pass and block individual wavelengths from the fourth optical input (IN4) to the fourth optical output (OUT4).

If the electrical signal(s) that control the optical switches of the second wavelength directing function are separate and independent from the electrical signal(s) that control the optical switches of the first wavelength directing function, then the third mode and the fourth mode are independent of the first mode and the second mode, and the first mode and the second mode are independent of the third mode and the fourth mode.

The third wavelength directing function within 401c is operable to implement a fifth mode and a sixth mode (which are independent of the first and second mode of the first wavelength directing function of 401a, and also independent of the third and fourth mode of the second wavelength directing function of 401b). A fifth optical input (IN5) to the wavelength equalizing array 400 is used to provide a first source of wavelengths to the third wavelength directing function 401c, and a sixth optical input (IN6) to the wavelength equalizing array 400 is used to provide a second source of wavelengths to the third wavelength directing function 401c. A fifth optical output from the wavelength equalizing array 400 (OUT5) is used to output a first set of wavelengths from the third wavelength directing function, and a sixth optical output from the wavelength equalizing array 400 (OUT6) is used to output a second set of wavelengths from the third wavelength directing function. The three optical switches within 401c operate in an identical manner as the three switches within 401a, and therefore may be used to place the second wavelength directing function in the fifth mode and the sixth mode. When programmed to be in the fifth mode, the third wavelength directing function operates as two independent 1 by 1 WSS functions, in a manner identical to the first mode of the first wavelength directing function 401a. When programmed to be in the sixth mode, the third wavelength directing function operates as a 2 by 1 WSS function, in a manner identical to the second mode of the first wavelength directing function 401a. Therefore, when in the fifth mode, the third wavelength directing function 401c is operable to pass and block individual wavelengths from the fifth optical input (IN5) to the fifth optical output (OUT5) and from the sixth optical input (IN6) to the sixth optical output (OUT6), and the third wavelength directing function is not operable to pass and block individual wavelengths from the fifth optical input (IN5) to the sixth optical output (OUT6) and from the sixth optical input (IN6) to the fifth optical output (OUT5), and wherein when in the sixth mode, the third wavelength directing function 401c is operable to pass and block individual wavelengths from the fifth optical input (IN5) to the fifth optical output (OUT5) and from the sixth optical input (IN6) to the fifth optical output (OUT5), and the third wavelength directing function 401c is not operable to pass and block individual wavelengths from the fifth optical input (IN5) to the sixth optical output (OUT6). Additionally, when in the sixth mode, the third wavelength directing function 401c is not operable to pass and block individual wavelengths from the sixth optical input (IN6) to the sixth optical output (OUT6).

If the electrical signal(s) that control the optical switches of the third wavelength directing function are separate and independent from the electrical signal(s) that control the optical switches of the first wavelength directing function and the second wavelength directing function, then the fifth mode and the sixth mode are independent of the first mode, the second mode, the third mode, and the fourth mode, and also, the first mode and the second mode and the third mode and the fourth mode are independent of the fifth mode and the sixth mode.

Additionally, the optical device 400 may be described without the concept of modes of operation by simply noting the possible paths between optical inputs and optical outputs within the device. From FIG. 4, it can be noted that there is an optical path between input 406a and output 407a, and there is an optical path between input 406b and output 407a, and there is an optical path between input 406b and output 407b, but there is no optical path that exists between input 406a and output 407b. Therefore optical device 400 comprises, a wavelength directing function 401a, a first optical input 406a used to provide a first source of wavelengths to the wavelength directing function 401a, a second optical input 406b used to provide a second source of wavelengths to the wavelength directing function 401a, a first optical output 407a used to output a first set of wavelengths from the wavelength directing function 401a, and a second optical output 407b used to output a second set of wavelengths from the wavelength directing function 401a, wherein the wavelength directing function 401a is operable to pass and block individual wavelengths from the first optical input 406a to the first optical output 407a and from the second optical input 406b to the first optical output 407a and from the second optical input 406b to the second optical output 407b, and wherein the wavelength directing function 401a is not operable to pass and block individual wavelengths from the first optical input 406a to the second optical output 407b. The optical device 400 further comprises, a second wavelength directing function 401b, a third optical input (IN3) used to provide a first source of wavelengths to the second wavelength directing function 401b, a fourth optical input (IN4) used to provide a second source of wavelengths to the second wavelength directing function 401b, a third optical output (OUT3) used to output a first set of wavelengths from the second wavelength directing function 401b, and a fourth optical output (OUT4) used to output a second set of wavelengths from the second wavelength directing function 401b, wherein the second wavelength directing function 401b is operable to pass and block individual wavelengths from the third optical input (IN3) to the third optical output (OUT3) and from the fourth optical input (IN4) to the third optical output (OUT3) and from the fourth optical input (IN4) to the fourth optical output (OUT4), and wherein the second wavelength directing function 401b is not operable to pass and block individual wavelengths from the third optical input (IN3) to the fourth optical output (OUT4). The optical device 400 further comprises, a third wavelength directing function 401c, a fifth optical input (IN5) used to provide a first source of wavelengths to the third wavelength directing function 401c, a sixth optical input (IN6) used to provide a second source of wavelengths to the third wavelength directing function 401c, a fifth optical output (OUT5) used to output a first set of wavelengths from the third wavelength directing function 401c, and a sixth optical output (OUT6) used to output a second set of wavelengths from the third wavelength directing function 401c, wherein the third wavelength directing function 401c is operable to pass and block individual wavelengths from the fifth optical input (IN5) to the fifth optical output (OUT5) and from the sixth optical input (IN6) to the fifth optical output (OUT5) and from the sixth optical input (IN6) to the sixth optical output (OUT6), and wherein the third wavelength directing function 401c is not operable to pass and block individual wavelengths from the fifth optical input (IN5) to the sixth optical output (OUT6).

Note that it's possible to eliminate switches 402a and 405a when a variable coupler is used that can substantially direct to its output port all the light from one of its input ports. For this case, the output from 100a is directly routed to the upper input of variable coupler 404a, and the output of the optical coupler 404a is connected directly to 407a. Then when 401a is programmed to be two individual 1 by 1 WSS functions, variable coupler 404a is programmed to direct to its output all of the light from 100a and none of the light from switch 403a.

It can also be noted that each set of dual wavelength equalizers 401a-c can be used as 1 by 2 WSS functions by inputting signals to port OUT1 407a while outputting signals to ports IN1 406a and IN2 406b (i.e., operating the 2 by 1 WSS in the reverse direction).

It can also be noted that each set of dual wavelength equalizers 401a-c can be independently programmed to be either a single 2 by 1 WSS function or two individual 1 by 1 WSS functions. As an example, 401a may be programmed to be a 2 by 1 WSS function, while 401b and 401c may be programmed to be 1 by 1 WSS functions.

Although wavelength equalizing array 400 is shown as implemented with individual switches, multiplexers, and de-multiplexers, without departing from the spirit of the invention, the actual filtering and switching functions can be accomplished with other means, including using free-space optics wherein multiple switching and filtering functions are combined in order to accomplish the identical switching and filtering functionality.

Figure 5:
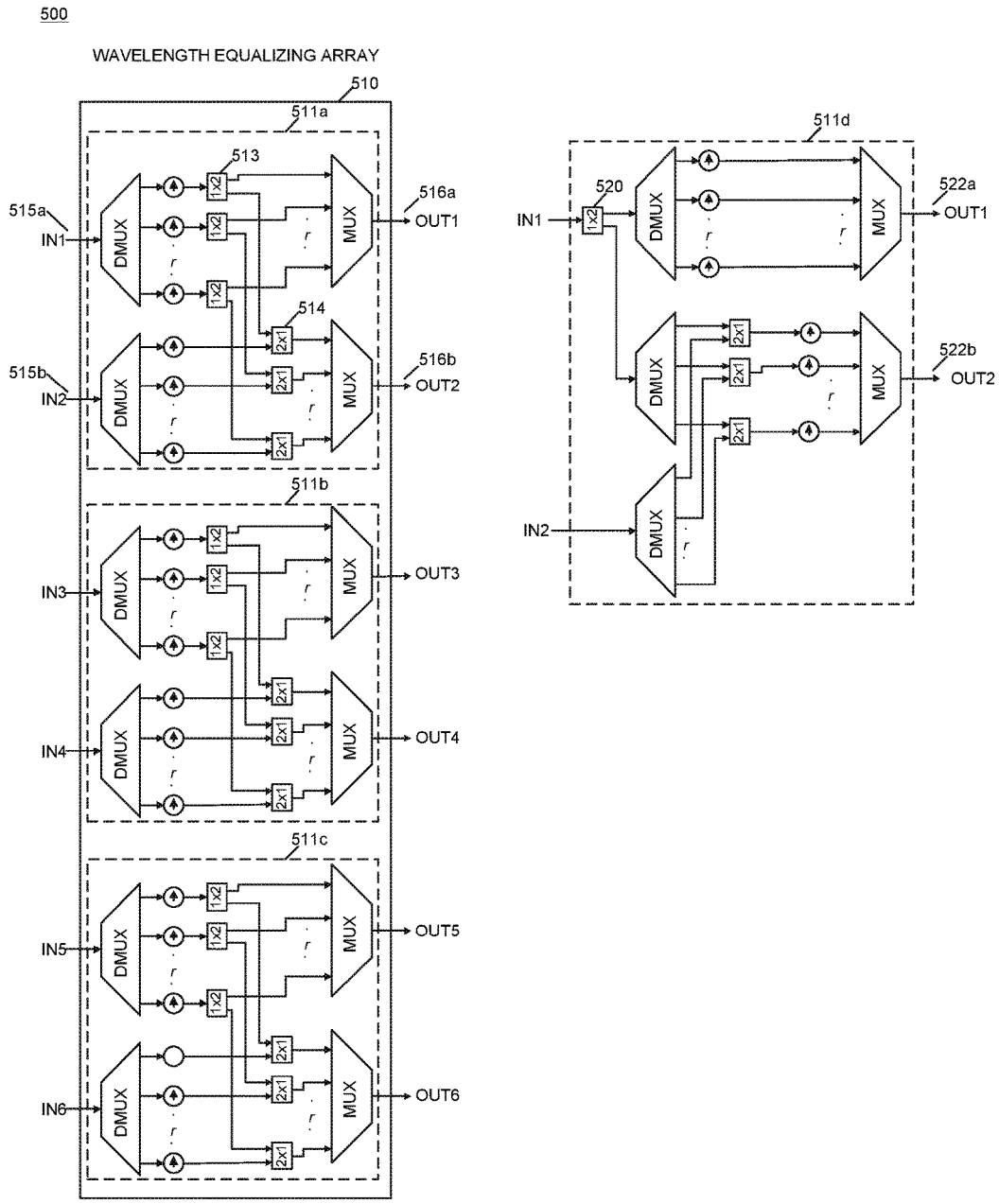
FIG. 5 is an illustration of a second embodiment of a wavelength equalizing array containing six wavelength equalizers that can be configured to be any combination of 1 by 1 wavelength selective switches or 2 by 1 wavelength selective switches.

FIG. 5 (500) illustrates an alternative method of implementing a six-input wavelength equalizing array 510 that can function as individual 1 by 1 WSS functions or 2 by 1 WSS functions or 1 by 2 WSS functions. The advantage of implementation 510 over implementation 400 is that the 2 by 1 WSS instances 511a-c in 510 have lower insertion losses than the 2 by 1 WSS instances 401a-c in 400. This is because implementation 510 eliminates the large insertion loss of the variable coupler 404a. However, in order to eliminate the coupler, additional complexity is added in the form of 2r number of optical switch functions (1×2 and 2×1) 513, 514.

In the 510 implementation, individual 1 by 1 WSS functions are obtained by programming the optical switches 513 such that all wavelengths entering a given input INx are forwarded to the corresponding output OUTx. For instance, all the wavelengths entering input 515a are forwarded to output 516a, and not to output 516b. When using dual wavelength equalizers to form a 2 by 1 WSS function (511a, for example), the optical switches 513 are programmed such that all wavelengths entering IN1 515a are forwarded to switches 514, and then switches 514 are used to route individual wavelengths to OUT2 516b from either wavelengths entering on port IN1 515a or port IN2 515b.

An alternative structure for the dual wavelength equalizers is 511d. In this structure r number of individual 1×2 switches are replaced with a single 1×2 broadband (waveguide) switch 520 at the expense of an extra DMUX.

The set of dual wavelength equalizers 511a-c can operate as either 2 by 1 WSS functions or 1 by 2 WSS functions. For example, when operating instance 511a as a 2 by 1 device, input ports IN1 515a and IN2 515b and output port OUT2 516b are used. Alternatively, when operating instance 511a as a 1 by 2 device, ports OUT1 516a, OUT2 516b and in IN1 515a are used.

The dual wavelength equalizer 511d can operate as a 1 by 2 WSS function by running the device backwards using OUT2 522b as the input (not 522a).

The optical circuitry within the optical block 511a is used to direct optical wavelengths from the inputs 515a-b of the optical block to the outputs 516a-b of the optical block. Therefore, the optical circuitry within the optical block 511a can be referred to as a wavelength directing function, or simply a wavelength director. The first optical input 515a is used to provide a first source of wavelengths to the wavelength directing function within 511a, and the second optical input 515b is used to provide a second source of wavelengths to the wavelength directing function within 511a. The first optical output 516a is used to output a first set of wavelengths from the wavelength directing function within 511a, and the second optical output 516b is used to output a second set of wavelengths from the wavelength directing function within 511a. In a first embodiment, each of the optical switches within the r number of optical switches of 513 may be programmed independent of one another. In second embodiment, each of the optical switches within the r number of optical switches of 513 may be programmed identically using a single control signal. Each of the optical switches within the r number of optical switches of 514 may be programmed independent of one another. In order to allow simultaneous selection of wavelengths from either IN1 or IN2 when operating 511a as a 2 by 1 WSS function, each of the optical switches within the r number of optical switches of 514 must be able to be programmed independent of one another.

Like that of optical block 401a, optical block 511a is operable to implement a first mode and a second mode. The wavelength directing function 511a is placed in the first mode by configuring all the optical switches of 513 to direct their input signals towards OUT1 (516a), and by configuring all the optical switches of 514 to connect the input signals from IN2 (515b) to output OUT2 (516b). When the switches 513 and 514 are set in this manner, the wavelength directing function of 511a operates as two independent 1 by 1 WSS functions, with the first 1 by 1 WSS function comprising IN1 (515a) and OUT1 (516a), and the second 1 by 1 WSS function comprising IN2 (515b) and OUT2 (516b). The wavelength directing function 511a is placed in the second mode by configuring all the optical switches of 513 to direct their input signals towards OUT2 (516b). When operating in the second mode, the wavelength directing function operates as a 2 by 1 WSS function, using inputs 515a and 515b and output 516b. When operating in the second mode, optical switches 514 must be free to be programmed to select wavelengths from either IN1 (515a) or IN2 (515b), therefore, each of the r 2×1 switches of 514 must have an independent control signal (for a total of r independent control signals). When in the first mode, the wavelength directing function 511a is operable to pass and block individual wavelengths from the first optical input 515a to the first optical output 516a and from the second optical input 515b to the second optical output 516b, and the wavelength directing function is not operable to pass and block individual wavelengths from the first optical input 515a to the second optical output 516b (due to the settings of switches 513 and 514) and from the second optical input 515b to the first optical output 516a (due to the settings of switches 513 and 514), and wherein when in the second mode, the wavelength directing function 511a is operable to pass and block individual wavelengths from the first optical input 515a to the second optical output 516b and from the second optical input 515b to the second optical output 516b, and the wavelength directing function is not operable to pass and block individual wavelengths from the first optical input 515a to the first optical output 516a (due to the setting of switches 513). Also, when in the second mode, the wavelength directing function 511a is not operable to direct wavelengths from the second optical input 515b to the first optical output 516a (since no path exists between optical input 515b and optical output 516a, regardless of optical switch settings).

In addition to operating in a first mode (two 1 by 1 WSS functions) and a second mode (one 2 by 1 WSS function), the wavelength directing function is operable to implement a third mode (one 1 by 2 WSS function). The wavelength directing function 511a is placed in the third mode by configuring all the optical switches of 514 to direct input signals from IN1 (515a) to OUT2 (516b). When operating in the third mode, the wavelength directing function operates as a 2 by 1 WSS function, using input 515a and outputs 516a and 516b. When operating in the third mode, optical switches 513 must be free to be programmed to direct wavelengths to either OUT1 (516a) or OUT2 (516b), therefore, each of the r 2×1 switches of 513 must have an independent control signal (for a total of r independent control signals). When in the third mode, the wavelength directing function 511a is operable to pass and block individual wavelengths from the first optical input 515a to the first optical output 516a and from the first optical input 515a to the second optical output 516b, and the wavelength directing function is not operable to pass and block individual wavelengths from the second optical input 515b to the second optical output 516b (due to the setting of switches 514). Also, when in the third mode, the wavelength directing function 511a is not operable to direct wavelengths from the second optical input 515b to the first optical output 516a (since no path exists between optical input 515b and optical output 516a, regardless of optical switch settings).

Additionally, the optical device 510 may be described without the concept of modes of operation by simply noting the possible paths between optical inputs and optical outputs within the device. From FIG. 5, it can be noted that there is an optical path between input 515a and output 516a, and there is an optical path between input 515a and output 516b, and there is an optical path between input 515b and output 516b, but there is no optical path that exists between input 515b and output 516a. Therefore optical device 510 comprises, a wavelength directing function 511a, a first optical input 515a used to provide a first source of wavelengths to the wavelength directing function 511a, a second optical input 515b used to provide a second source of wavelengths to the wavelength directing function 511a, a first optical output 516a used to output a first set of wavelengths from the wavelength directing function 511a, and a second optical output 516b used to output a second set of wavelengths from the wavelength directing function 511a, wherein the wavelength directing function 511a is operable to pass and block individual wavelengths from the first optical input 515a to the first optical output 516a and from the first optical input 515a to the second optical output 516b and from the second optical input 515b to the second optical output 516b, and wherein the wavelength directing function 511a is not operable to pass and block individual wavelengths from the second optical input 515b to the first optical output 516a.

The optical device 510 further comprises, a second wavelength directing function 511b, a third optical input (IN3) used to provide a first source of wavelengths to the second wavelength directing function 511b, a fourth optical input (IN4) used to provide a second source of wavelengths to the second wavelength directing function 511b, a third optical output (OUT3) used to output a first set of wavelengths from the second wavelength directing function 511b, and a fourth optical output (OUT4) used to output a second set of wavelengths from the second wavelength directing function 511b, wherein the second wavelength directing function 511b is operable to pass and block individual wavelengths from the third optical input (IN3) to the third optical output (OUT3) and from the third optical input (IN3) to the fourth optical output (OUT4) and from the fourth optical input (IN4) to the fourth optical output (OUT4), and wherein the second wavelength directing function 511b is not operable to pass and block individual wavelengths from the fourth optical input (IN4) to the third optical output (OUT3).

The optical device 510 further comprises, a third wavelength directing function 511c, a fifth optical input (IN5) used to provide a first source of wavelengths to the third wavelength directing function 511c, a sixth optical input (IN6) used to provide a second source of wavelengths to the third wavelength directing function 511c, a fifth optical output (OUT5) used to output a first set of wavelengths from the third wavelength directing function 511c, and a sixth optical output (OUT6) used to output a second set of wavelengths from the third wavelength directing function 511c, wherein the third wavelength directing function 511c is operable to pass and block individual wavelengths from the fifth optical input (IN5) to the fifth optical output (OUT5) and from the fifth optical input (IN5) to the sixth optical output (OUT6) and from the sixth optical input (IN6) to the sixth optical output (OUT6), and wherein the third wavelength directing function 511c is not operable to pass and block individual wavelengths from the sixth optical input (IN6) to the fifth optical output (OUT5).

It should be noted that the wavelength directing function 511a is operable to simultaneously pass and block individual wavelengths from the first optical input 515a to the first optical output 516a, and from the first optical input 515a to the second optical output 516b.

Figure 6:
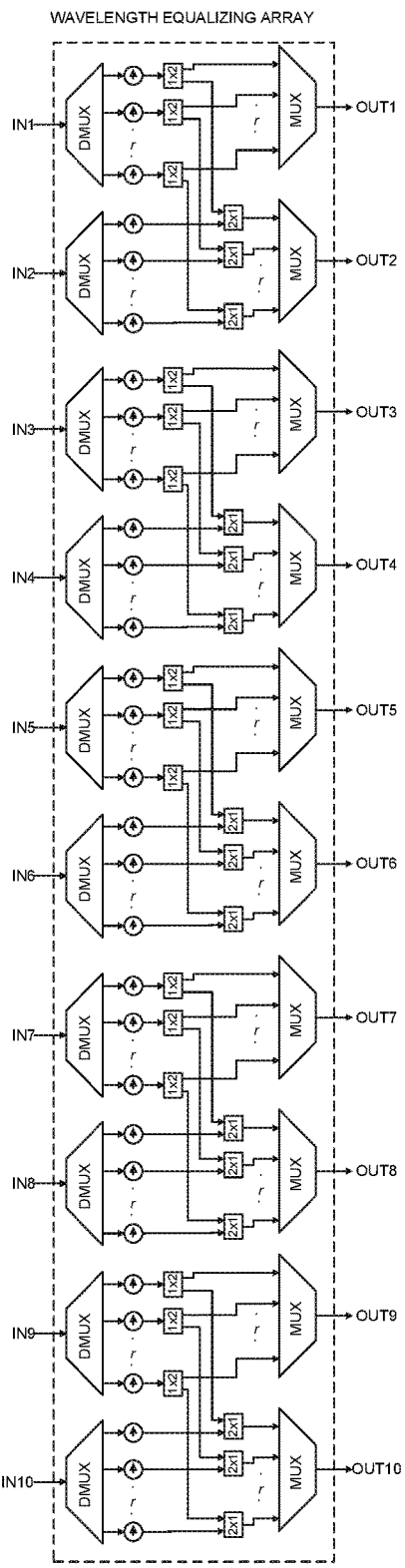
FIG. 6 is an illustration of a wavelength equalizing array containing ten wavelength equalizers that can be configured to be any combination of 1 by 1 wavelength selective switches or 2 by 1 wavelength selective switches.

FIG. 6 shows a wavelength equalizing array 600 that is constructed identically to the wavelength equalizing array 510, except that array 600 contains ten wavelength equalizers instead of only six.

Figure 7:
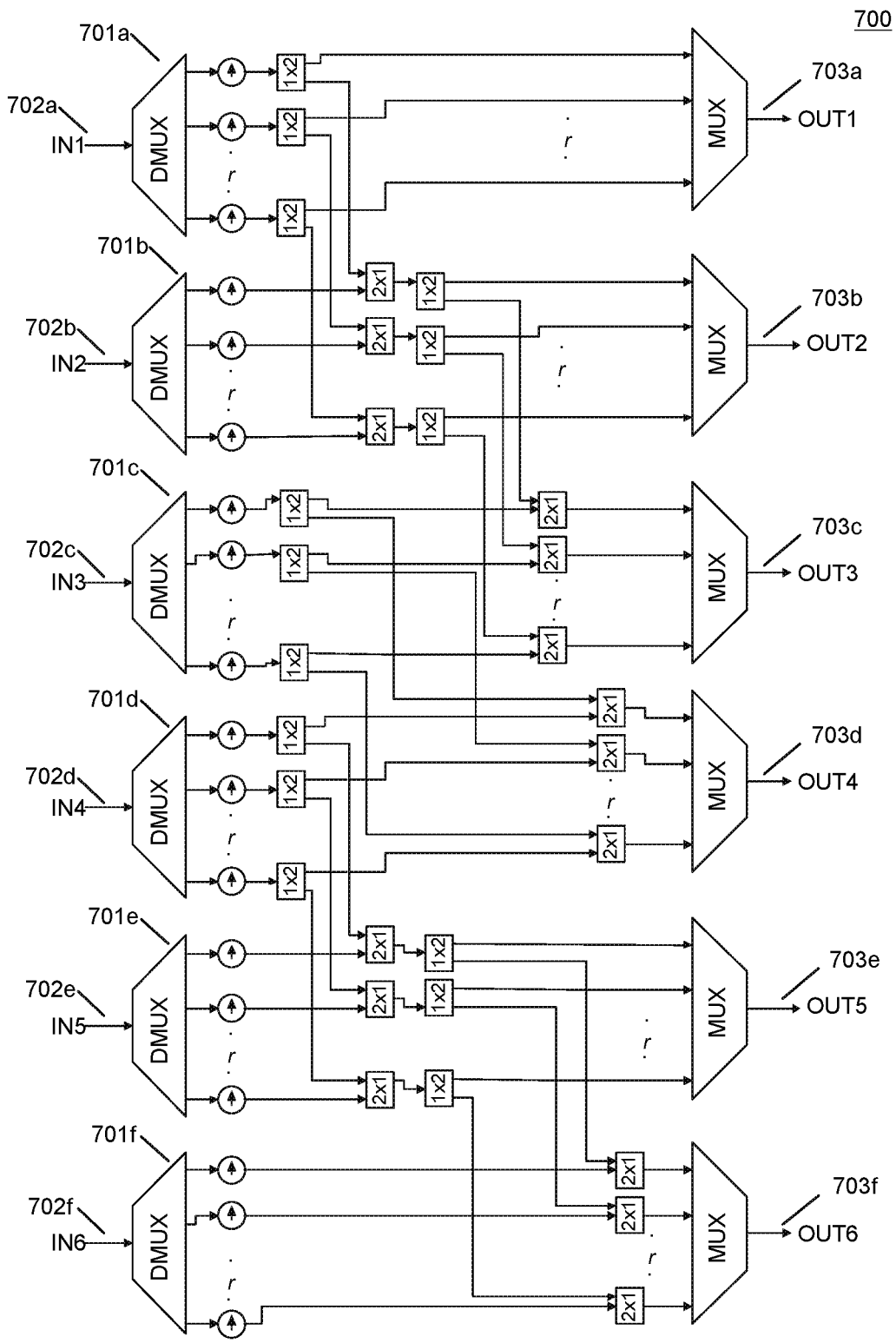
FIG. 7 is an illustration of a wavelength equalizing array containing six wavelength equalizers that can be configured to be any combination of 1 by 1 wavelength selective switches, 2 by 1 wavelength selective switches, or 3 by 1 wavelength selective switches.

FIG. 7 shows a wavelength equalizing array 700 containing six wavelength equalizers 701a-f that can be configured (by setting the 1×2, and 2×1 switches appropriately) as either 1 by 3 WSS functions, 1 by 2 WSS functions, 2 by 1 WSS functions, 3 by 1 WSS functions, or 1 by 1 WSS functions. A first 1 by 3 device is formed by the top three wavelength equalizers 701a-c (using IN1 702a, OUT1 703a, OUT2 703b, and OUT 3 703c), while a second 1 by 3 device is formed by the bottom three wavelength equalizers 701d-f (using IN4 702d, OUT4 703d, OUT5 703e, and OUT 6 703f). In order to use the wavelength equalizing array as 3 by 1 WSS functions, the wavelength equalizing array is used in the reverse direction, using all output ports as inputs, and using the IN1 port 702a as the output port for the top 3 by 1, and using the IN4 port 702d as the output port for the bottom 3 by 1. Alternatively, a first 3 by 1 WSS function is formed by the top three wavelength equalizers 701a-c (using IN1 702a, IN2 702b, IN3 702c, and OUT 3 703c), while a second 3 by 1 WSS function is formed by the bottom three wavelength equalizers 701d-f (using IN4 702d, IN5 702e, IN6 702f, and OUT6 703f).

The wavelength equalizing array 700 can alternatively be used to create three 1 by 2 WSS functions by using IN1 702a, OUT1 703a and OUT2 703b as the first 1 by 2 WSS, using IN3 702c, OUT3 703c, and OUT4 703d as the second 1 by 2 WSS, and using IN5 702e, OUT5 703e, and OUT6 703f as the third 1 by 2 WSS. Similarly, the wavelength equalizing array 700 can be used to create three 2 by 1 WSS functions by using IN1 702a, IN2 702b, and OUT2 703b as the first 2 by 1 WSS, using IN3 702c, IN4 702d, and OUT4

703d as the second 2 by 1 WSS, and using IN5 702e, IN6 702f, and OUT6 703f as the third 2 by 1 WSS.

Finally, the wavelength equalizing array 700 can be used to create six 1 by 1 WSS functions by programming all switches such that all input wavelengths arriving on a given port INx are forwarded to the corresponding output port OUTx.

It should also be noted that the structure of 700 provides the ability to form a 1 by 2 WSS function by using any two consecutive output ports on the structure of 700. For instance, a 1 by 2 WSS function can be formed using consecutive outputs OUT1 703a and OUT2 703b along with IN1 702a, and a 1 by 2 WSS function can be formed using consecutive outputs OUT2 703b and OUT3 703c along with IN2 702b, and a 1 by 2 WSS function can be formed using consecutive outputs OUT3 703c and OUT4 703d along with IN3 702c, and a 1 by 2 WSS function can be formed using consecutive outputs OUT4 703d and OUT5 703e along with IN4 702d, and a 1 by 2 WSS function can be formed using consecutive outputs OUT5 703e and OUT6 703f along with IN5 702e.

It should also be noted that the structure of 700 provides the ability to form a 2 by 1 WSS function by using any two consecutive input ports on the structure of 700. For instance, a 2 by 1 WSS function can be formed using consecutive inputs IN1 702a and IN2 702b along with OUT2 703b, and a 2 by 1 WSS function can be formed using consecutive inputs IN2 702b and IN3 702c along with OUT3 703c, and a 2 by 1 WSS function can be formed using consecutive inputs IN3 702c and IN4 702d along with OUT4 703d, and a 2 by 1 WSS function can be formed using consecutive inputs IN4 702d and IN5 702e along with OUT5 703e, and a 2 by 1 WSS function can be formed using consecutive inputs IN5 702e and IN6 702f along with OUT6 703f.

Any combination of 1 by 3 WSS functions, 1 by 2 WSS functions, 3 by 1 WSS functions, 2 by 1 WSS functions, and 1 by 1 WSS functions can be created using the wavelength equalizing array 700. For instance, wavelength equalizing array 700 can be used to implement a single 1 by 3 WSS function, a single 1 by 2 WSS function, and a single 1 by 1 WSS function. Alternatively, the wavelength equalizing array 700 can be used to implement two 1 by 2 WSS functions, and two 1 by 1 WSS functions. In this way, a single wavelength equalizing array device can be used in a product to create a product with multiple distinct capabilities, while not incurring the cost and complexity of creating a single 6 by 6 WSS function.

The optical device 700 may be described without the concept of modes of operation by simply noting the possible paths between optical inputs and optical outputs within the device. From FIG. 7, it can be noted that there is an optical path between input 702a and output 703a, and there is an optical path between input 702a and output 703b, and there is an optical path between input 702b and output 703b, but there is no optical path that exists between input 702b and output 703a. Therefore optical device 700 comprises, a wavelength directing function, a first optical input 702a used to provide a first source of wavelengths to the wavelength directing function, a second optical input 702b used to provide a second source of wavelengths to the wavelength directing function, a first optical output 703a used to output a first set of wavelengths from the wavelength directing function, and a second optical output 703b used to output a second set of wavelengths from the wavelength directing function, wherein the wavelength directing function a is operable to pass and block individual wavelengths from the first optical input 702a to the first optical output 703a and from the first optical input 702a to the second optical output 703b and from the second optical input 702b to the second optical output 703b, and wherein the wavelength directing function is not operable to pass and block individual wavelengths from the second optical input 702b to the first optical output 703a.

The optical device 700, further comprises, a third optical input 702c used to provide a third source of wavelengths to the wavelength directing function, and a third optical output 703c used to output a third set of wavelengths from the wavelength directing function, wherein the wavelength directing function is operable to pass and block individual wavelengths from the first optical input 702a to the third optical output 703c and from the second optical input 702b to the third optical output 703c and from the third optical input 702c to the third optical output 703c, and wherein the wavelength directing function is not operable to pass and block individual wavelengths from the third optical input 702c to the first optical output 703a and from the third optical input 702c to the second optical output 703b.

The optical device 700, further comprises, a fourth optical input 702d used to provide a fourth source of wavelengths to the wavelength directing function, and a fourth optical output 703d used to output a fourth set of wavelengths from the wavelength directing function, wherein the wavelength directing function is operable to pass and block individual wavelengths from the third optical input 702c to the fourth optical output 703d and from the fourth optical input 702d to the fourth optical output 703d, and wherein the wavelength directing function is not operable to pass and block individual wavelengths from the first optical input 702a to the fourth optical output 703d and from the second optical input 702b to the fourth optical output 703d and from the fourth optical input 702d to the first optical output 703a and from the fourth optical input 702d to the second optical output 703b and from the fourth optical input 702d to the third optical output 703c.

The optical device of 700, further comprises, a fifth optical input 702e used to provide a fifth source of wavelengths to the wavelength directing function, and a fifth optical output 703e used to output a fifth set of wavelengths from the wavelength directing function, wherein the wavelength directing function is operable to pass and block individual wavelengths from the fourth optical input 702d to the fifth optical output 703e and from the fifth optical input 702e to the fifth optical output 703e, and wherein the wavelength directing function is not operable to pass and block individual wavelengths from the first optical input 702a to the fifth optical output 703e and from the second optical input 702b to the fifth optical output 703e and from the third optical input 702c to the fifth optical output 703e and from the fifth optical input 702e to the first optical output 703a and from the fifth optical input 702e to the second optical output 703b and from the fifth optical input 702e to the third optical output 703c and from the fifth optical input 702e to the fourth optical output 703d.

The optical device of 700, further comprises, a sixth optical input 702f used to provide a sixth source of wavelengths to the wavelength directing function, and a sixth optical output 703f used to output a sixth set of wavelengths from the wavelength directing function, wherein the wavelength directing function is operable to pass and block individual wavelengths from the fourth optical input 702d to the sixth optical output 703f and from the fifth optical input 702e to the sixth optical output 703f and from the sixth optical input 702f to the sixth optical output 703f, and wherein the wavelength directing function is not operable to pass and block individual wavelengths from the first optical input 702a to the sixth optical output 703f and from the second optical input 702b to the sixth optical output 703f and from the third optical input 702c to the sixth optical output 703f and from the sixth optical input 702f to the first optical output 703a and from the sixth optical input 702f to the second optical output 703b and from the sixth optical input 702f to the third optical output 703c and from the sixth optical input 702f to the fourth optical output 703d and from the sixth optical input 702f to the fifth optical output 703e.

Although wavelength equalizing array 700 is shown as implemented with individual switches, multiplexers, and de-multiplexers, the actual switching functions can be accomplished with free-space optics wherein multiple switching and filtering functions are combined in order to accomplish identical switching and filtering functionality.

In general, for a wavelength equalizing array that can be configured as either 1 by 1 WSS functions or 2 by 1 WSS functions, if the device can be used to construct a maximum of n 1 by 1 WSS functions, then the maximum number of 2 by 1 WSS functions that the array can be used to create is n/2 devices, since each 2 by 1 device requires the resources associated with two 1 by 1 WSS functions.

For a wavelength equalizing array with a maximum of n number of 1 by 1 WSS functions that can be configured as either 1 by 1 WSS functions or 2 by 1 WSS functions, if the device is configured to have m number of 1 by 1 WSS functions, then the maximum number of 2 by 1 devices that can also be configured is equal to (n−m)/2.

For a wavelength equalizing array that can be configured as either 1 by 1 WSS functions or 3 by 1 WSS functions, if the device can be used to construct a maximum of n 1 by 1 WSS functions, then the maximum number of 3 by 1 WSS functions that the array can be used to create is n/3 devices, since each 3 by 1 device requires the resources associated with three 1 by 1 WSS functions.

For a wavelength equalizing array with a maximum of n number of 1 by 1 WSS functions that can be configured as either 1 by 1 WSS functions or 3 by 1 WSS functions, if the device is configured to have m number of 1 by 1 WSS functions, then the maximum number of 3 by 1 devices that can also be configured is equal to (n−m)/3.

In general, a wavelength equalizing array can be partitioned into an array of $k_1$ 1×1, $k_2$ 1×2, $k_3$ 1×3 . . . , $k_p$ 1×p wavelength selective switches, where p is any integer number greater than 1, and $k_j$ is any integer value greater than or equal to 0. For this case, if n is the maximum number of 1×1 wavelength selective switches in the at least one wavelength equalizing array, then $\Sigma_{i=1}^{P} i \times k_i \leq n$.

Figure 8:
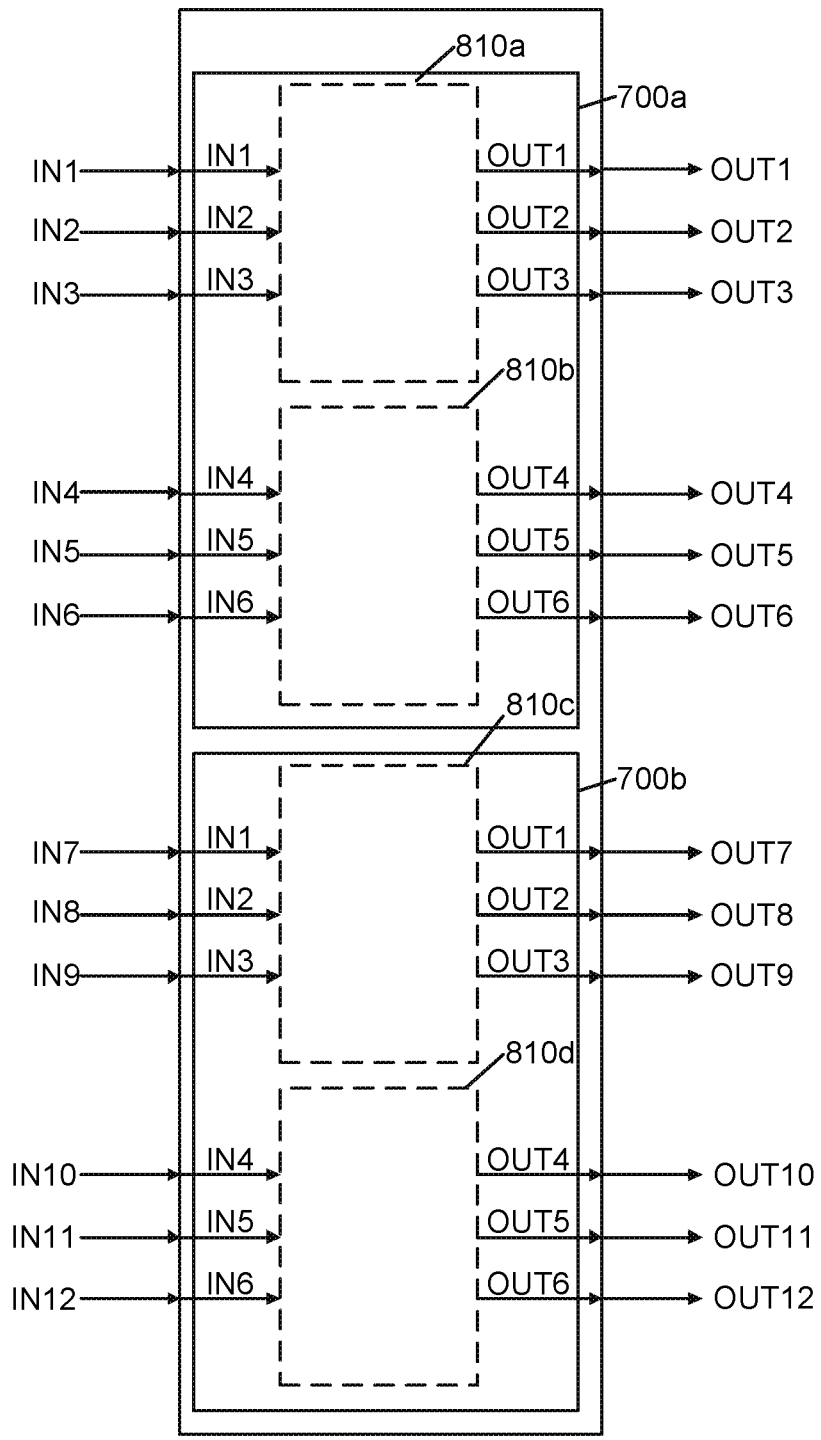
FIG. 8 is an illustration of a wavelength equalizing array containing twelve wavelength equalizers that can be configured to be any combination of 1 by 1 wavelength selective switches, 2 by 1 wavelength selective switches, or 3 by 1 wavelength selective switches.

FIG. 8 depicts a wavelength equalizing array 800 containing two instances (700a, 700b) of wavelength equalizing array 700. In FIG. 8, the wavelength equalizing array 800 can be partitioned into four 1 by 3 WSS functions 810a-d.

Figure 9:
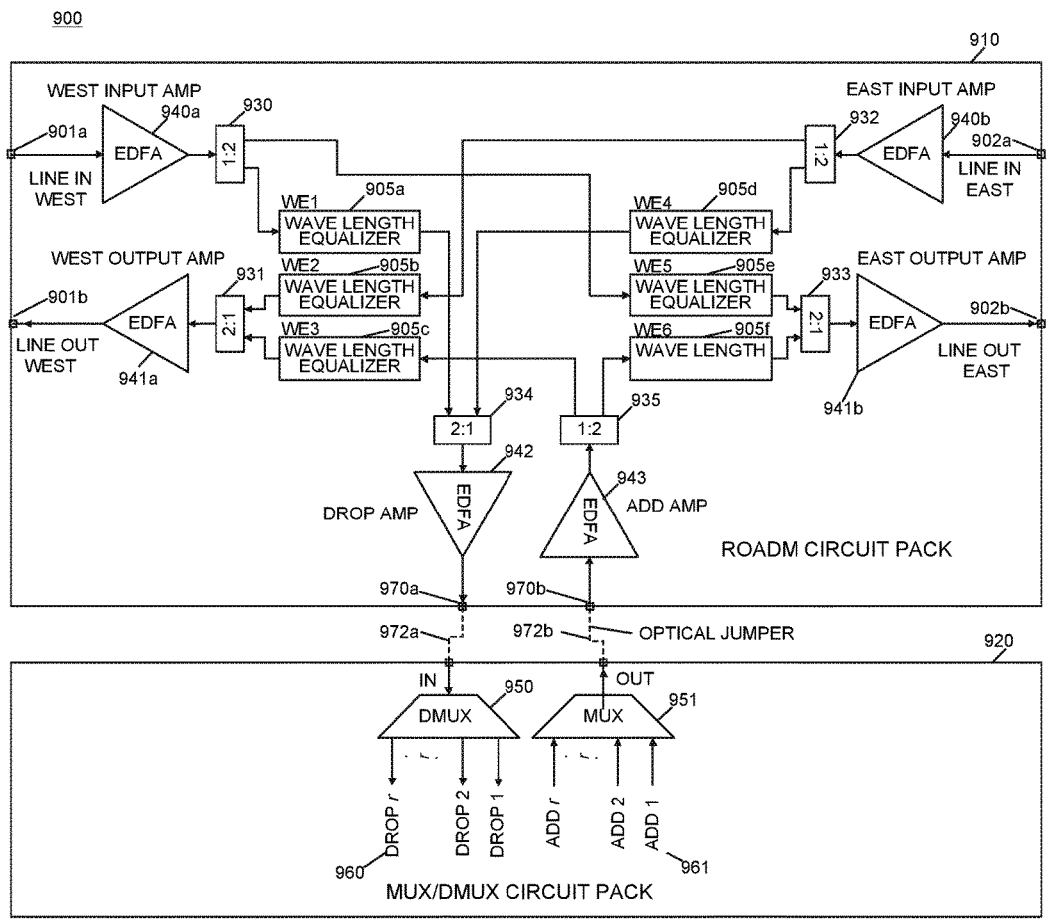
FIG. 9 is an illustration of an optical node comprising of a two degree ROADM on a circuit pack with an external multiplexer/de-multiplexer circuit pack.

FIG. 9 shows an optical node 900 comprising of a two-degree Reconfigurable Optical Add/Drop Multiplexer (ROADM) 910 on a circuit pack with an external multiplexer/de-multiplexer circuit pack 920. Each line interface on the ROADM (Line In/Out West 901a-b, and Line In/OUT East 902a-b) represents an optical degree. In addition, optical node 900 contains a port common to both optical degrees (common port 970a-b) that is connectable to a plurality of directionless add/drop ports 961 and 960. Six wavelength equalizers 905a-f are used in the design—three for each degree. Wavelength equalizer WE1 905a is used to either pass or block wavelengths from the West Line interface 901a to the multiplexer/de-multiplexer circuit pack 920 attached to the common port 970a-b. Similarly, wavelength equalizer WE4 905d is used to either pass or block wavelengths from the East Line interface 902a to the multiplexer/de-multiplexer circuit pack 920 attached to the common port 970a-b. The wavelengths from WE1 905a and WE4 905d are combined together using optical coupler 934, and then they are forwarded to the multiplexer/de-multiplexer circuit pack 920 via optional optical amplifier 942 through the common optical port 970a.

Wavelength equalizer WE3 905c is used to either pass or block wavelengths from the common port 970b to the West Line interface 901b. It is also used to equalize the power levels of the wavelengths exiting out the West Line interface 901b from the multiplexer/de-multiplexer circuit pack 920. Similarly, wavelength equalizer WE6 905f is used to either pass or block wavelengths from the common port 970b to the East Line interface 902b. It is also used to equalize the power levels of the wavelengths exiting out the East Line interface 902b from the multiplexer/de-multiplexer circuit pack 920.

Wavelength equalizer WE2 905b is used to either pass or block wavelengths from the East Line interface 902a to the West Line interface 901b. It is also used to equalize the power levels of the wavelengths exiting out the West Line interface 901b from the East Line interface 902a. Similarly, wavelength equalizer WE5 905e is used to either pass or block wavelengths from the West Line interface 901a to the East Line interface 902b. It is also used to equalize the power levels of the wavelengths exiting out the East Line interface 902b from the West Line interface 901a.

Optional input optical amplifiers 940a-b are used to optically amplify wavelengths arriving from the West 901a and East 902a Line interfaces. These amplifiers can be constructed using Erbium Doped Fiber Amplifier (EDFA) technology or some other suitable technology.

Optical coupler 930 is used to broadcast all the wavelengths from the West Line interface 901a to both wavelength equalizer WE1 905a and WE5 905e. Similarly, optical coupler 932 is used to broadcast all the wavelengths from the East Line interface 902a to both wavelength equalizer WE2 905b and WE4 905d.

Optical coupler 931 is used to combine the wavelengths from wavelength equalizers WE2 905b and WE3 905c into one composite WDM signal that is optically amplified with output optical amplifier 941a. Similarly, optical coupler 933 is used to combine the wavelengths from wavelength equalizers WE5 905e and WE6 905f into one composite WDM signal that is optically amplified with output optical amplifier 941b.

Optional optical amplifier 943 receives added wavelengths from the multiplexer/de-multiplexer circuit pack 920 via port 970b, and optically amplifies the wavelengths before forwarding the amplified wavelengths to optical coupler 935. Optical coupler 935 is used to broadcast the added wavelengths to both the West Line interface 901b and East Line interface 902b via WE3 905c and WE6 905f respectively.

Located on the multiplexer/de-multiplexer circuit pack 920 is a plurality (r) of add/drop ports 961, 960. Individual wavelengths are added to the multiplexer/de-multiplexer circuit pack and then multiplexed via multiplexer 951 into a composite WDM signal that is then forwarded to the ROADM circuit pack 910. In the drop direction on 920, a composite WDM signal is received from the common port 970a of the ROADM circuit pack 910 and then it is de-multiplexed into individual wavelengths using de-multiplexer 950. Each de-multiplexed wavelength is then forwarded to a specific drop port 960 of the de-multiplexer. The multiplexer and de-multiplexer may be implemented using Arrayed Waveguide Grating (AWG) technology, or some other suitable technology. Devices that process individual wavelengths for transmission—such as optical transponders—can be used to supply and receive wavelengths to and from the add/drop ports. The common port 970a-b of the ROADM circuit pack 910 is connected to the multiplexer/de-multiplexer circuit pack 920 using two optical jumper interconnections 972a-b.

As can be seen in 900, a single multiplexer/de-multiplexer circuit pack is used to add and drop wavelengths to/from both the East and West Line interfaces. Therefore, a transponder that is attached to an add/drop port of the multiplexer/de-multiplexer circuit pack 920, can forward and receive wavelengths to and from any of the two degrees of the ROADM circuit pack. Because of this, the add/drop ports are referred to as directionless add/drop ports—meaning the add drop ports are not dedicated to a particular direction of the optical node. The wavelength equalizers on the ROADM circuit pack are used to steer the added and dropped wavelengths to and from each degree by appropriately blocking or passing wavelengths. Therefore, the wavelength equalizers WE1 905a, WE3 905c, WE4 905d, and WE6 905f are said to perform directionless steering for the add/drop ports for each degree.

Additionally, the wavelength equalizers on the ROADM circuit pack are used to select which wavelengths from the Line input interfaces are allowed to exit a given output interface (degree), by appropriately blocking or passing wavelengths.

Both the ROADM circuit pack 910 and the multiplexer/de-multiplexer circuit pack 920 may contain electrical connectors that allow the two circuit packs to be plugged into an electrical back plane of an electrical shelf (not shown). The multiplexer/de-multiplexer circuit 920 pack may contain active components (i.e., components requiring electrical power in order to operate), or it may contain only passive components (athermal AWGs, for example). If the multiplexer/de-multiplexer circuit pack 920 contains only passive components, then the multiplexer/de-multiplexer circuit pack could optionally be placed outside of the electrical shelf.

Figure 10:
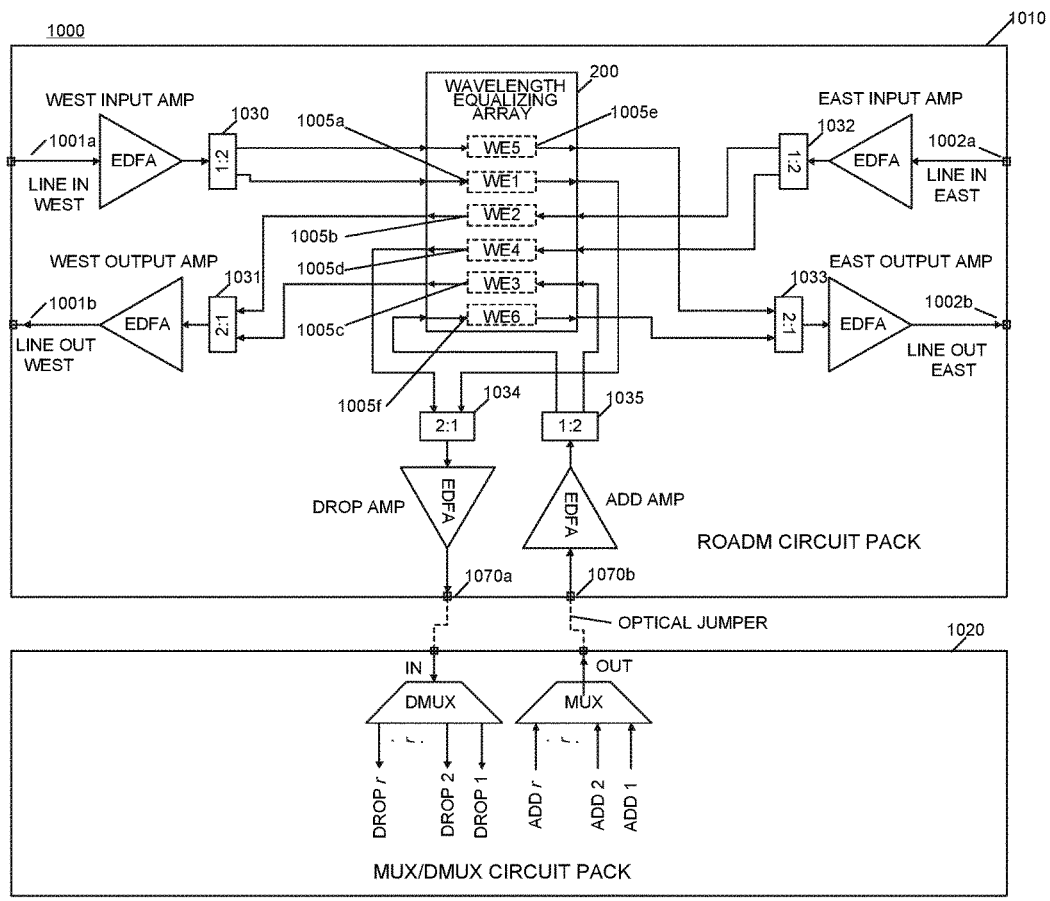
FIG. 10 is an illustration of an optical node comprising of a two degree ROADM on a circuit pack utilizing a wavelength equalizing array containing six wavelength equalizers, with an external multiplexer/de-multiplexer circuit pack.

FIG. 10 shows a two-degree optical node 1000 that is identical to the optical node 900, except that a single wavelength equalizing array 200 is used to supply all the required wavelength equalizers needed to construct the optical node. (Alternatively, multiple smaller wavelength equalizing arrays could be utilized.) The wavelength equalizers WE1-WE6 in 1000 correspond to the wavelength equalizers WE1-WE6 in 900. More specifically WE1 1005a in ROADM circuit pack 1010 corresponds WE1 905a in ROADM circuit pack 910, WE2 1005b in 1010 corresponds WE2 905b in 910, WE3 1005c in 1010 corresponds WE3 905c in 910, WE4 1005d in 1010 corresponds WE4 905d in 910, WE5 1005e in 1010 corresponds WE5 905e in 910, and WE6 1005f in 1010 corresponds WE6 905f in 910. Likewise, the optical couplers 1030, 1031, 1032, 1033, 1034, and 1035 perform the same functions as their respective counterparts 930, 931, 932, 933, 934, and 935 within ROADM circuit pack 1010. The single wavelength equalizing array 200 may be identical to the wavelength equalizing array 200 discussed in reference to FIG. 2.

A single ROADM circuit pack 1010 supplies all the required optical circuitry to construct an optical node with two optical degrees, including input and output amplifiers for each degree, a common port 1070a-b connectable to a plurality of directionless add/drop ports, optical supervisory channel circuitry (not shown), optical channel monitoring (not shown), and a single wavelength equalizing array 200 that is used to both select wavelengths for each optical degree (using WE2 1005b and WE3 1005c for the West degree 1001b, and using WE5 1005e and WE6 1005f for the East degree 1002b) and to perform directionless steering for the plurality of directionless add/drop ports (using WE1 1005a and WE4 1005d in the drop direction, and using WE3 1005c and WE6 1005f in the add direction).

As can be seen in 1000, a single multiplexer/de-multiplexer circuit pack 1020 is used to add and drop wavelengths to/from both the East 1002a-b and West 1001a-b Line interfaces. Therefore, a transponder (not shown) that is attached to an add/drop port of the multiplexer/de-multiplexer circuit pack 1020, can forward and receive wavelengths to/from any of the two degrees of the ROADM circuit pack. Because of this, the add/drop ports are referred to as directionless add/drop ports—meaning the add drop ports are not dedicated to a particular direction of the optical node. The wavelength equalizers on the ROADM circuit pack are used to steer the added and dropped wavelengths to and from each degree by appropriately blocking or passing wavelengths. Therefore, the wavelength equalizers are said to perform directionless steering for the add/drop ports.

Additionally, the wavelength equalizers on the ROADM circuit pack 1010 are used to select which wavelengths from the Line input interfaces are allowed to exit a given output interface (degree), by appropriately blocking or passing wavelengths.

The wavelength equalizing array saves physical space and electrical power by utilizing common optics and electronics for all the wavelength equalizers in the array, thus making it more suitable for low-cost compact edge-of-network applications. The single wavelength equalizing array also provides a means to simplify the construction of the ROADM circuit pack that it is placed upon.

A preferred embodiment utilizes a "single" wavelength equalizing array to construct an optical node. Other embodiments may include using more than one wavelength equalizing array.

A preferred embodiment is to construct an optical node of at least two optical degrees using both a first circuit pack and a second circuit pack, wherein the optical node contains at least one wavelength equalizing array and a plurality of directionless add/drop ports, and wherein the at least one wavelength equalizing array is contained on the first circuit pack, and wherein the plurality of direction less add/drop ports are contained on the second circuit pack.

Another embodiment comprises of an optical node of at least two optical degrees, implemented using a single circuit pack, wherein the optical node contains at least one wavelength equalizing array and a plurality of directionless add/drop ports, and wherein the at least one wavelength equalizing array and the plurality of directionless add/drop ports are contained on the single circuit pack.

Another preferred embodiment includes a ROADM circuit pack, comprising of at least two optical degrees, and a common port connectable to a plurality of directionless add/drop ports, wherein wavelengths from the common port may be directed to any of the at least two optical degrees. Additionally, wavelengths from the at least two optical degrees may be directed to the common port of the ROADM circuit pack. The embodiment may further include input optical amplification and output optical amplification for each optical degree. The ROADM circuit pack may further comprise of at least one wavelength equalizing array, wherein the at least one wavelength equalizing array provides a means to both select wavelengths for each degree, and to perform directionless steering of wavelengths to and from the plurality of directionless add/drop ports, as illustrated in reference to the ROADM shown in FIG. 10. In a preferred embodiment, a single wavelength equalizing array is used to construct the ROADM circuit pack. The at least one wavelength equalizing array may be constructed using a single Liquid Crystal on Silicon substrate, or it may be constructed using planar lightwave circuitry.

Figure 11:
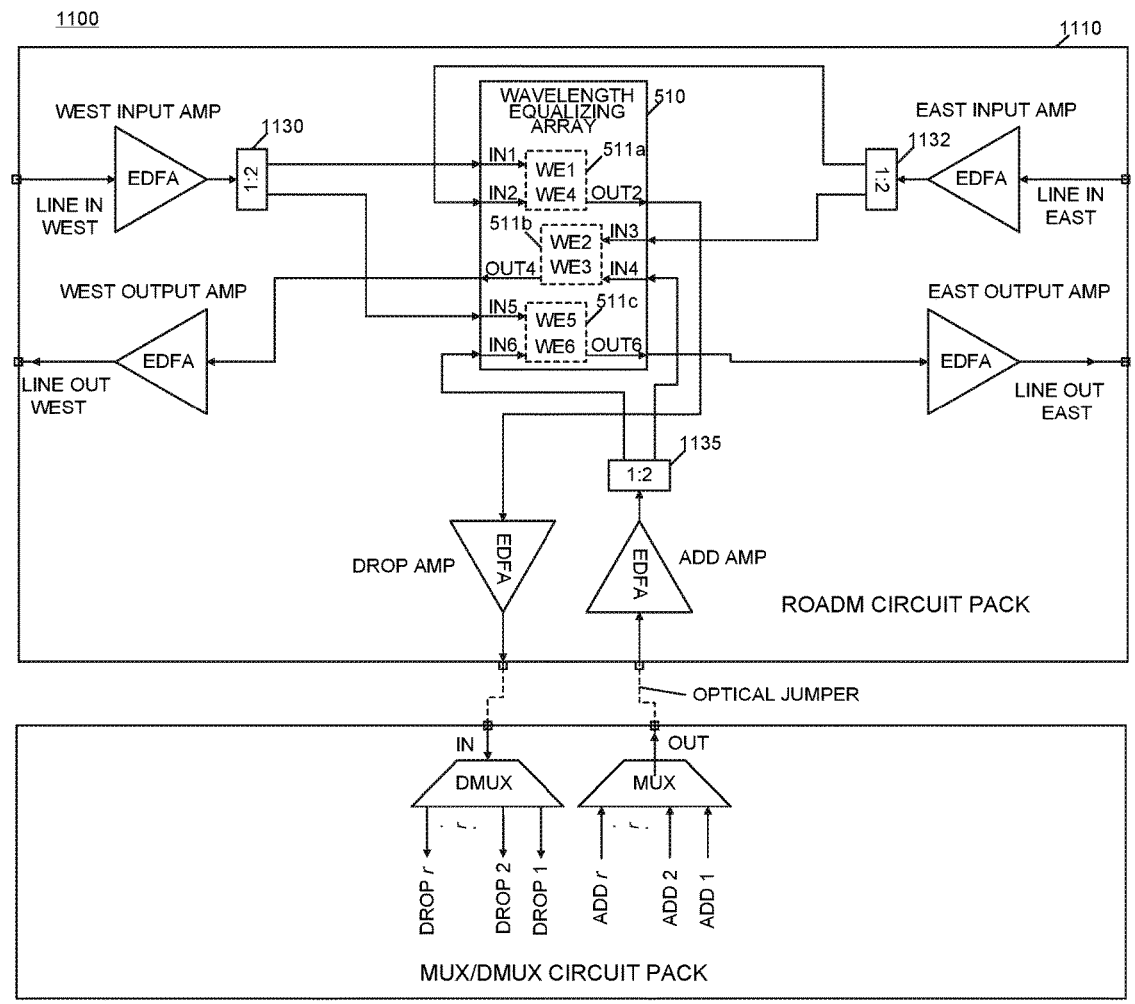
FIG. 11 is an illustration of an alternative embodiment optical node comprising of a two degree ROADM on a circuit pack utilizing a wavelength equalizing array containing six wavelength equalizers, with an external multiplexer/de-multiplexer circuit pack.

FIG. 11 shows a two-degree optical node 1100 that is identical to the optical node 900, except that a single wavelength equalizing array 510 is used to supply all the required wavelength equalizers needed to construct the optical node. The wavelength equalizing array 510 may be identical to the wavelength equalizing array that was described in reference to FIG. 5.

This wavelength equalizing array 510 can be configured to perform the function of multiple 2 by 1 WSS functions. Therefore, the function of the optical couplers 931, 933, and 934 of optical node 900 are additionally absorbed within the wavelength equalizing array 510. The 2 by 1 WSS function 511a a performs the function of WE1 905a, WE4 905d, and optical coupler 934 within optical node 900, while the 2 by 1 WSS function 511bb performs the function of WE2 905b, WE3 905c, and optical coupler 931 within optical node 900, and the 2 by 1 WSS function 511cc performs the function of WE5 905e, WE6 905f, and optical coupler 933 within optical node 900. Optical couplers 1130, 1132, and 1135 perform the same functions as their respective counterparts 930, 932, and 935 within ROADM circuit pack 910. As can be seen from FIG. 11, using the wavelength equalizing array 510 in place of wavelength equalizing array 200 further simplifies the ROADM circuit pack due to the additional level of integration.

Figure 12:
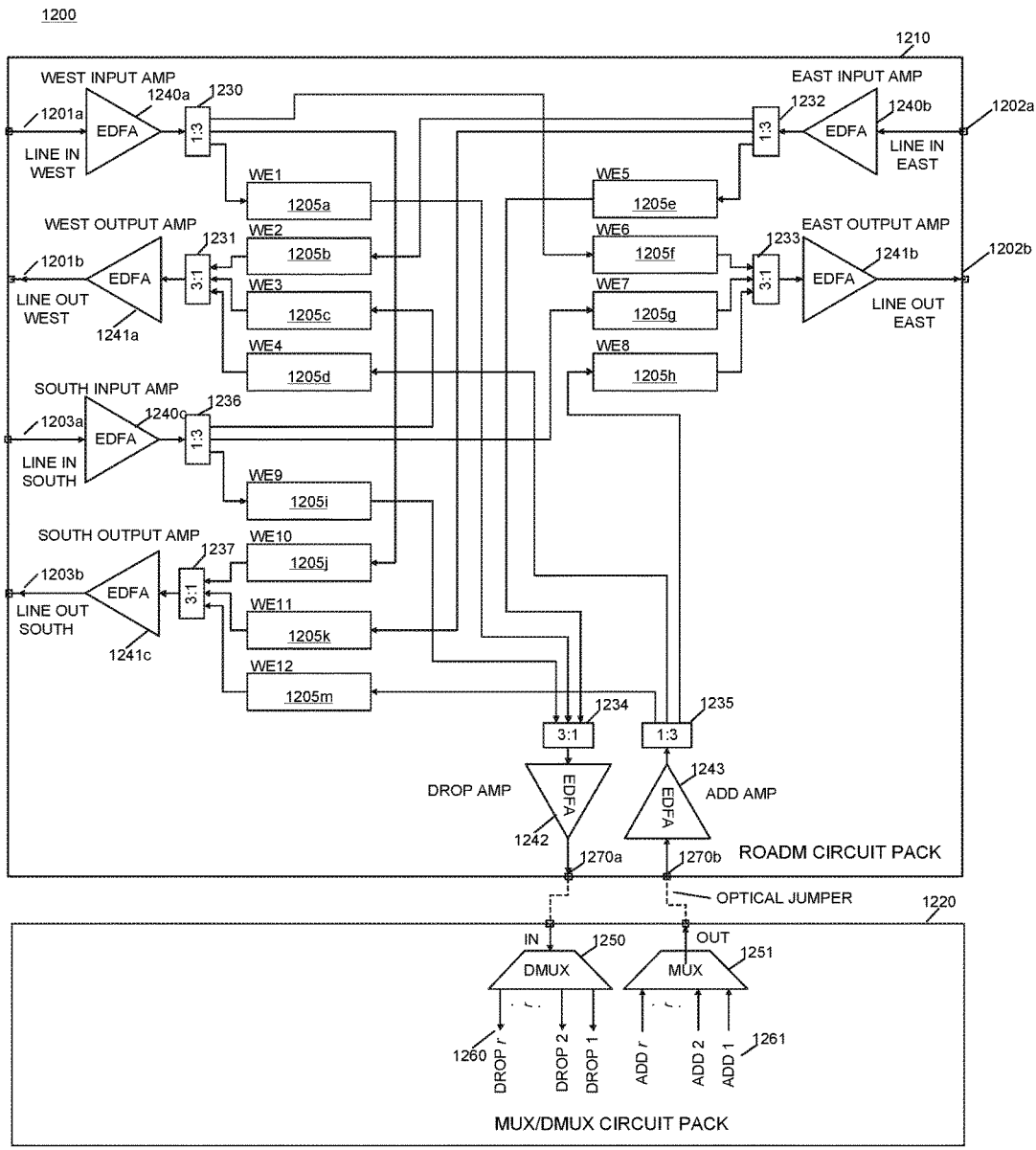
FIG. 12 is an illustration of an optical node comprising of a three degree ROADM on a circuit pack with an external multiplexer/de-multiplexer circuit pack.

FIG. 12 shows an optical node 1200 comprising of a three-degree Reconfigurable Optical Add/Drop Multiplexer (ROADM) 1210 on a circuit pack with an external multiplexer/de-multiplexer circuit pack 1220. Each line interface on the ROADM (Line In/Out West 1201a-b, Line In/OUT East 1202a-b, and Line In/OUT South 1203a-b) represents an optical degree. Twelve wavelength equalizers are used in the design—four for each degree. Wavelength equalizer WE1 1205a is used to either pass or block wavelengths from the West Line interface 1201a to the multiplexer/de-multiplexer circuit pack 1220. Similarly, wavelength equalizer WE5 1205e and WE9 1205i are used to either pass or block wavelengths from the East 1202a and South 1203a Line interfaces to the multiplexer/de-multiplexer circuit pack 1220. The wavelengths from WE1 1205a, WE5 1205e, and WE9 1205i are combined together using optical coupler 1234, and then they are forwarded to the multiplexer/de-multiplexer circuit pack 1220 via optional optical amplifier 1242 through the common port 1270a.

Wavelength equalizer WE4 1205d is used to either pass or block wavelengths from the multiplexer/de-multiplexer circuit pack 1220 to the West Line interface 1201b. It is also used to equalize the power levels of the wavelengths exiting out the West Line interface 1201b from the multiplexer/de-multiplexer circuit pack 1220. Similarly, wavelength equalizers WE8 1205h and WE12 1205m are used to either pass or block wavelengths from the multiplexer/de-multiplexer circuit pack 1220 to the East 1202b and South 1203b Line interfaces. They are also used to equalize the power levels of the wavelengths exiting out the East 1202b and South 1203b Line interfaces from the multiplexer/de-multiplexer circuit pack 1220.

Wavelength equalizer WE2 1205b and WE3 1205c are used to either pass or block wavelengths from the East 1202a and South 1203a Line interfaces to the West Line interface 1201b. They are also used to equalize the power levels of the wavelengths exiting out the West Line interface 1201b from the East 1202a and South 1203a Line interfaces. Similarly, wavelength equalizers WE6 1205f and WE7 1205g are used to either pass or block wavelengths from the West 1201a and South 1203a Line interfaces to the East Line interface 1202b. They are also used to equalize the power levels of the wavelengths exiting out the East Line interface 1202b from the West 1201a and South 1203a Line interfaces. Lastly, wavelength equalizers WE10 1205j and WE11 1205k are used to either pass or block wavelengths from the West 1201a and East 1202a Line interfaces to the South Line interface 1203b. They are also used to equalize the power levels of the wavelengths exiting out the South Line interface 1203b from the West 1201a and East 1202a Line interfaces.

Optional input optical amplifiers 1240a-c are used to optically amplify wavelengths arriving from the West 1201a, East 1202a, and South 1203a Line interfaces.

Optical coupler 1230 is used to broadcast all the wavelengths from the West Line interface 1201a to wavelength equalizers WE1 1205a, WE6 1205f, and WE10 1205j. Similarly, optical coupler 1232 is used to broadcast all the wavelengths from the East Line interface 1202a to wavelength equalizer s WE2 1205b, WE5 1205e, and WE11 1205k. Lastly, optical coupler 1236 is used to broadcast all the wavelengths from the South Line interface 1203a to wavelength equalizers WE3 1205c, WE7 1205g, and WE9 1205i.

Optical coupler 1231 is used to combine the wavelengths from wavelength equalizers WE2 1205b, WE3 1205c and WE4 1205d into one composite WDM signal that is optically amplified with output optical amplifier 1241a. Similarly, optical coupler 1233 is used to combine the wavelengths from wavelength equalizers WE6 1205f, WE7 1205g, and WE8 1205h into one composite WDM signal that is optically amplified with output optical amplifier 1241b. Lastly, optical coupler 1237 is used to combine the wavelengths from wavelength equalizers WE10 1205j, WE11 1205k, and WE12 1205m into one composite WDM signal that is optically amplified with output optical amplifier 1241c.

Optional optical amplifier 1243 receives added wavelengths from the multiplexer/de-multiplexer circuit pack 1220 via common port 1270b, and optically amplifies the wavelengths before forwarding the amplified wavelengths to optical coupler 1235. Optical coupler 1235 is used to broadcast the added wavelengths to the West Line interface 1201b, the East Line interface 1202b, and the South Line Interface 1203b via WE4 1205d, WE8 1205h, and WE12 1205m respectively.

Located on the multiplexer/de-multiplexer circuit pack 1220 is a plurality (r) of add/drop ports 1260, 1261. Individual wavelengths are added to the multiplexer/de-multiplexer circuit pack and then multiplexed via multiplexer 1251 into a composite WDM signal that is then forwarded to the ROADM circuit pack 1210 via the common port 1270b of the ROADM circuit pack. In the drop direction on 1220, a composite WDM signal is received from the ROADM circuit pack 1210 via the common port 1270a and then it is de-multiplexed into individual wavelengths using de-multiplexer 1250. Each de-multiplexed wavelength is then forwarded to a specific drop port of the de-multiplexer. The multiplexer and de-multiplexer may be implemented using Arrayed Waveguide Grating (AWG) technology, or some other suitable technology. Devices that process individual wavelengths for transmission—such as optical transponders (not shown)—can be used to supply and receive wavelengths from the add/drop ports.

As can be seen in 1200, a single multiplexer/de-multiplexer circuit pack 1220 is used to add and drop wavelengths to/from the East, West, and South Line interfaces. Therefore, a transponder that is attached to an add/drop port of the multiplexer/de-multiplexer circuit pack 1220, can forward and receive wavelengths from any of the three degrees of the ROADM circuit pack. Because of this, the add/drop ports are referred to as directionless add/drop ports—meaning the add/drop ports are not dedicated to a particular direction of the optical node. The wavelength equalizers on the ROADM circuit pack are used to steer the added and dropped wavelengths to and from each degree by appropriately blocking or passing wavelengths. Therefore, the wavelength equalizers are said to perform directionless steering for the add/drop ports.

Additionally, the wavelength equalizers on the ROADM circuit pack are used to select which wavelengths from the Line input interfaces are allowed to exit a given output interface (degree), by appropriately blocking or passing wavelengths.

Figure 13:
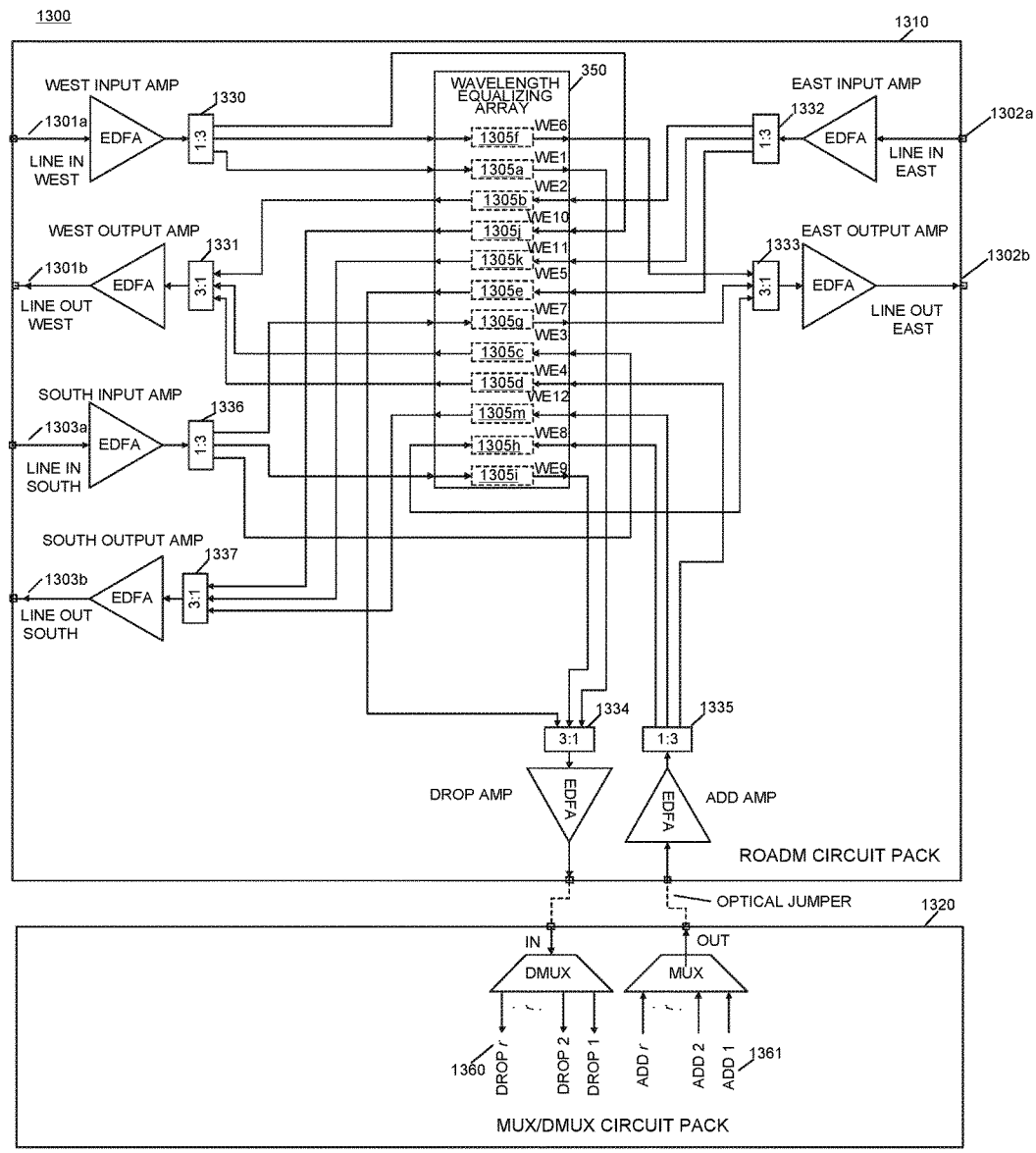
FIG. 13 is an illustration of an optical node comprising of a three degree ROADM on a circuit pack utilizing a wavelength equalizing array containing twelve wavelength equalizers, with an external multiplexer/de-multiplexer circuit pack.

FIG. 13 shows a three-degree optical node 1300 that is identical to the optical node 1200, except that a single wavelength equalizing array 350 is used to supply all the required wavelength equalizers needed to construct the optical node. (Alternatively, multiple smaller wavelength equalizing arrays could be utilized.) The wavelength equalizers WE1-WE12 1305$a$-$m$ in 1300 correspond to the wavelength equalizers WE1-WE12 1205$a$-$m$ in 1200. The single wavelength equalizing array 350 may be identical to the wavelength equalizing array 350 discussed in reference to FIG. 3.

A single ROADM circuit pack 1310 supplies all the required optical circuitry to support three optical degrees, including input and output amplifiers for each degree, a common optical port connectable to a plurality of directionless add/drop ports, optical supervisory channel circuitry (not shown), optical channel monitoring (not shown), and a single wavelength equalizing array 350 that is used to both select wavelengths for each degree and to perform directionless steering for the add/drop ports of each degree.

As can be seen in 1300, a single multiplexer/de-multiplexer circuit pack 1320 is used to add and drop wavelengths to/from the East 1302$a$-$b$, West 1301$a$-$b$, and South 1303$a$-$b$ Line interfaces. Therefore, a transponder that is attached to an add/drop port of the multiplexer/de-multiplexer circuit pack 1320, can forward and receive wavelengths to/from any of the three degrees of the ROADM circuit pack. Because of this, the add/drop ports are referred to as directionless add/drop ports—meaning the add drop ports are not dedicated to a particular direction of the optical node. The wavelength equalizers on the ROADM circuit pack are used to steer the added and dropped wavelengths to and from each degree by appropriately blocking or passing wavelengths. Therefore, the wavelength equalizers are said to perform directionless steering for the add/drop ports.

Additionally, the wavelength equalizers on the ROADM circuit pack 1310 are used to select which wavelengths from the Line input interfaces are allowed to exit a given output Line interface (degree), by appropriately blocking or passing wavelengths.

The ROADM circuit pack 1310 is constructed on one or more printed circuit boards that are bound together electrically and mechanically so that the circuit pack can be plugged into a backplane as a single entity. The ROADM circuit pack additionally contains a front panel (used to house the optical connectors associated with the optical ports on the ROADM), electrical control circuitry (used to take in user commands needed to control the ROADM), power supply circuitry (used to provide the various voltage levels and electrical currents needed to power the various components on the ROADM), and one or more backplane connectors (needed to connect electrical signals on the ROADM circuit pack to signals on the back plane that the ROADM card is plugged into).

Alternatively, the optical multiplexer/de-multiplexer circuitry on the multiplexer/de-multiplexer circuit pack 1320 could be placed on the ROADM circuit pack 1310, thus eliminating a circuit pack in the optical node.

The add/drop ports on the multiplexer/de-multiplexer circuit pack 1320 are considered to be colored add/drop ports. This is because each add/drop port is used to support a particular optical frequency (wavelength). So therefore, add/drop port 1 will only support wavelength frequency 1, and therefore a transponder attached to add/drop port 1 must only generate wavelength frequency 1. An alternative (not shown) is to supply an alternative multiplexer/de-multiplexer circuit pack that contains colorless add/drop ports. A colorless add/drop port can be used to support any of the r wavelength frequencies associated with the ROADM circuit pack, and therefore a transponder attached to add/drop port 1 is allowed to generate any of the r wavelength frequencies.

The wavelength equalizing array (350) saves physical space and electrical power by utilizing common optics and electronics for all the wavelength equalizers in the array, thus making it more suitable for compact edge-of-network applications. The single wavelength equalizing array also provides a means to simplify the construction of the ROADM circuit pack that it is placed upon. Furthermore, the wavelength equalizing array 350 provides the flexibility to generate alternative functions and architectures by simply changing the manner in which the wavelength equalizing array is connected to other optical components on the ROADM circuit pack.

In summary, optical node 1300 comprises of three degrees with corresponding optical interfaces 1301$a$-$b$, 1302$a$-$b$, and 1303$a$-$b$, a plurality of directionless add/drop ports 1361, 1360, and at least one wavelength equalizing array 350, wherein the at least one wavelength equalizing array 350 is used to both select wavelengths for each optical degree (via wavelength equalizers 1305$b$-$d$, 1305$f$-$h$, & 1305$j$-$m$), and to perform directionless steering for the plurality of directionless add/drop ports 1361,1360 (via wavelength equalizers 1305$a$, 1305$d$, 1305$e$, 1305$h$, 1305$i$, 1305$m$). The three degree optical node may be implemented with a single ROADM circuit pack comprising of all three degrees.

Figure 14:
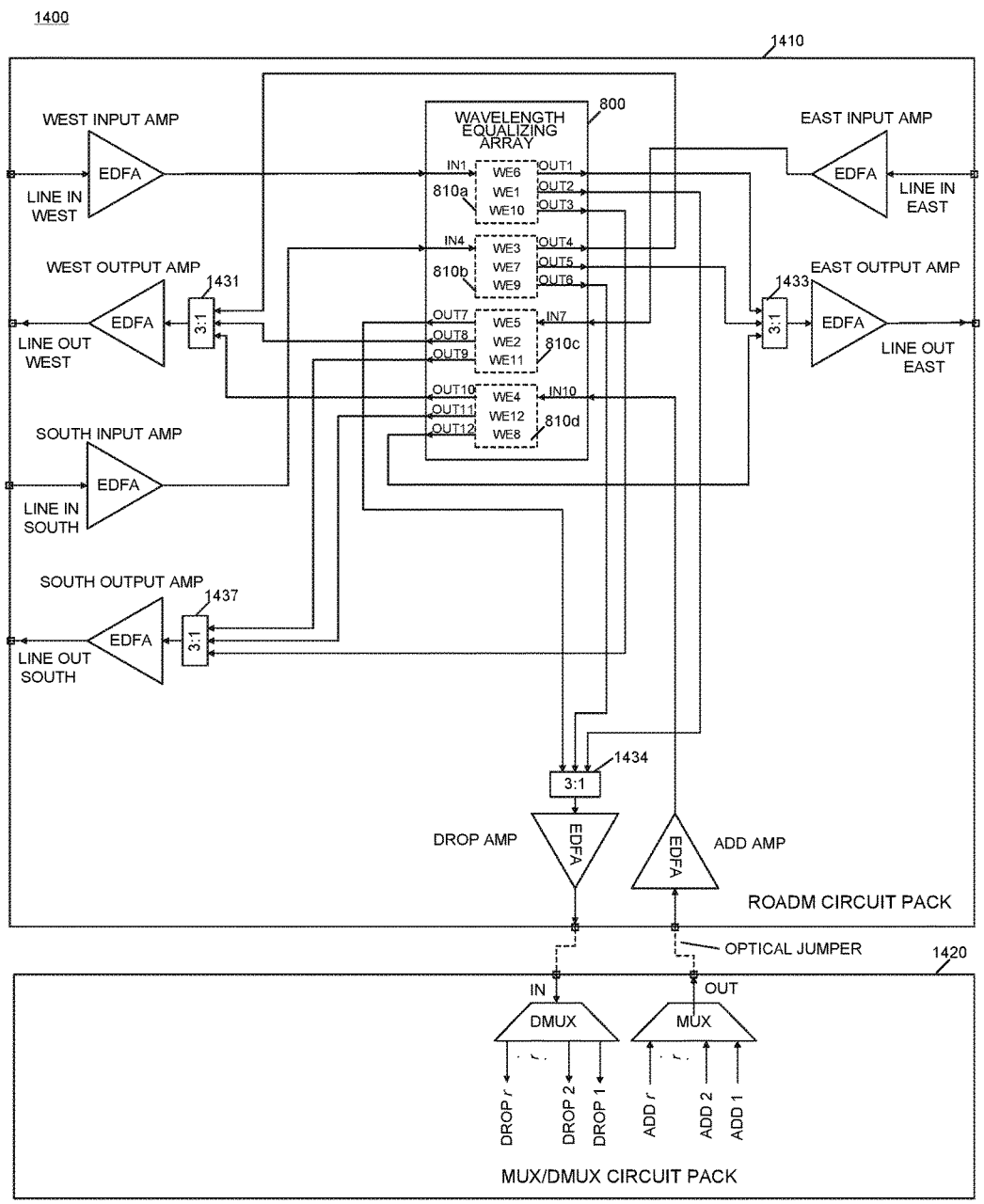
FIG. 14 is an illustration of an alternative embodiment of an optical node comprising of a three degree ROADM on a circuit pack utilizing a wavelength equalizing array containing twelve wavelength equalizers, with an external multiplexer/de-multiplexer circuit pack.

FIG. 14 shows a three-degree optical node 1400 that is identical to the optical node 1200, except that a single wavelength equalizing array 800 is used to supply all the required wavelength equalizers needed to construct the optical node. The wavelength equalizing array that is used is the wavelength equalizing array 800 that was described in reference to FIG. 8. This wavelength equalizing array can be configured to perform the function of multiple 1 by 3 WSS functions. Therefore, the function of the optical couplers 1230, 1232, 1235, and 1236 of optical node 1200 are additionally absorbed within the wavelength equalizing array 800. The 3 by 1 WSS function 810$a$ performs the function of WE1 1205$a$, WE6 1205$f$, WE10 1205$j$, and optical coupler 1230 within optical node 1200, while the 3 by 1 WSS function 810b performs the function of WE3 1205c, WE7 1205g, WE9 1205i, and optical coupler 1236 within optical node 1200, and the 3 by 1 WSS function 810c performs the function of WE2 1205b, WE5 1205e, WE11 1205k, and optical coupler 1232 within optical node 1200, and the 3 by 1 WSS function 810d performs the function of WE4 1205d, WE8 1205h, WE12 1205m, and optical coupler 1235 within optical node 1200. Couplers 1431, 1433, 1434, and 1437, correspond to the couplers 1231, 1233, 1234, and 1237 within ROADM circuit pack 1210. As can be seen from FIG. 14, using the wavelength equalizing array 800 in place of wavelength equalizing array 310 further simplifies the ROADM circuit pack due to the additional level of integration.

Figure 15:
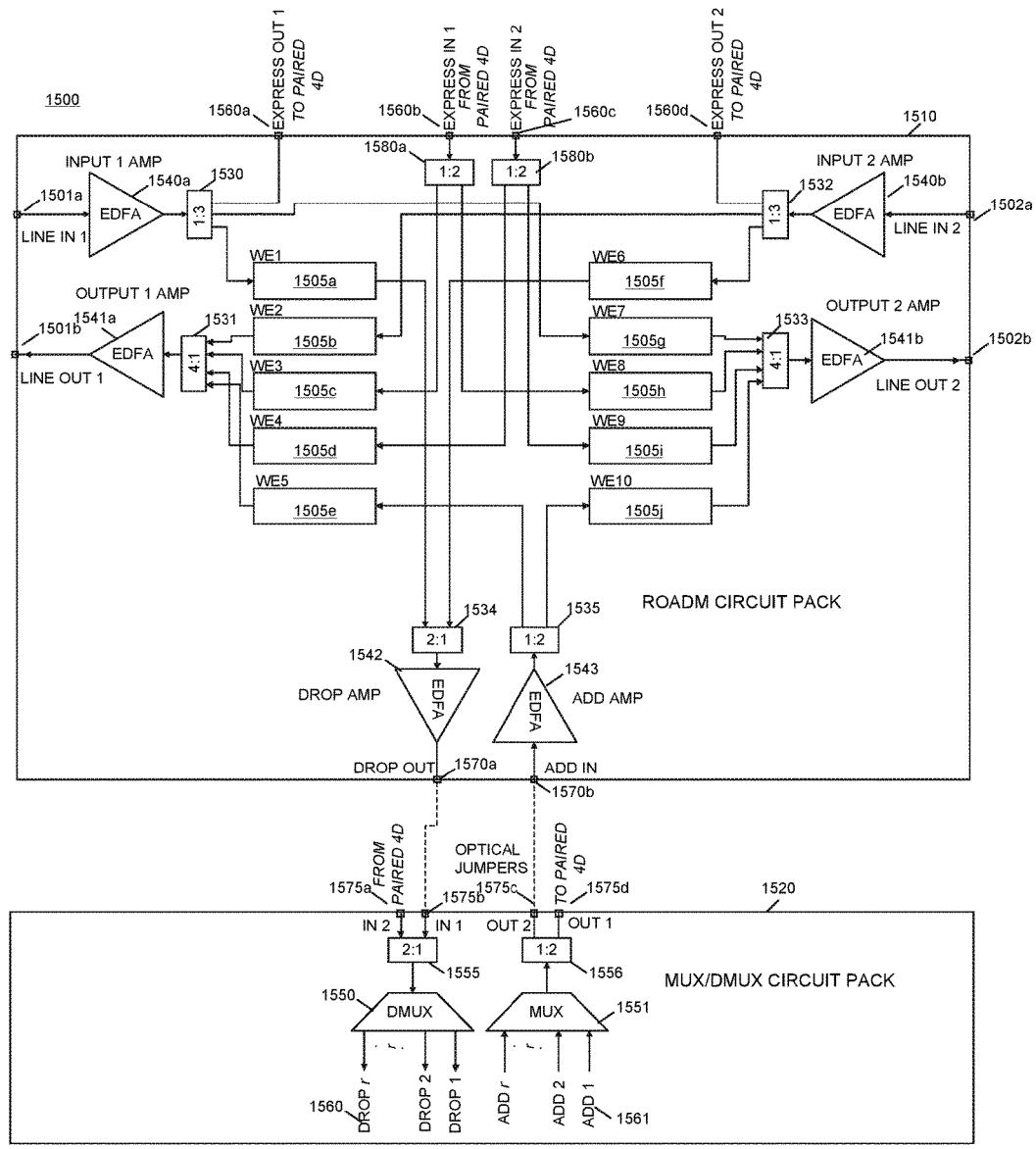
FIG. 15 is an illustration of a two degree optical node comprising of a two degree ROADM on a circuit pack that can be expanded to a four degree optical node.

FIG. 15 shows an optical node 1500 comprising of a two-degree Reconfigurable Optical Add/Drop Multiplexer (ROADM) 1510 on a circuit pack with an external multiplexer/de-multiplexer circuit pack 1520. The ROADM circuit pack can be used as a stand-alone ROADM in a two degree node, or it can be paired with a second identical ROADM circuit pack in order to form a four degree node. The four Express ports (Express Out 1&2 and Express In 1&2 1560a-d) are used to interconnect the two ROADMs when two ROADM circuit packs are paired to form a four-degree node. Each line interface on the ROADM (Line In/Out 1 1501a-b and Line In/Out 2 1502a-b) represents an optical degree. Ten wavelength equalizers 1505a-j are used in the embodiment—five for each degree. Wavelength equalizer WE1 1505a is used to either pass or block wavelengths from the Line1 interface 1501a to the multiplexer/de-multiplexer circuit pack 1520. Similarly, wavelength equalizer WE6 1505f is used to either pass or block wavelengths from the Line 2 interface 1502a to the multiplexer/de-multiplexer circuit pack 1520. The wavelengths from WE1 1505a and WE6 1505f are combined together using optical coupler 1534, and then they are forwarded to the multiplexer/de-multiplexer circuit pack 1520 via optional optical amplifier 1542 through common optical port 1570a.

Wavelength equalizer WE5 1505e is used to either pass or block wavelengths from the multiplexer/de-multiplexer circuit pack 1520 to the Line 1 interface 1501b. It is also used to equalize the power levels of the wavelengths exiting out the Line 1 interface 1501b from the multiplexer/de-multiplexer circuit pack 1520. Similarly, wavelength equalizer WE10 1505j is used to either pass or block wavelengths from the multiplexer/de-multiplexer circuit pack 1520 to Line 2 interface 1502b. WE10 1505j is also used to equalize the power levels of the wavelengths exiting out the Line 2 interface 1502b from the multiplexer/de-multiplexer circuit pack 1520.

Wavelength equalizer WE2 1505b, WE3 1505c, and WE4 1505d are used to either pass or block wavelengths from the Express 1560b-c and Line 2 1502a interfaces to the Line 1 interface 1501b. They are also used to equalize the power levels of the wavelengths exiting out the Line 1 interface 1501b from the Express 1560b-c and Line 2 1502a interfaces. Similarly, wavelength equalizers WE7 1505g, WE8 1505h, and WE9 1505i are used to either pass or block wavelengths from the Line 1 1501a and Express 1560b-c interfaces to the Line 2 interface 1502b. They are also used to equalize the power levels of the wavelengths exiting out the Line 2 1502b interface from the Line 1 1501a and Express 1560b-c interfaces.

Optical couplers 1580a and 1580b are used to broadcast the Express In 1 1560b and Express In 2 1560c optical input signals to both the Line 1 1501b and Line 2 1502b interface directions.

Optional input optical amplifiers 1540a-b are used to optically amplify wavelengths arriving from the Line 1 1501a and 2 Line 2 1502a interfaces.

Optical coupler 1530 is used to broadcast all the wavelengths from the Line 1 interface 1501a to wavelength equalizers WE1 15050a and WE7 1505g, and the Express Out 1 port 1560a. Similarly, optical coupler 1532 is used to broadcast all the wavelengths from the Line 2 interface 1502a to wavelength equalizers WE2 1505b and WE6 1505f, and the Express Out 2 port 1560d.

Optical coupler 1531 is used to combine the wavelengths from wavelength equalizers WE2 1505b through WE5 1505e into one composite WDM signal that is optically amplified with output optical amplifier 1541a. Similarly, optical coupler 1533 is used to combine the wavelengths from wavelength equalizers WE7 1505g through WE10 1505j into one composite WDM signal that is optically amplified with output optical amplifier 1541b.

Optional optical amplifier 1543 receives added wavelengths from the multiplexer/de-multiplexer circuit pack 1520 via common port 1570b, and optically amplifies the wavelengths before forwarding the amplified wavelengths to optical coupler 1535. Optical coupler 1535 is used to broadcast the added wavelengths to the Line 1 interface 1501b, and the Line 2 interface 1502b via WE5 1505e and WE10 1505j respectively.

Located on the multiplexer/de-multiplexer circuit pack 1520 is a plurality (r) of add/drop ports 1561, 1560. Individual wavelengths are added to the multiplexer/de-multiplexer circuit pack and then multiplexed via multiplexer 1551 into a composite WDM signal that is then forwarded to the ROADM circuit pack 1510 via common port 1570b. In the drop direction on 1520, a composite WDM signal is received from common port 1570a of the ROADM circuit pack and then it is de-multiplexed into individual wavelengths using de-multiplexer 1550. Each de-multiplexed wavelength is then forwarded to a specific drop port of the de-multiplexer. The multiplexer and de-multiplexer may be implemented using Arrayed Waveguide Grating (AWG) technology, or some other suitable technology. Devices that process individual wavelengths for transmission—such as optical transponders—can be used to supply and receive wavelengths from the add/drop ports.

Figure 16A:
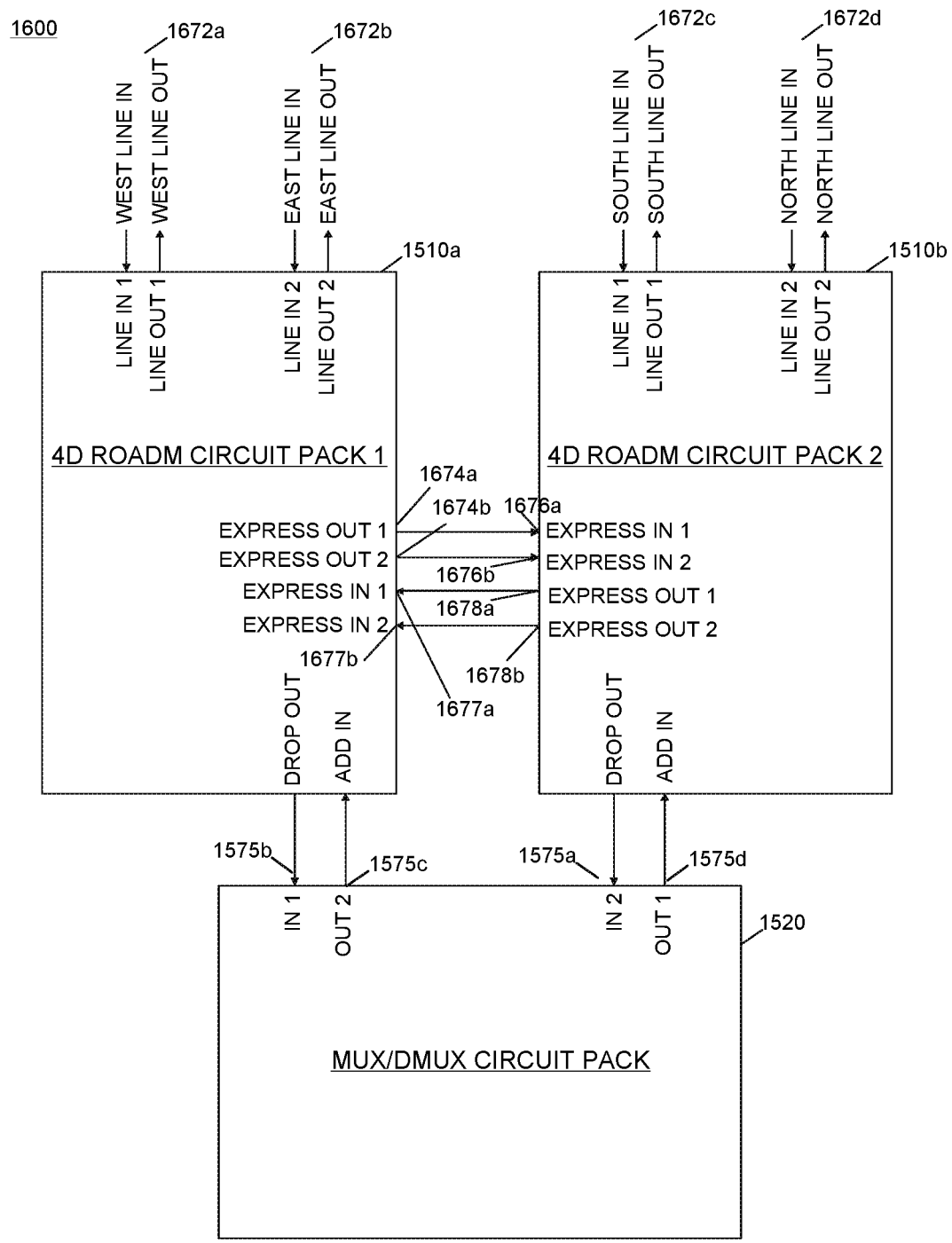
FIG. 16A is an illustration of a 4-degree optical node comprising of two 2-degree ROADMs, with a single external multiplexer/de-multiplexer circuit pack.

It should be noted that multiplexer/de-multiplexer circuit pack 1520 contains two WDM input ports (IN1 1575b and IN2 1575a), and two WDM output ports (OUT1 1575d and OUT2 1575c). This is to allow connection to up to two ROADM circuit packs 1510, as illustrated in FIG. 16A. An optical coupler 1555 is used combine composite WDM signals from two ROADM circuit packs 1510 before forwarding the composite WDM signal to de-multiplexer 1550. An optical coupler 1556 is used to broadcast the composite WDM signal from multiplexer 1551 to two ROADM circuit packs 1510.

As can be seen in 1500, a single multiplexer/de-multiplexer circuit pack 1520 is used to add and drop wavelengths to/from the Line 1 1501a and Line 2 1502a interfaces. Therefore, a transponder that is attached to an add/drop port of the multiplexer/de-multiplexer circuit pack 1520, can forward and receive wavelengths from either of the two degrees of the ROADM circuit pack. Because of this, the add/drop ports are referred to as directionless add/drop ports—meaning the add drop ports are not dedicated to a particular direction of the optical node. If two ROADM circuit packs 1510a-b are paired to form a four-degree optical node (as shown in 1600 of FIG. 16A), wherein ROADM circuit packs 1510a-b are identical to ROADM circuit pack 1510), the optical couplers 1555 and 1556 allow a transponder that is attached to an add/drop port of the multiplexer/de-multiplexer circuit pack 1520 to forward and receive wavelengths from any of the four degrees of the combined two ROADM circuit packs 1510*a* and 1510*b*. The wavelength equalizers (1505*a*, 1505*e*, 1505*f*, and 1505*j*) on the two ROADM circuit packs are used to steer the added and dropped wavelengths to and from each degree by appropriately blocking or passing wavelengths. Therefore, the wavelength equalizers are said to perform directionless steering for the add/drop ports.

Additionally, the wavelength equalizers (1505*b-e* and 1505*g-j*) on the two ROADM circuit packs 1510*a-b* are used to select which wavelengths from the Line input interfaces and add ports are allowed to exit a given output interface (degree), by appropriately blocking or passing wavelengths.

FIG. 16A shows a four-degree optical node 1600. It uses two of the ROADM circuit packs 1510*a* and 1510*b*, and a single multiplexer/de-multiplexer circuit pack 1520. The single multiplexer/de-multiplexer circuit pack 1520 contains two WDM input ports (IN1 1575*b* and IN2 1575*a*), and two WDM output ports (OUT1 1575*d* and OUT2 1575*c*), allowing both the ROADM circuit packs to share a common set of transponders (attached to the add/drop ports on the multiplexer/de-multiplexer circuit pack). The common set of transponders can connect to any of the four degrees (East 1672*b*, West 1672*a*, North 1672*d*, and South 1672*c*). ROADM circuit Pack 1 1510*a* sends all wavelengths it receives from its two line interfaces 1672*a-b* to ROADM circuit Pack 2 1510*b* via ROADM circuit Pack 1's two Express Out ports (1 & 2 1674*a-b*). Similarly, ROADM circuit Pack 2 1510*b* sends all wavelengths it receives from its two line interfaces 1672*c-d* to ROADM circuit Pack 1 1510*a* via ROADM circuit Pack 2's two Express Out ports (1 & 2 1678*a-b*). The result is that both ROADM Circuit Pack 1 1510*a* and Circuit Pack 2 1510*b* have access to all wavelengths received from all four degrees of the optical node.

In 1600, Express OUT 1 1674*a*, Express OUT2 1674*b*, Express IN 1 1677*a*, and Express IN 2 1677*b*, correspond to the same signals Express OUT 1 1560*a*, Express OUT2 1560*d*, Express IN 1 1560*b*, and Express IN 2 1560*c* in 1500 respectively. Similarly, in 1600, Express OUT 1 1678*a*, Express OUT2 1678*b*, Express IN 1 1676*a*, and Express IN 2 1676*b*, correspond to the same signals Express OUT 1 1560*a*, Express OUT2 1560*d*, Express IN 1 1560*b*, and Express IN 2 1560*c* in 1500 respectively.

Figure 16B:
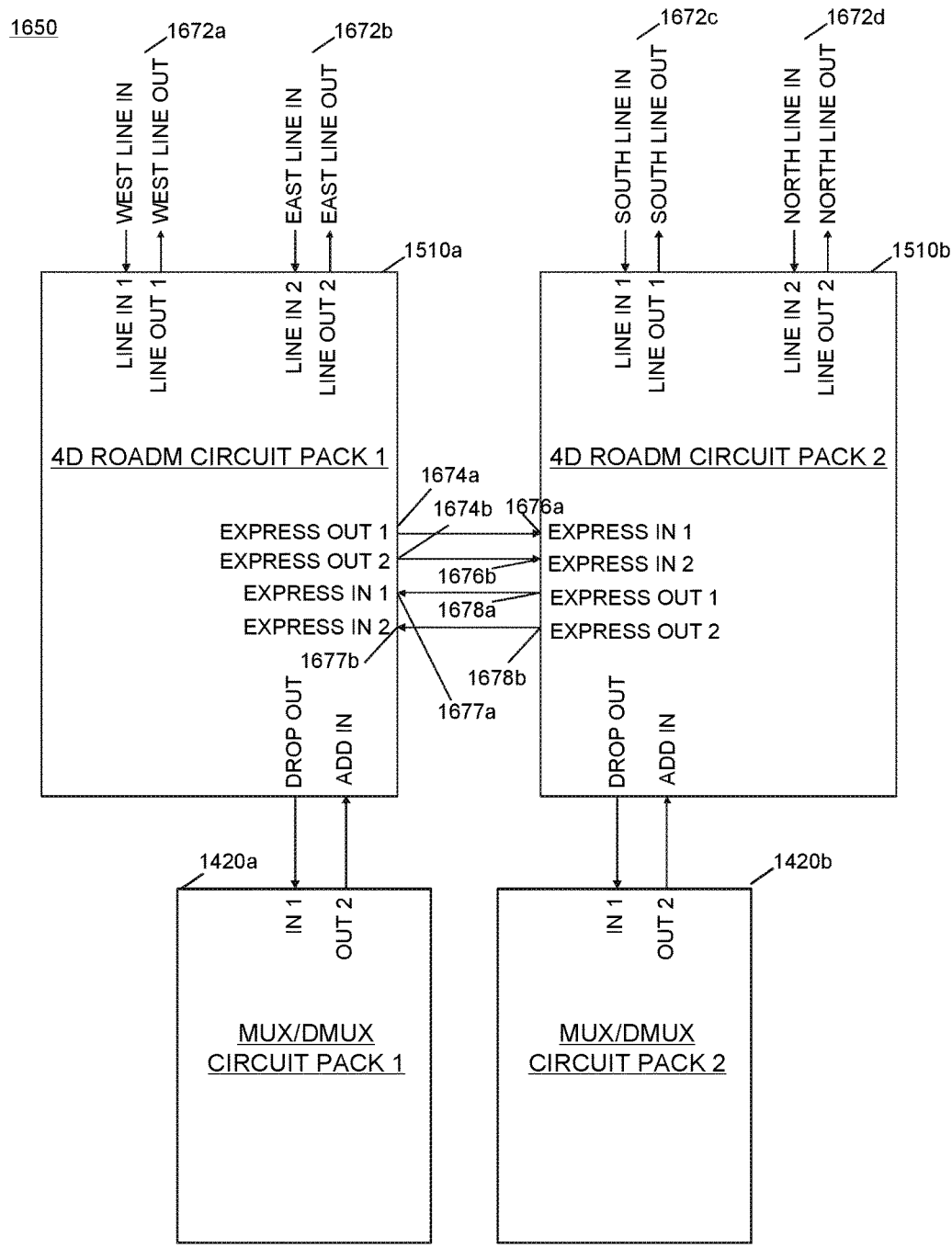
FIG. 16B is an illustration of a 4-degree optical node comprising of two 2-degree ROADMs, with two external multiplexer/de-multiplexer circuit packs.

FIG. 16B shows a four-degree optical node 1650. It uses two of the ROADM circuit packs 1510*a-b*, and two multiplexer/de-multiplexer circuit packs 1420*a-b*. (Alternatively, it could also use multiplexer/de-multiplexer circuit packs 1520, and just use only one pair of IN/OUT ports.) Using two multiplexer/de-multiplexer circuit packs provides some added reliability. A drawback is that a given transponder attached to an add/drop port of one of the multiplexer/de-multiplexer circuit packs will only be able to communicate through the two optical degrees associated with the ROADM that the multiplexer/de-multiplexer circuit pack is attached to. So, in this case, the add/drop ports are directionless, but a given transponder is only able to send and receive wavelengths from two of the four degrees.

The two multiplexer/de-multiplexer circuit packs 1520, 1420 may contain active components (i.e., components requiring electrical power in order to operate), or they may contain only passive components (athermal AWGs, for example). If the multiplexer/de-multiplexer circuit packs contain only passive components, then the multiplexer/de-multiplexer circuit packs could optionally be placed outside of the electrical shelf that is holding the ROADM circuit packs.

Figure 17:
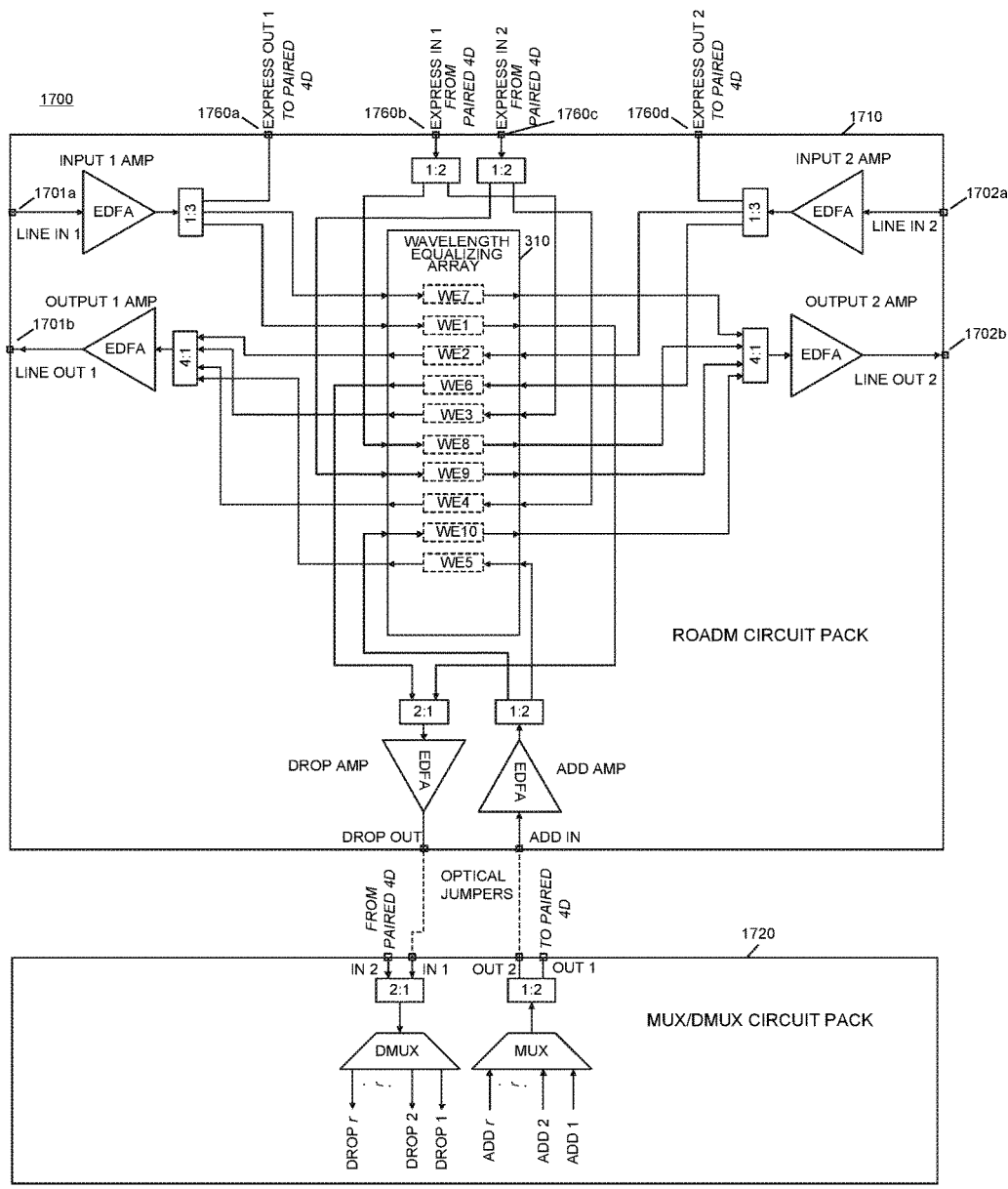
FIG. 17 is an illustration of a two-degree optical node utilizing a wavelength equalizing array comprising of a two degree ROADM on a circuit pack that can be expanded to a four degree optical node, with an external multiplexer/de-multiplexer circuit pack.

FIG. 17 shows a two-degree optical node 1700 that is identical to the optical node 1500, except that a single wavelength equalizing array is used to supply all the required wavelength equalizers needed to construct the optical node. (Alternatively, multiple smaller wavelength equalizing arrays could be utilized.) The wavelength equalizers WE1-WE10 in 1700 correspond to the wavelength equalizers WE1-WE10 in 1500. The single wavelength equalizing array 310 may be identical to the wavelength equalizing array 310 discussed in reference to FIG. 3.

A single ROADM circuit pack 1710 supplies all the required optical circuitry to support two optical degrees, including input and output amplifiers for each degree, an optical common port connectable to a plurality of directionless add/drop ports, optical supervisory channel circuitry (not shown), optical channel monitoring (not shown), and a single wavelength equalizing array 310 that is used to both select wavelengths for each degree and to perform directionless steering for the add/drop ports.

The ROADM circuit pack can be used as a stand-alone ROADM in a two-degree node, or it can be paired with a second identical ROADM circuit pack in order to form a four-degree node. The four Express ports (Express Out 1&2 1760*ad* and Express In 1&2 1760*b,c*) are used to interconnect the two ROADMs in the same manner as shown in FIG. 16A.

As can be seen in 1700, a single multiplexer/de-multiplexer circuit pack 1720 is used to add and drop wavelengths to/from the Line 1 1701*a-b* and Line 2 1702*a-b* interfaces. Therefore, a transponder that is attached to an add/drop port of the multiplexer/de-multiplexer circuit pack 1720, can forward and receive wavelengths from either of the two degrees of the ROADM circuit pack. If a second ROADM circuit pack is added to the optical node, a transponder that is attached to an add/drop port of the multiplexer/de-multiplexer circuit pack 1720, can forward and receive wavelengths from any of the four degrees of the resulting optical node. The wavelength equalizers on the ROADM circuit pack are used to steer the added and dropped wavelengths to and from each degree by appropriately blocking or passing wavelengths. Therefore, the wavelength equalizers are said to perform directionless steering for the add/drop ports for each degree.

Additionally, the wavelength equalizers on the ROADM circuit pack 1710 are used to select which wavelengths from the Line input interfaces are allowed to exit a given output Line interface (degree), by appropriately blocking or passing wavelengths.

The ROADM circuit pack is constructed on one or more printed circuit boards that are bound together electrically and mechanically so that the circuit pack can be plugged into a backplane as a single entity. The ROADM circuit pack additionally contains a front panel (used to house the optical connectors associated with the optical ports on the ROADM), electrical control circuitry (used to take in user commands needed to control the ROADM), power supply circuitry (used to provide the various voltage levels and electrical currents needed to power the various components on the ROADM), and one or more backplane connectors (needed to connect electrical signals on the ROADM to signals on the back plane that the ROADM card is plugged into).

Alternatively, the optical multiplexer/de-multiplexer circuitry on the multiplexer/de-multiplexer circuit pack 1720 could be placed on the ROADM circuit pack 1710, thus eliminating a circuit pack in the optical node.

The add/drop ports on the multiplexer/de-multiplexer circuit pack 1720 are considered to be colored add/drop ports. This is because each add/drop port is used to support a particular optical frequency (wavelength). So therefore, add/drop port 1 will only support wavelength frequency 1, and therefore a transponder attached to add/drop port 1 must only generate wavelength frequency 1. An alternative (not shown) is to supply an alternative multiplexer/de-multiplexer circuit pack that contains colorless add/drop ports. A colorless add/drop port can be used to support any of the r wavelength frequencies associated with the ROADM circuit pack, and therefore a transponder attached to add/drop port 1 is allowed to generate any of the r wavelength frequencies.

The wavelength equalizing array saves physical space and electrical power by utilizing common optics and electronics for all the wavelength equalizers in the array, thus making it more suitable for compact edge-of-network applications. The single wavelength equalizing array also provides a means to simplify the construction of the ROADM circuit pack that it is placed upon.

In summary, this invention presents an embodiment of an optical node 1600 comprising of four optical degrees, and further comprising of a plurality of directionless add/drop ports 1561, 1560, and including a first circuit pack 1510*a* and a second circuit pack 1510*b*, wherein each circuit pack interfaces to at least two of the four optical degrees 1672*a-d*. The node additionally contains at least one wavelength equalizing array 310. The optical node 1600 may further include a third circuit pack 1520/1720, containing the plurality of directionless add/drop ports 1561, 1560, and wherein the first and second circuit packs 1510*a-b* direct wavelengths to and from the third circuit pack. The first and second circuit packs may be ROADM circuit packs, each comprising of a single wavelength equalizing array and a common port connectable to a plurality of directionless add/drop ports, wherein each ROADM circuit pack interfaces to at least two of the four optical degrees, and wherein each wavelength equalizing array is used to both select wavelengths for the optical degrees and to perform directionless steering for the plurality of directionless add/drop ports.

Figure 18:
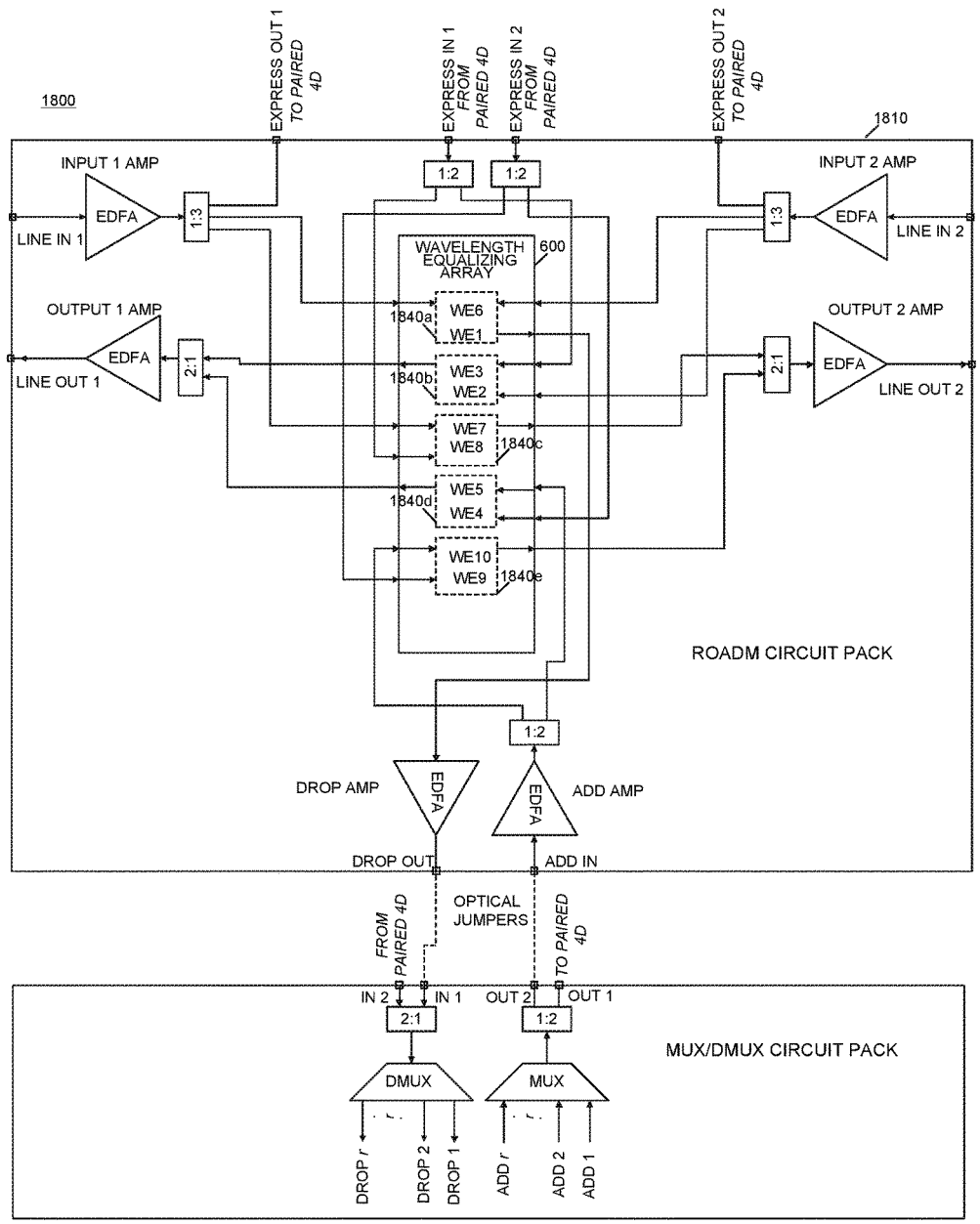
FIG. 18 is an illustration of an alternative embodiment of an optical node comprising of a two degree ROADM on a circuit pack that can be expanded to a four degree optical node, with an external multiplexer/de-multiplexer circuit pack.

FIG. 18 shows a two-degree optical node 1800 that is identical to the optical node 1500, except that a single wavelength equalizing array 600 is used to supply all the required wavelength equalizers needed to construct the optical node. The wavelength equalizing array that is used is the wavelength equalizing array that was described in reference to FIG. 6. This wavelength equalizing array can be configured to perform the function of multiple 1 by 2 WSS functions. Therefore, the function of the optical coupler 1534 of optical node 1500 is additionally absorbed within the wavelength equalizing array 600. Also, the functions of optical couplers 1531 and 1533 are partially absorbed within the array 600 in 1800. The 2 by 1 WSS function 1840*a* performs the function of WE1 1505*a*, WE6 1505*f*, and optical coupler 1534 within optical node 1500, while the 2 by 1 WSS function 1840*b* performs the function of WE2 1505*b*, WE3 1505*c*, and partially optical coupler 1531 within optical node 1500, and the 2 by 1 WSS function 1840*c* performs the function of WE7 1505*g*, WE8 1505*h*, and partially optical coupler 1533 within optical node 1500, and the 2 by 1 WSS function 1840*d* performs the function of WE4 1505*d*, WE5 1505*e*, and partially optical coupler 1531 within optical node 1500, and the 2 by 1 WSS function 1840*e* performs the function of WE9 1505*i*, WE10 1505*j*, and partially optical coupler 1533 within optical node 1500. As can be seen from the figure, using the wavelength equalizing array 600 in place of wavelength equalizing array 310 further simplifies the ROADM circuit pack due to its additional level of integration.

Although a wavelength equalizing array of 2 by 1 WSS functions was utilized to build ROADM circuit pack 1800, a wavelength equalizing array that can be configured for either 4 by 1 WSS functions or 2 by 1 WSS functions could be used instead, in order to eliminate additional circuitry. For instance, a first 4 by 1 WSS could absorb WE2 1505*b*, WE3 1505*c*, WE4 1505*d*, WE5 1505*e*, and coupler 1531 on the ROADM circuit pack 1500. Similarly, a second 4 by 1 WSS could absorb WE7 1505*g*, WE8 1505*h*, WE9 1505*i*, WE10 1505*j*, and coupler 1533 on the ROADM circuit pack 1500. A 2 by 1 WSS could absorb WE1 1505*a*, WE6 1505*f*, and coupler 1534 on the ROADM circuit pack 1500. Therefore, different ROADM circuit packs can be constructed such that they are built using a single wavelength equalizing array wherein different size WSS functions are utilized within the array.

In general, an optical node or ROADM circuit pack could be constructed using a wavelength equalizing array that can be partitioned into an array of $k_1$ 1×1, $k_2$ 1×2, $k_3$ 1×3 . . . , $k_p$ 1×p wavelength selective switches, where p is any integer number greater than 1, and $k_1$ is any integer value greater than or equal to 0. A single type of wavelength equalizing array could be used to build different types of ROADM circuit packs. For instance, wavelength equalizing array 350 (FIG. 3) could be used to build a two-degree ROADM circuit pack 1010, a three-degree ROADM circuit pack 1310, or a four-degree capable ROADM circuit pack 1710. Similarly, wavelength equalizing array 800 (FIG. 8) could be used to build a two-degree ROADM circuit pack 1110, a three-degree ROADM circuit pack 1410, or a four-degree capable ROADM circuit pack 1810.

Although in 1800 two ROADM circuit packs are required to construct a four-degree optical node, all four degrees can be placed on a single ROADM circuit pack. In order to build the four degree ROADM using a single ROADM circuit pack, a wavelength equalizing array of 20 wavelength equalizers would be required—five for each of the four degrees. Alternatively, two wavelength equalizers with 10 wavelength equalizers each could be used.

Additionally, optical nodes containing greater than four degrees could be constructed by extending the concepts used to construct the three and four degree nodes.

Figure 19:
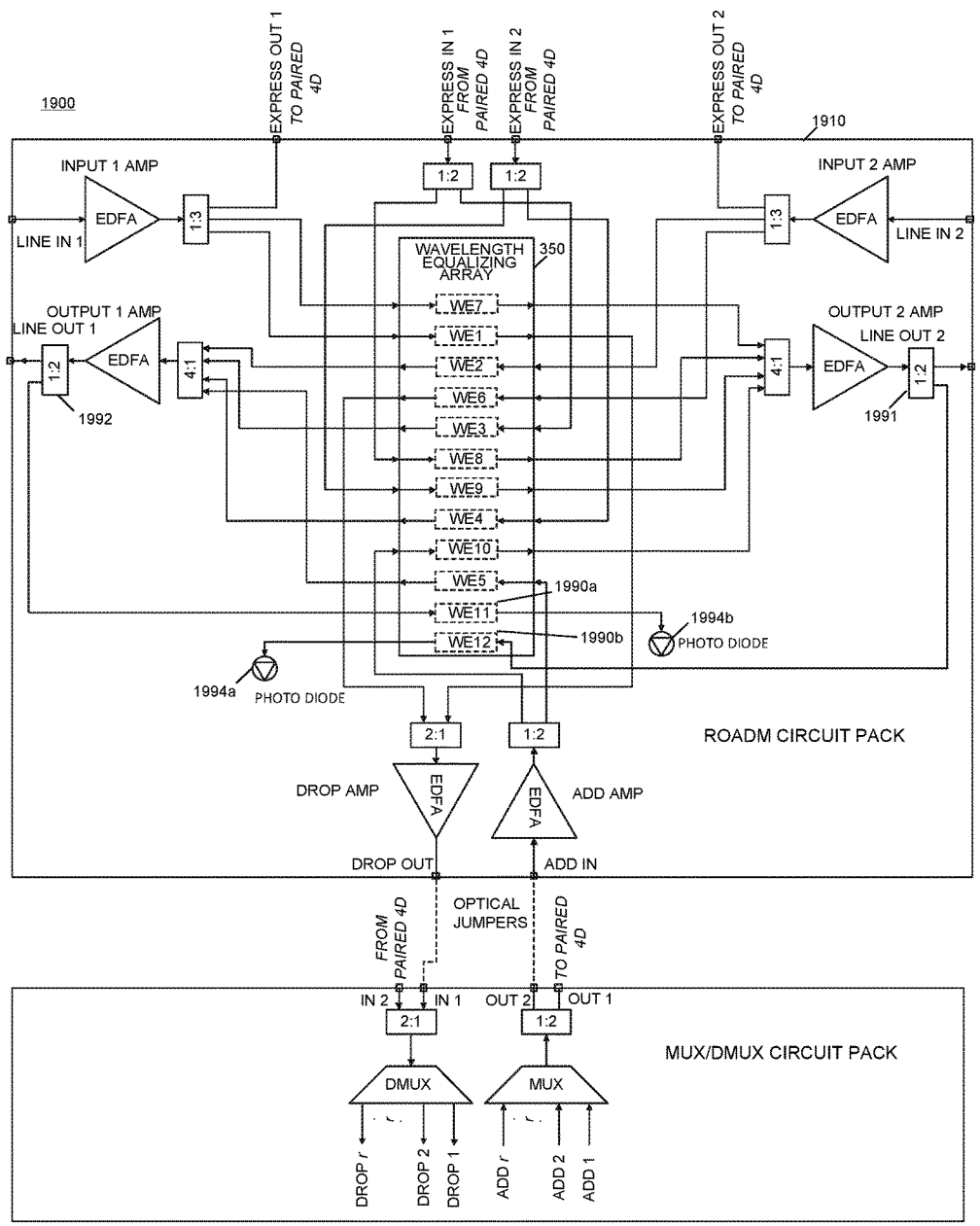
FIG. 19 is an illustration of an optical node comprising of a 2-degree ROADM on a circuit pack that contains two optical channel monitors utilizing photo diodes.

FIG. 19 shows a two-degree optical node 1900 that is identical to the optical node 1700, except that two-additional wavelength equalizing arrays 1990*a-b* are used to support optical channel monitor functions. As shown in FIG. 19, an additional 1 to 2 coupler 1991 & 1992 has been added after the output of each of the two output amplifiers within ROADM circuit pack 1910. The couplers are used to send a portion of the light from each output amplifier to the wavelength equalizers 1990*a-b*. Operationally, each of the two newly added wavelength equalizers 1990*a-b* are used to cycle through all r wavelengths exiting the two line interfaces in order to measure the optical power of each wavelength using photo diodes 1994*a-b*.

Figure 20:
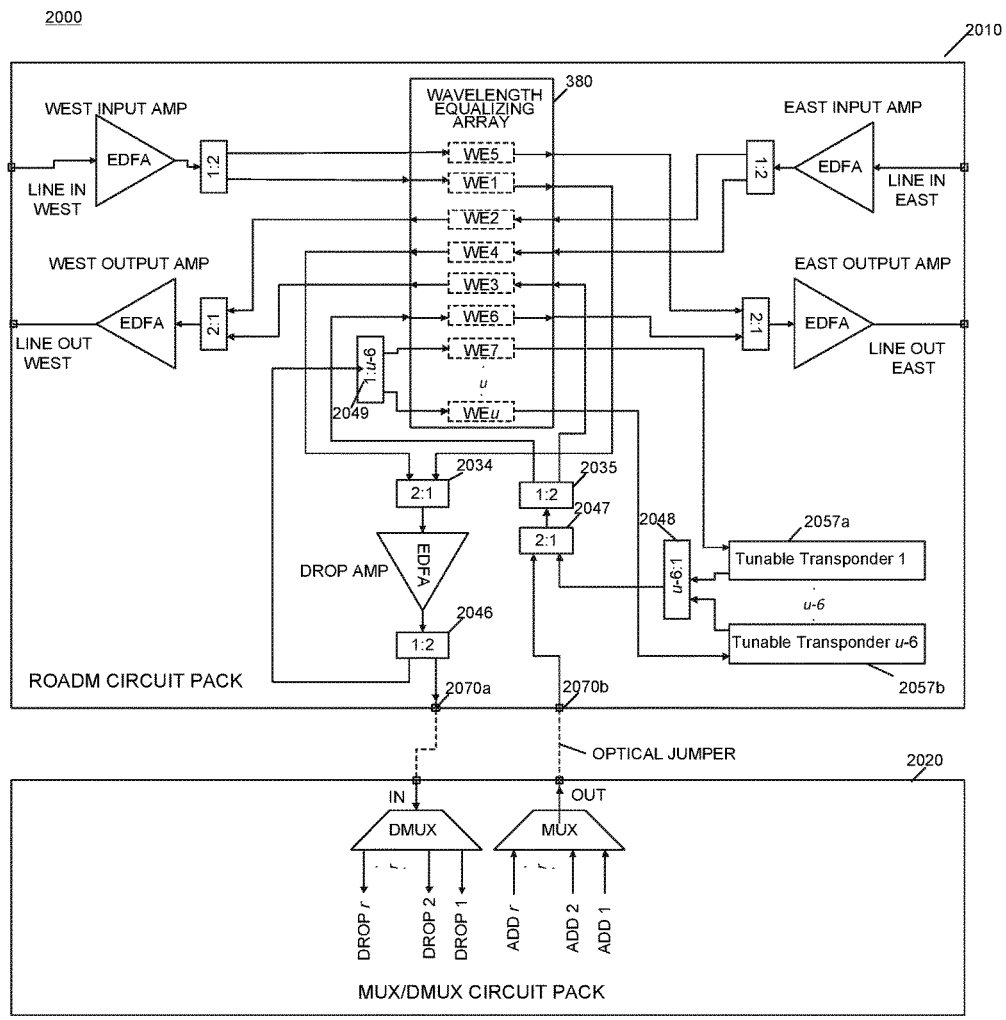
FIG. 20 is an illustration of an optical node comprising of a two degree ROADM on a circuit pack with internal transponders, and an external multiplexer/de-multiplexer circuit pack.

FIG. 20 shows a two-degree optical node 2000 that is similar to the optical node 1000, except that u–6 internal transponders 2057*a-b* are integrated in the ROADM circuit pack 2010 (wherein u may be any integer value greater than six). A wavelength equalizing array 380 with u wavelength equalizers is used. Each additional wavelength equalizer beyond six is used to filter out a single wavelength that is then dropped to an integrated transponder. Four optical couplers 2046-2049 are added to the node of 1000. Coupler 2048 is a (u–6): 1 coupler used to combine the output wavelengths from the u–6 internal transponders. Coupler 2047 is used to combine the wavelengths from the internal transponders with the wavelengths from the multiplexer (via common port 2070b) within the multiplexer/de-multiplexer circuit pack 2020. An optical amplifier (not shown) could optionally be placed at the output of optical coupler 2047. Optical coupler 2035 is then used to broadcast the wavelengths from the internal transponders and from the multiplexer/de-multiplexer circuit pack to both degrees—allowing the wavelengths from the internal transponders to be directionless.

In the drop direction, new coupler 2046 is used to broadcast all the dropped wavelengths received from both degrees to both the multiplexer/de-multiplexer circuit pack (via common port 2070a) and to coupler 2049. Coupler 2049 is a 1: (u–6) coupler used to broadcast all the dropped wavelengths received from both degrees to the u–6 wavelength equalizers that are used to filter wavelengths for the u–6 internal transponders.

A ROADM circuit pack with integrated transponders 2010 allows for especially compact optical nodes, as no external transponders are required for cases where a small number of wavelengths are added and dropped.

Figure 21:
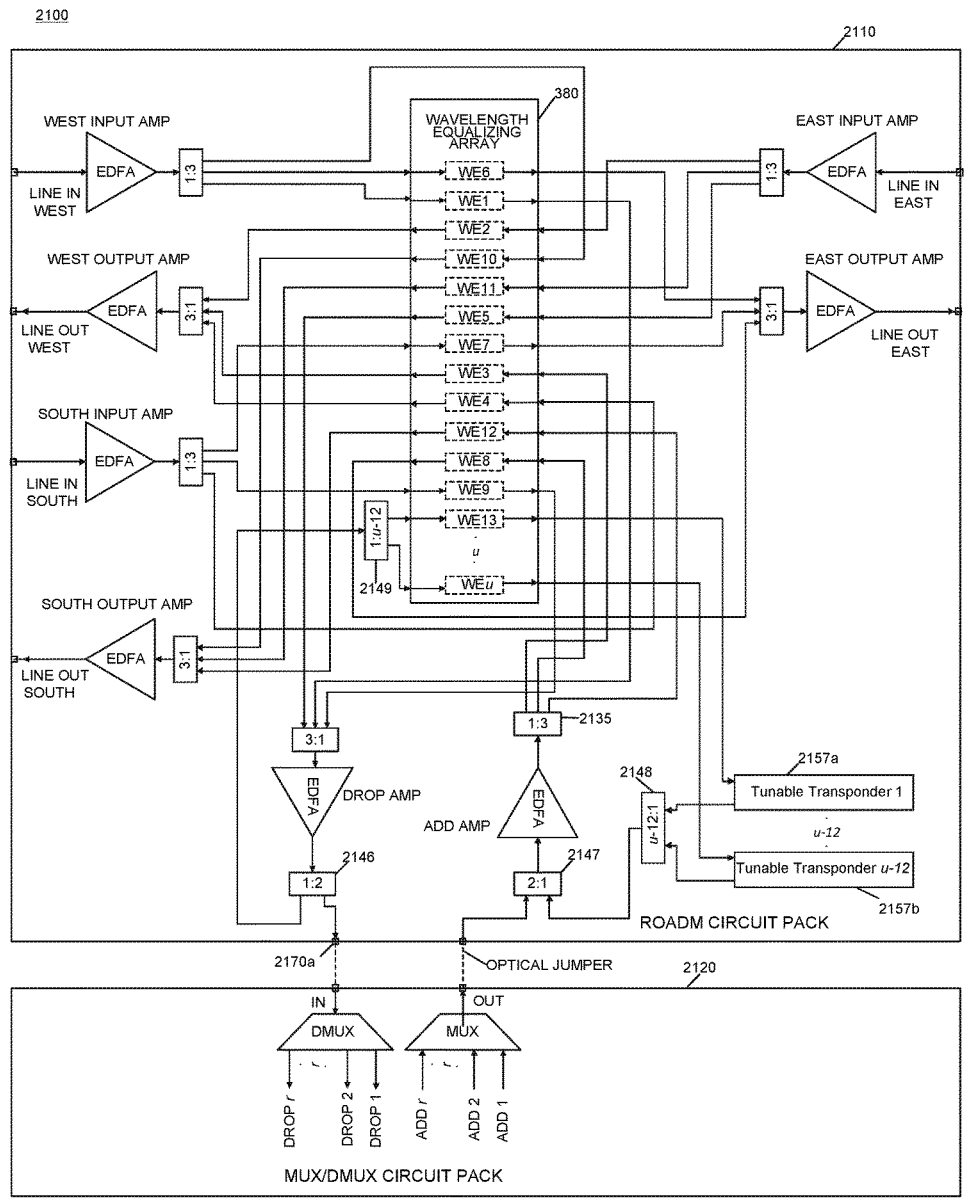
FIG. 21 is an illustration of an optical node comprising of a three degree ROADM on a circuit pack with internal transponders, and an external multiplexer/de-multiplexer circuit pack.

FIG. 21 shows a three-degree optical node 2100 that is similar to the optical node 1300, except that u–12 internal transponders are integrated in the ROADM circuit pack 2110 (wherein u may be any integer value greater than twelve). A wavelength equalizing array 380 with u wavelength equalizers is used. Each additional wavelength equalizer beyond twelve is used to filter out a single wavelength that is then dropped to an integrated transponder. Four optical couplers 2146-2149 are added to the node of 1300. Coupler 2148 is a (u–12): 1 coupler used to combine the output wavelengths from the u–12 internal transponders 2157a-b. Coupler 2147 is used to combine the wavelengths from the internal transponders with the wavelengths from the multiplexer within the multiplexer/de-multiplexer circuit pack 2120. An optical amplifier is optionally placed at the output of optical coupler 2147. Optical coupler 2135 is then used to broadcast the wavelengths from the internal transponders and from the multiplexer/de-multiplexer circuit pack to all three degrees—allowing the wavelengths from the internal transponders to be directionless.

In the drop direction, new coupler 2146 is used to broadcast all the dropped wavelengths received from all three degrees to both the multiplexer/de-multiplexer circuit pack 2120 (via common port 2170a) and to coupler 2149. Coupler 2149 is a 1: (u–12) coupler used to broadcast all the dropped wavelengths received from all three degrees to the u–12 wavelength equalizers that are used to filter wavelengths for the u–12 internal transponders.

Figure 22:
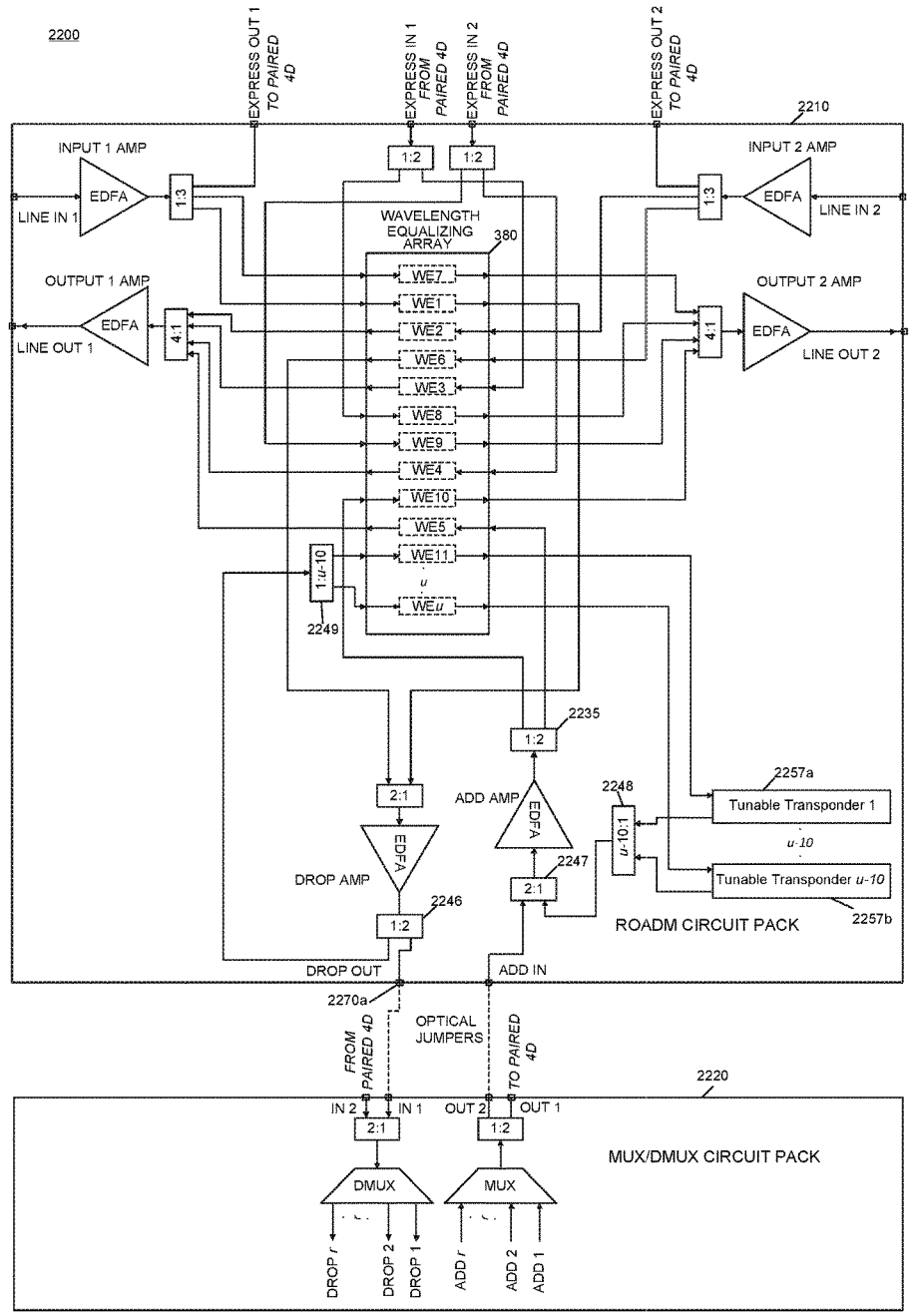
FIG. 22 is an illustration of a first embodiment of an optical node comprising of an expandable two degree ROADM on a circuit pack with internal transponders, and an external multiplexer/de-multiplexer circuit pack.

FIG. 22 shows an expandable (to four degrees) two-degree optical node 2200 that is similar to the optical node 1700, except that u–10 internal transponders are integrated in the ROADM circuit pack 2210 (wherein u may be any integer value greater than ten). A wavelength equalizing array 380 with u wavelength equalizers is used. Each additional wavelength equalizer beyond ten is used to filter out a single wavelength that is then dropped to an integrated transponder. Four optical couplers 2246-2249 are added to the node of 1700. Coupler 2248 is a (u–10): 1 coupler used to combine the output wavelengths from the u–10 internal transponders. Coupler 2247 is used to combine the wavelengths from the internal transponders with the wavelengths from the multiplexer within the multiplexer/de-multiplexer circuit pack 2220. An optical amplifier is optionally placed at the output of optical coupler 2247. Optical coupler 2235 is then used to broadcast the wavelengths from the internal transponders and from the multiplexer/de-multiplexer circuit pack to both degrees on the circuit pack—allowing the wavelengths from the internal transponders to be directionless with respect to the two degrees on the circuit pack.

In the drop direction, new coupler 2246 is used to broadcast all the dropped wavelengths received from both degrees on the circuit pack to both the multiplexer/de-multiplexer circuit pack (via common port 2270a) and to coupler 2249. Coupler 2249 is a 1: (u–10) coupler used to broadcast all the dropped wavelengths received from both degrees to the u–10 wavelength equalizers that are used to filter wavelengths for the u–10 internal transponders.

Figure 23:
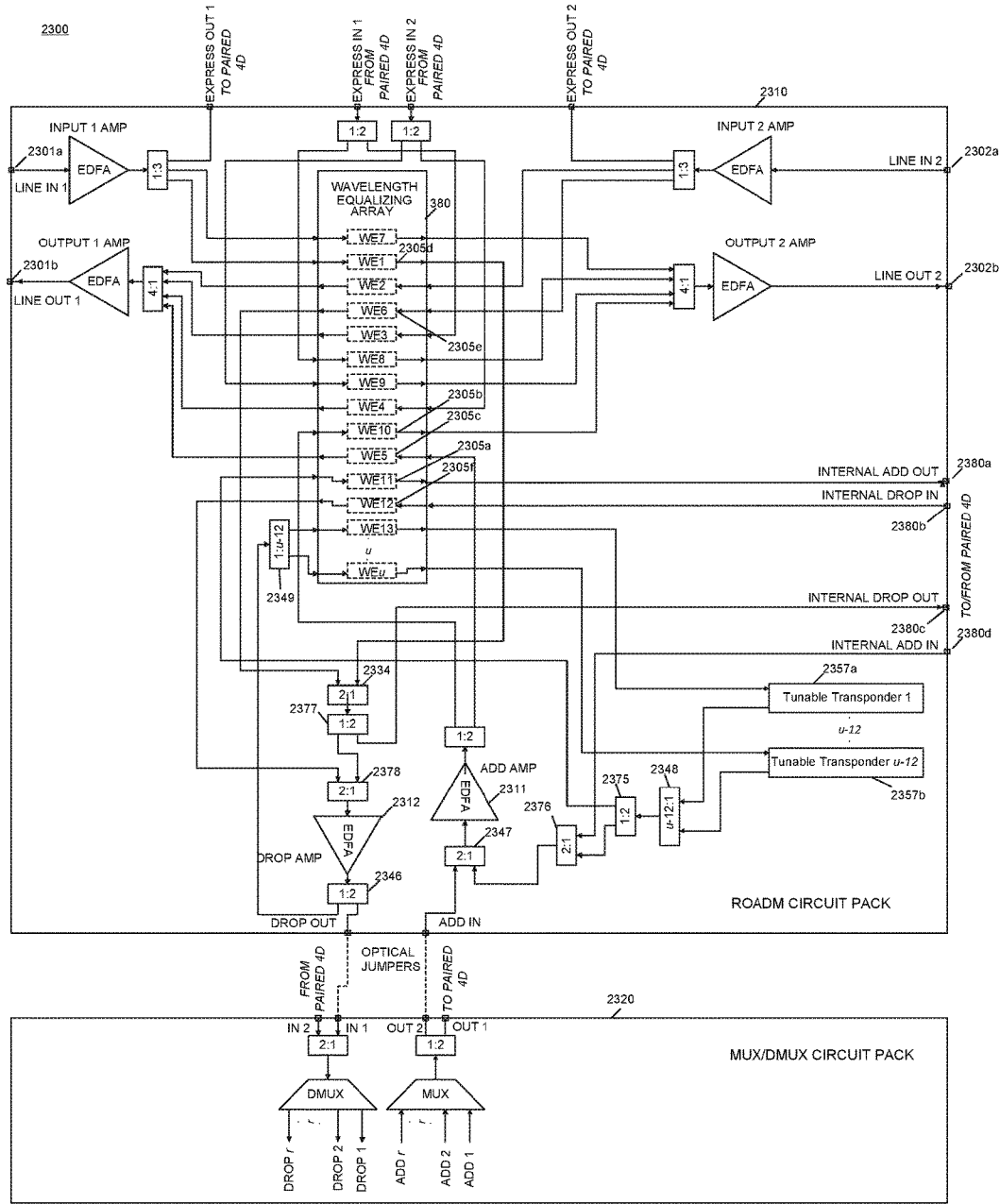
FIG. 23 is an illustration of a second embodiment of an optical node comprising of an expandable two degree ROADM on a circuit pack with internal transponders, and an external multiplexer/de-multiplexer circuit pack.

A drawback of the optical node 2200 is that the u–10 internal transponders can only send to and receive from the two degrees of the circuit pack that they reside on. Optical node 2300 in FIG. 23 overcomes this limitation. The u–12 internal transponders 2357a-b within ROADM circuit pack 2310 can send and receive to and from any of the four degrees when two ROADM circuit packs 2310 are paired together to form a four degree node. This is accomplished by using an additional four-fiber interconnection between the two paired ROADM circuit packs. In FIG. 23 the four additional signals that are passed between the two ROADM circuit packs are labeled: Internal Add Out 2380a, Internal Add In 2380d, Internal Drop Out 2380c, and Internal Drop In 2380b. Four optical couplers are added to the ROADM circuit pack 2210: 2375-2378. Coupler 2375 is used to broadcast the composite signal from coupler 2348 containing the generated wavelengths from all u–12 internal transponders to both optical coupler 2376 and Wavelength Equalizer WE11 (2305a). Wavelength Equalizer WE11 (2305a) is used to block or pass any of the internally generated wavelengths to the paired ROADM circuit pack (the second ROADM circuit pack). This is a useful feature if an internally generated wavelength of a particular frequency is already being injected on the paired ROADM circuit pack. The output of WE11 (2305a) is sent to the optical connector labeled Internal Add Out 2380a on the first ROADM circuit pack. Internal Add Out 2380a on the first ROADM circuit pack is connected to Internal Add In on the second ROADM circuit pack via an optical jumper, and vice versa. The wavelengths arriving on the optical connector labeled Internal Add In on the second ROADM circuit pack are forwarded to the optical coupler 2376 on the second ROADM circuit pack, where they are combined with the internal generated wavelengths of the second circuit pack. Therefore, the signal exiting coupler 2376 contains the internally generated wavelengths of the second ROADM circuit pack, and any internally generated wavelengths from the first ROADM circuit pack that will be forwarded to at least one of the two degrees of the second ROADM circuit pack. All of these wavelengths are then combined with the wavelengths from the multiplexer/de-multiplexer circuit pack 2320 using optical coupler 2347. The resulting signals are optionally amplified by the ADD Amp 2211, and then broadcasted to both WE10 (2305b) and WE5 (2305c). WE10 (2305b) is used to pass or block wavelengths to Line Out 2 (2302b), while WE5 (2305c) is used to pass or block wavelengths to Line Out 1 (2301b). Therefore, it can be seen that internally generated wavelengths from the first ROADM circuit pack can be forwarded to both degrees of the paired second ROADM circuit pack.

In the drop direction, wavelengths to be dropped from the Line In 1 (2301a) and Line In 2 (2302a) interfaces on the first ROADM circuit pack are selected via WE1 (2305d) and WE6 (2305e). These two sets of wavelengths to be dropped are combined using coupler 2334. The composite WDM signal from 2334 is broadcasted to optical coupler 2378 and the optical connector labeled Internal Drop Out 2380c using optical coupler 2377. All of the dropped signals from the first ROADM circuit pack are sent to the second ROADM circuit pack via the optical connector labeled Internal Drop Out 2380c on the first ROADM circuit pack. The optical connector labeled Internal Drop Out 2380c on the first ROADM circuit pack is connected to the optical connector labeled Internal Drop In on the second ROADM circuit pack using an optical jumper. Therefore, all the dropped wavelengths from the first ROADM circuit pack are made available to the second ROADM circuit pack via the connector labeled Internal Drop In on the second ROADM circuit pack. The wavelengths arriving on the connector labeled Internal Drop In on the second ROADM circuit pack are forwarded to Wavelength Equalizer WE12 (2305f) on the second circuit pack. WE12 (2305f) can be used to block any wavelengths that are not being dropped on the second ROADM circuit pack. Typically, WE12 (2305f) should block all wavelengths other than the wavelengths destined for internal transponders on the second ROADM circuit pack. The wavelengths that are not blocked by WE12 (2305f) are combined with the wavelengths being dropped from the Line 1 (2301a) and Line 2 (2302a) interfaces on the second ROADM circuit pack using coupler 2378 on the second ROADM circuit pack. The combined signals are optionally amplified by the Drop Amp 2312 on the second ROADM circuit pack, and then broadcasted to both the multiplexer/de-multiplexer circuit pack 2320 and optical coupler 2349 via coupler 2346. Coupler 2349 broadcasts its inputted signal to the entire group of the u–12 Wavelength Equalizers used to filter out individual drop wavelengths for the internal transponders on the second ROADM circuit pack. In this manner, wavelengths dropped from any of the four degrees in a four-degree node can be forwarded to any internal transponder on either of the two paired ROADM circuit packs (assuming all wavelength blocking is accounted for). The two wavelength equalizers WE11 (2305a) and WE12 (2305f) can be used to isolate the add/drop signals associated with the paired ROADM circuit packs.

Figure 24:
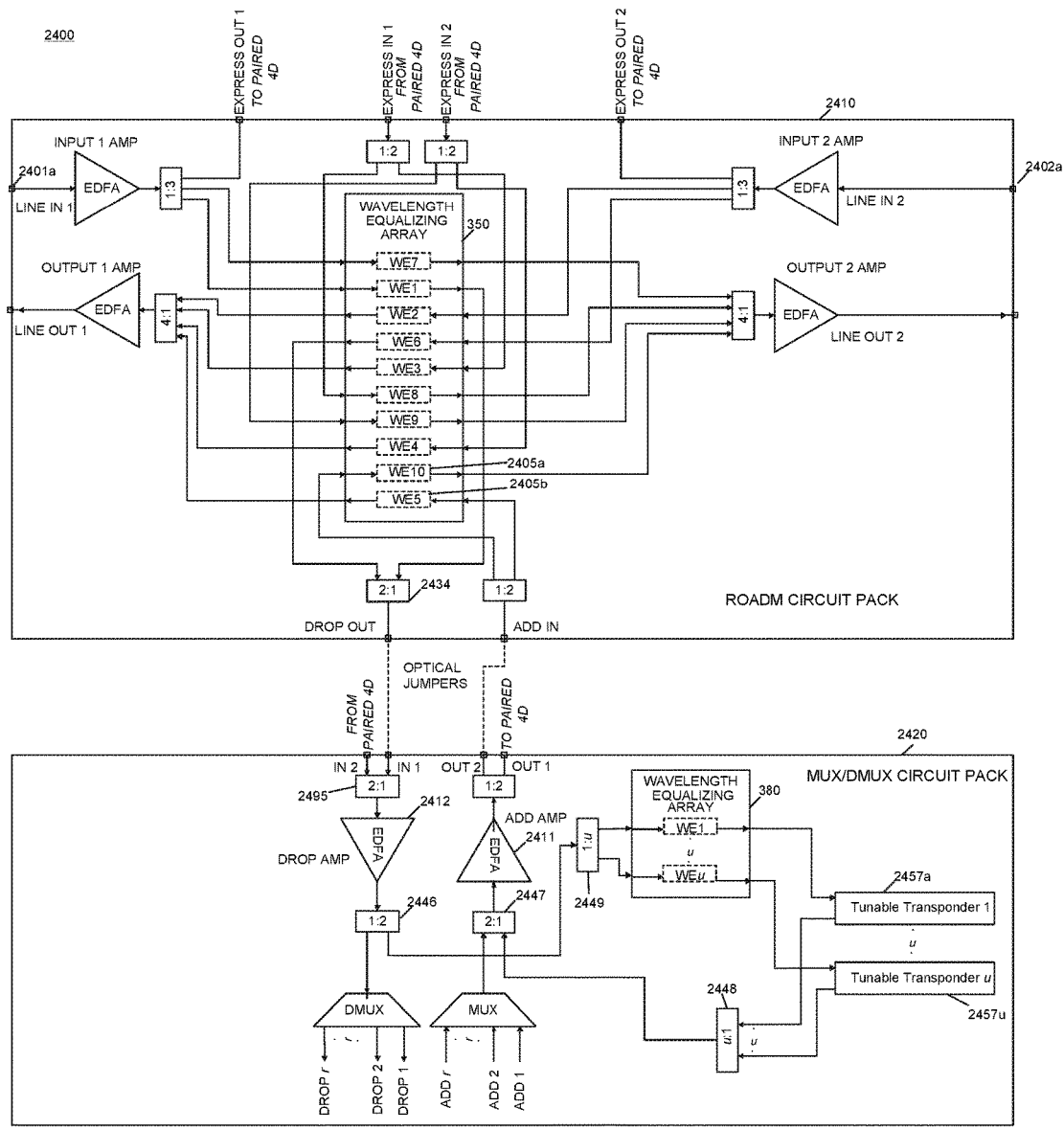
FIG. 24 is an illustration of a third embodiment of an optical node comprising of an expandable two degree ROADM on a circuit pack, and an external multiplexer/de-multiplexer circuit pack with internal transponders.

The optical node 2400 with wavelength equalizing array 350 shown in FIG. 24 is an alternative to optical node 2300. In the optical node 2400, the internal transponders can send and receive wavelengths from any of the four degrees when a four-degree node is created using two of the ROADM circuit packs 2410, but instead of the internal transponders being located within the ROADM circuit packs they are instead located within the multiplexer/de-multiplex circuit pack 2420. This greatly simplifies the design, but a separate wavelength equalizing array 380 is now required in the node for the multiplexer/de-multiplex circuit pack. In the add direction, the output from u number of transponders are combined using optical coupler 2448. The composite WDM signal from coupler 2448 is then combined with the composite WDM signal from the multiplexer (MUX) via coupler 2447. The resulting signal is optionally amplified by the Add Amp 2411, and then broadcasted to both ROADM circuit packs (only one shown) attached to the multiplexer/de-multiplex circuit pack 2420. In this manner, any signal generated by the transponders internal to the multiplexer/de-multiplex circuit pack 2420 are able to be inserted into either of the two degrees on the two ROADM circuit packs (via WE5 (2405b) and WE10 (2405a)).

In the drop direction, wavelengths being dropped from both Line In 1 (2401a) and Line In 2 (2402a) on a given ROADM circuit pack are combined using coupler 2434, and then forwarded to the multiplexer/de-multiplex circuit pack 2420. Coupler 2495 is then used to combine dropped signals from both ROADM circuit packs into one composite WDM signal that is amplified by the Drop Amp 2412 and then broadcasted to both the DMUX and optical coupler 2449 via coupler 2446. Coupler 2449 is used to broadcast all of the dropped channels from both ROADM circuit packs to all of the u wavelength equalizers within the wavelength equalizing array 380. Each of the u wavelength equalizers is used to select a single wavelength for its corresponding internal transponder 2457a-u. Therefore, in this manner, each of the u internal transponders has access to all of the dropped wavelengths associated with all four degrees.

Although only a single common optical port is shown on the ROADM circuit packs of the optical nodes 1000, 1300, 1700, 1900, 2000, 2100, 2200, 2300, 2400, and 2500, the invention is not limited to a single common port on a given ROADM circuit pack, and in fact, a given ROADM circuit pack may contain any number of common ports C. Each common port requires two wavelength equalizers per degree, with one of the two wavelength equalizers being used in the drop direction, and with one of the two wavelength equalizers being used in the add direction—each wavelength equalizer being used in the same manner as was shown for the ROADM circuit packs containing only a single common port.

Figure 25:
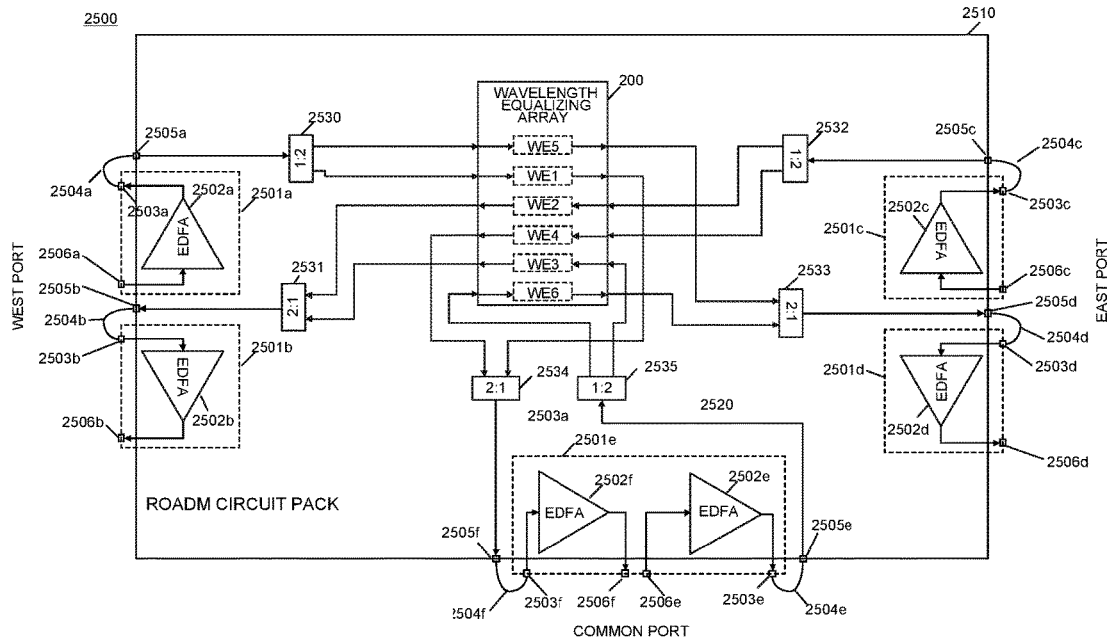
FIG. 25 is an illustration of a ROADM circuit pack comprising of a wavelength equalizing array and front panel pluggable amplifiers.
Figure 26:
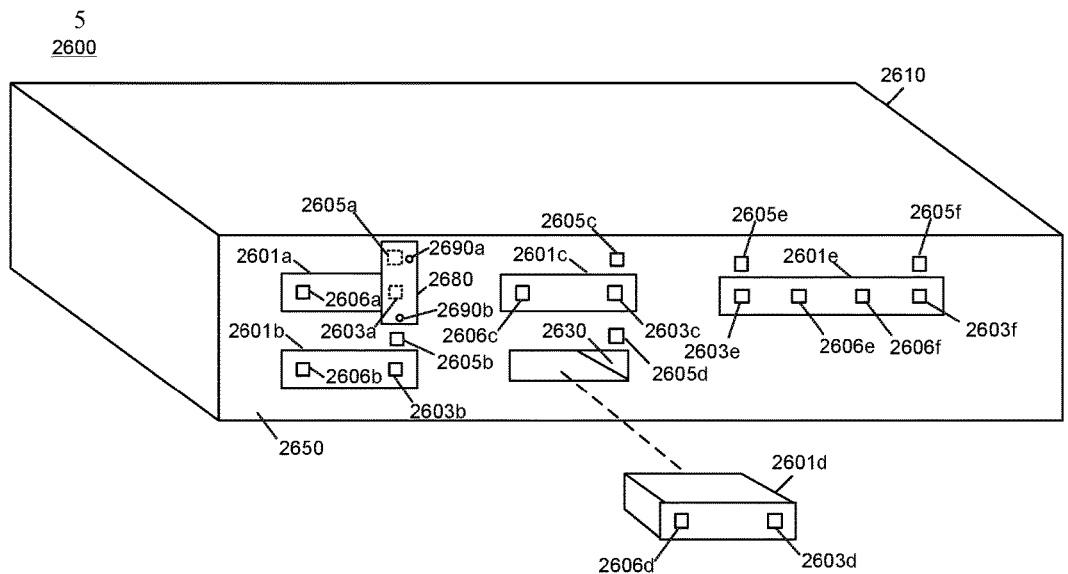
FIG. 26 is an alternative illustration of a ROADM circuit pack comprising of a wavelength equalizing array and front panel pluggable amplifiers.

In order to provide additional flexibility and reliability, the optical amplifiers within an optical node may be pluggable into the front panel of a ROADM circuit pack, as illustrated in FIG. 25 and FIG. 26. FIG. 25 2500 shows a ROADM circuit pack 2510 with wavelength equalizing array 200 with five front panel pluggable amplifiers 2501a-e. There are four pluggable amplifiers 2501a-d containing a single EDFA 2502a-d, and one pluggable amplifier containing two EDFAs 2501e. Each pluggable amplifier may contain the amplifying EDFA and other electrical and optical components (not shown). Each pluggable amplifier may further comprise of an electrical connector (not shown), used to apply electrical power to the amplifier, as well as control signals to control the amplifier and retrieve status information from the amplifier. Each pluggable amplifier may additionally comprise of an optical connector 2506a-f used to attach an external optical transmission fiber, and an optical connector 2503a-f used to optically jumper 2504a-f the associated amplifier to other optical circuitry 2530-2535 within the ROADM circuit pack via optical connector 2505a-f. Optionally, the optical jumper 2504a-f could be replaced by a blind-mate optical connector on the pluggable amplifier.

FIG. 26 (2600) shows a three-dimensional view of the ROADM circuit pack 2610 that can accommodate the five pluggable amplifiers 2501a-e shown in 2500. FIG. 26 shows three pluggable amplifiers 2601a-c (each comprising of a single EDFA) plugged into the front panel 2650 of the ROADM circuit pack 2610. FIG. 26 also shows a pluggable amplifier 2601e (comprising of a two EDFAs) plugged into the front panel 2650 of the ROADM circuit pack 2610. Additionally, FIG. 26 shows a fifth pluggable amplifier 2601d external to the ROADM circuit pack. Pluggable amplifier 2601d may be plugged into slot 2630 on the front panel 2650 of the ROADM circuit pack 2610. Each of the pluggable circuit packs 2601a-d containing a single EDFA also comprises of an optical connector 2606a-d to attach an external optical transmission fiber, and an optical connector 2603a-d used to optically jumper the associated amplifier to other optical circuitry within the ROADM circuit pack via optical connectors 2605a-d contained on the front panel 2650 of the ROADM circuit pack 2610. The pluggable circuit pack 2601e containing a two EDFAs also comprises of optical connectors 2606e-f to attach external optical transmission fibers, and an optical connector 2603e-f used to optically jumper the associated amplifier to other optical circuitry within the ROADM circuit pack via optical connectors 2605e-f contained on the front panel 2650 of the ROADM circuit pack 2610. The optical jumper used to connect the pluggable amplifier to the other optical circuitry within the ROADM circuit pack may comprise of a substantially flat planer lightwave circuit with optical connectors 2680, or it may comprise of some alternative optical connection technology (such as a simple short optical cable). The jumper 2680 could be further fastened to the front panel 2650 using some mechanical means such as mechanical screws 2690a-b.

Figure 27:
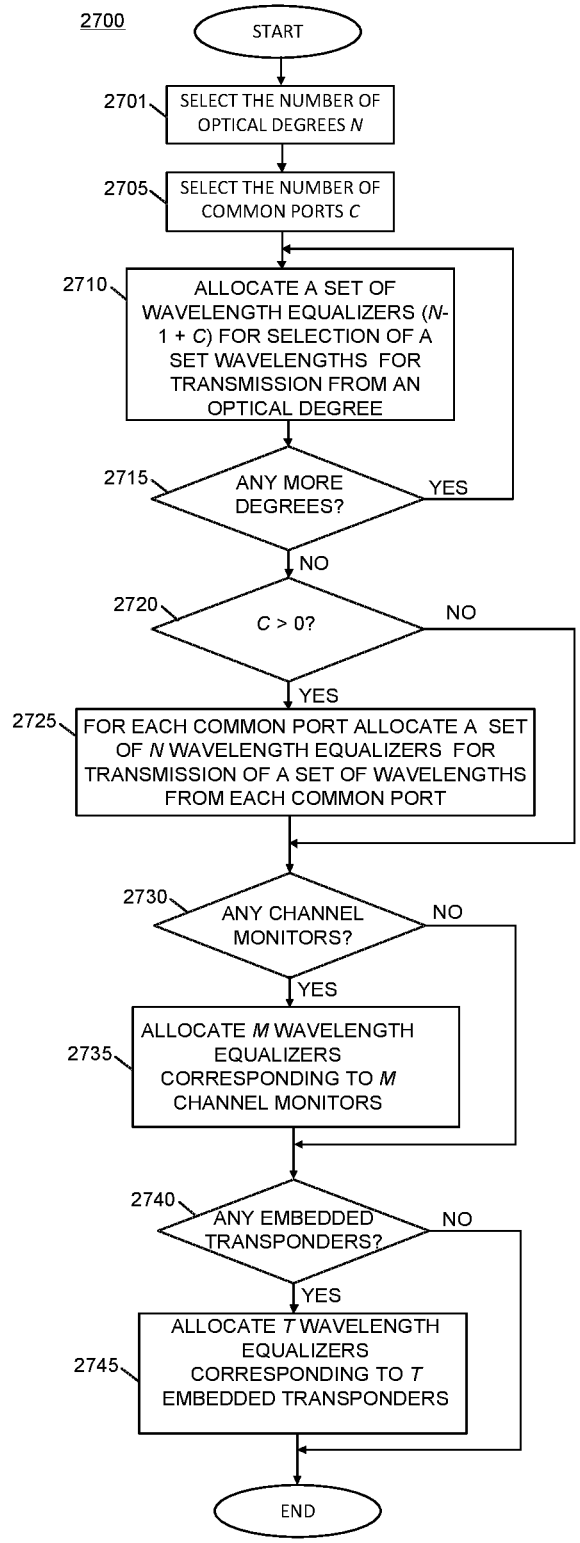
FIG. 27 is a flow diagram corresponding to a method of constructing a multi-degree optical node utilizing a wavelength equalizing array.

FIG. 27 illustrates a process 2700 of constructing a multi-degree optical node utilizing a wavelength equalizing array. At block 2701, the number of degrees N for the optical node is selected. At block 2705, the number of ports C common to all degrees is selected. At Step 2710, a set of N−1+C wavelength equalizers is allocated for the purpose of transmission of wavelengths from the first optical degree. At block 2715, a decision is made: if there are additional optical degrees, the process returns to block 2710, where an additional set of N−1+C wavelength equalizers is allocated for each additional degree. Once all N degrees have a set of N−1+C wavelength equalizers allocated to them, the process proceeds to block 2720. At this point, the total number of wavelength equalizers allocated is: N×(N−1+C). At block 2720, it is determined if there is at least one common optical port within the multi-degree optical node. If there are no common ports, the process proceeds to block 2730. If there is at least one common port, then the process proceeds to block 2725. At block 2725, for each common port, a set of N wavelength equalizers is allocated for transmission of a set of wavelengths from each common port. The number of wavelength equalizers allocated at this block is: C×N. Once the wavelength equalizers have been allocated for the common ports, the process proceeds to block 2730. At block 2730, it is determined if there are any optical channel monitors. If there are no optical channel monitors, then the process proceeds to block 2740. If there is at least one optical channel monitor, then at block 2735, M number of wavelength equalizers are allocated for M number of optical channel monitors. It should be noted that two or more optical degrees may share a single optical channel monitor by switching the optical channel monitor between the two or more optical degrees. Once the M wavelength equalizers have been allocated, the process proceeds to block 2740. At block 2740, it is determined if there are any embedded transponders. If there are no embedded optical transponders, then the process ends. If there is at least one embedded transponder, then at block 2745, T number of wavelength equalizers are allocated for T number of embedded transponders. Once, the T number of wavelength equalizers have been allocated at block 2745 the process ends. When the process 2700 ends, the total number of wavelength equalizers allocated to the optical node is: N×(N−1+C)+(C×N)+M+T, which is equal to $N^2+N(2C-1)+M+T$. For the special case where C=1, the total number of wavelength equalizers allocated is equal to: $N^2+N+M+T$.

Based upon the process presented in 2700, it is seen that the invention provides for a method of constructing a multi-degree optical node utilizing a wavelength equalizing array, comprising of allocating a first set of wavelength equalizers 2710 for selection of a first set of wavelengths for transmission from a first optical degree, and allocating at least a second set of wavelength equalizers 2710 for selection of at least a second set of wavelengths for transmission from at least a second optical degree, wherein the number of optical degrees N comprising the node is used to determine the number of wavelength equalizers assigned to each set. The method further includes allocating an additional set of wavelength equalizers 2725 for selection of an additional set of wavelengths for transmission from a common port connectable to a plurality of directionless add/drop ports. The method further includes allocating at least one wavelength equalizer 2735 for selection of wavelengths for an optical channel monitor. The method also further includes allocating at least one wavelength equalizer 2745 for selection of a wavelength for at least one transponder.

Figure 28:
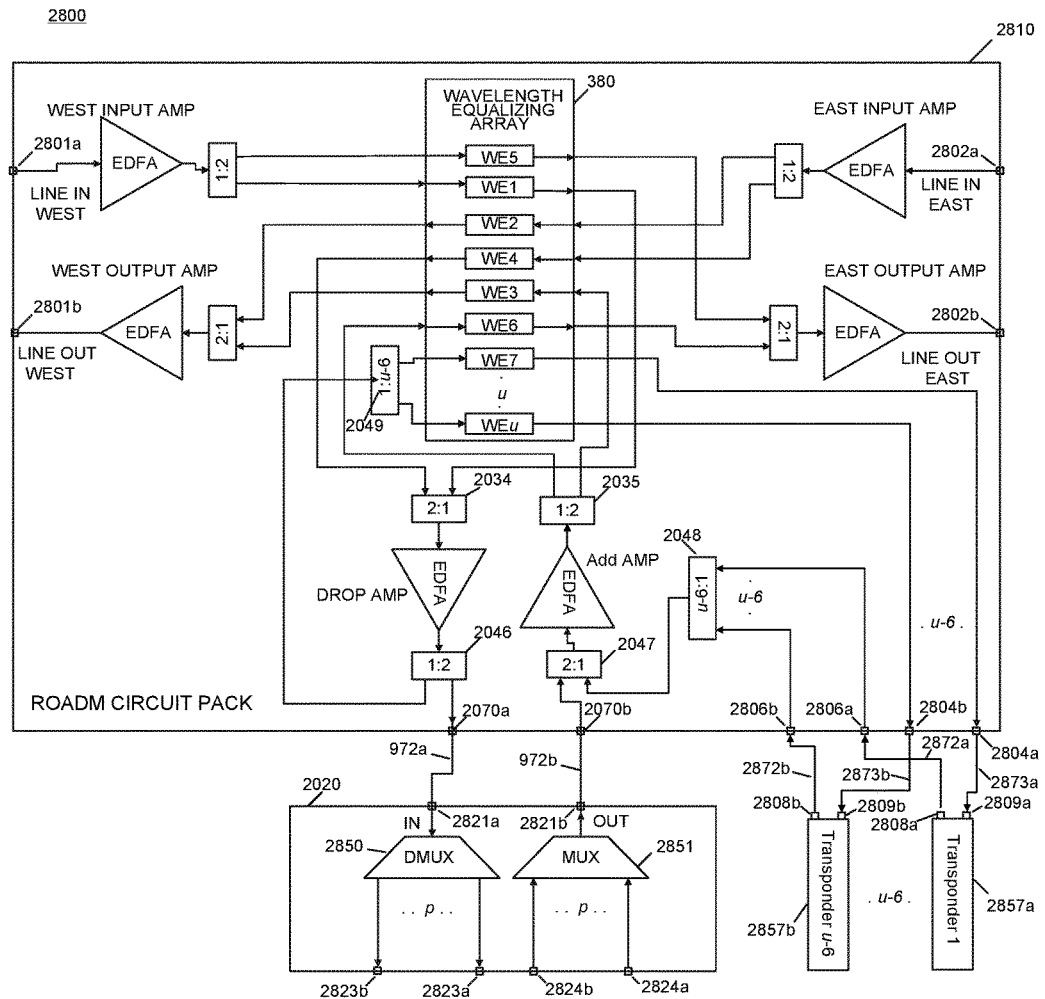
FIG. 28 is an illustration of an optical node comprising of a two degree ROADM on a circuit pack with embedded individual add/drop ports, and an external multiplexer/de-multiplexer circuit pack, and external transponders.

FIG. 28 is an illustration of an optical node 2800 comprising of ROADM circuit pack 2810, a multiplexer/de-multiplexer circuit pack 2020, and a plurality of transponders 2857ab that are external to the ROADM circuit pack 2810 and the optical multiplexer/de-multiplexer circuit pack 2020. The ROADM circuit pack comprises: a first optical degree 2801ab, a second optical degree 2802ab, a single common optical port 2070ab, a plurality of embedded add/drop ports 2806ab, 2804ab, a plurality of optical amplifiers (EDFAs), a plurality of optical couplers (1:2, 2:1, u−6:1, 1:u−6), and a wavelength equalizing Array 380 having u number of wavelength equalizers. The optical multiplexer/de-multiplexer circuit pack 2020 comprises: a de-multiplexer input port 2821a connected to the drop connector 2070a of the ROADM common port using optical jumper cable 972a, a multiplexer output port 2821b connected to the add connector 2070b of the ROADM common port using optical jumper cable 972b, a plurality of drop ports 2823ab, a plurality of add ports 2824ab, an optical wavelength de-multiplexer 2850, and an optical wavelength multiplexer 2851. The plurality of transponders 2857ab are connected to the embedded add/drop ports 2806ab, 2804ab using optical jumpers 2872ab, 2873ab.

For a wavelength equalizing array 380 having u wavelength equalizers, the ROADM circuit pack 2810 is operable to support up to u−6 embedded add/drop ports 2806ab, 2804ab. This is because six (6) wavelength equalizers are needed to pass and block wavelengths between the two optical degrees and the common port of the ROADM circuit pack. Since the ROADM circuit pack 2810 supports u−6 embedded add/drop ports, up to u−6 external transponders 2857ab can be attached to the ROADM circuit pack via the embedded add/drop ports 2806ab, 2804ab.

The optical transmitter ports 2808ab of the transponders 2857ab are connected to the add ports 2806a-b of the ROADM circuit card 2810 using optical jumpers 2872ab. Each transponder 2857ab generates one optical wavelength. Each transponder 2857ab generates an optical wavelength that differs in frequency from the wavelength generated by all other transponders 2857ab. The plurality of wavelengths generated by the transponders 2857ab are optically combined with one another using optical coupler 2048, which is a u−6 to 1 optical coupler. The wavelengths from the optical coupler 2048 are combined with the added wavelengths from the add connector 2070b of the common port using two to one (2:1) optical coupler 2047. The optical signal containing the wavelengths generated by the transponders 2857*ab* and the added wavelengths from the multiplexer/de-multiplexer circuit pack 2020 are optionally amplified and then forwarded to optical coupler 2035, which broadcasts the wavelengths to wavelength equalizers WE6 and WE3 which can be programmed to pass and block the added wavelengths to both the West optical degree 2801*b* and the East optical degree 2802*b*. Therefore, it can be seen that the embedded add ports 2806*ab* are directionless add ports, as their wavelengths can be forwarded to either optical degree of the ROADM circuit pack 2810.

Optical wavelengths received at the first (West) optical degree 2801*a* are broadcasted to both wavelength equalizer WE1 and wavelength equalizer WE5. WE5 is used to pass and pass and block wavelengths from first optical degree 2801*a* to the second optical degree 2802*b*, while WE1 is used to pass and block wavelengths from the first optical degree 2801*a* to the common port 2070*a* and to the embedded drop ports 2804*ab*. Optical wavelengths received at the second (East) optical degree 2802*a* are broadcasted to both wavelength equalizer WE2 and wavelength equalizer WE4. WE2 is used to pass and pass and block wavelengths from second optical degree 2802*a* to the first optical degree 2801*b*, while WE4 is used to pass and block wavelengths from the second optical degree 2802*a* to the common port 2070*a* and to the embedded drop ports 2804*ab*. Optical coupler 2034 is used to combine the wavelengths from WE1 and WE4, and forwards them to coupler 2046, which in turn broadcasts the wavelengths to be dropped to both multiplexer/de-multiplexer circuit pack 2020 and to optical coupler 2049. Optical coupler 2049 is a 1 to u–6 optical coupler used to broadcast the wavelengths to be dropped to wavelength equalizers WE7 to WEu. Wavelength equalizers WE7 to WEu are used to select individual wavelengths for the optical receivers of external transponders 2857*ab*. The optical receivers of transponders 2857*ab* are broadband receivers, and therefore, only one wavelength must be sent to each optical receiver. Each wavelength equalizer WE7 to WEu is programmed to pass a single wavelength, while blocking all other wavelengths. Since optical wavelengths from either the first optical degree 2801*a* or the second optical degree 2802*a* can be forwarded to any of the embedded drop ports 2804*ab*, the embedded drop ports 2804*ab* are directionless drop ports.

Additional wavelengths may be added by additional transponders (not shown) attached to the add ports of the multiplexer/de-multiplexer circuit pack 2020. Additional wavelengths may be dropped to additional transponders (not shown) attached to the drop ports of the multiplexer/de-multiplexer circuit pack 2020.

Figure 29:
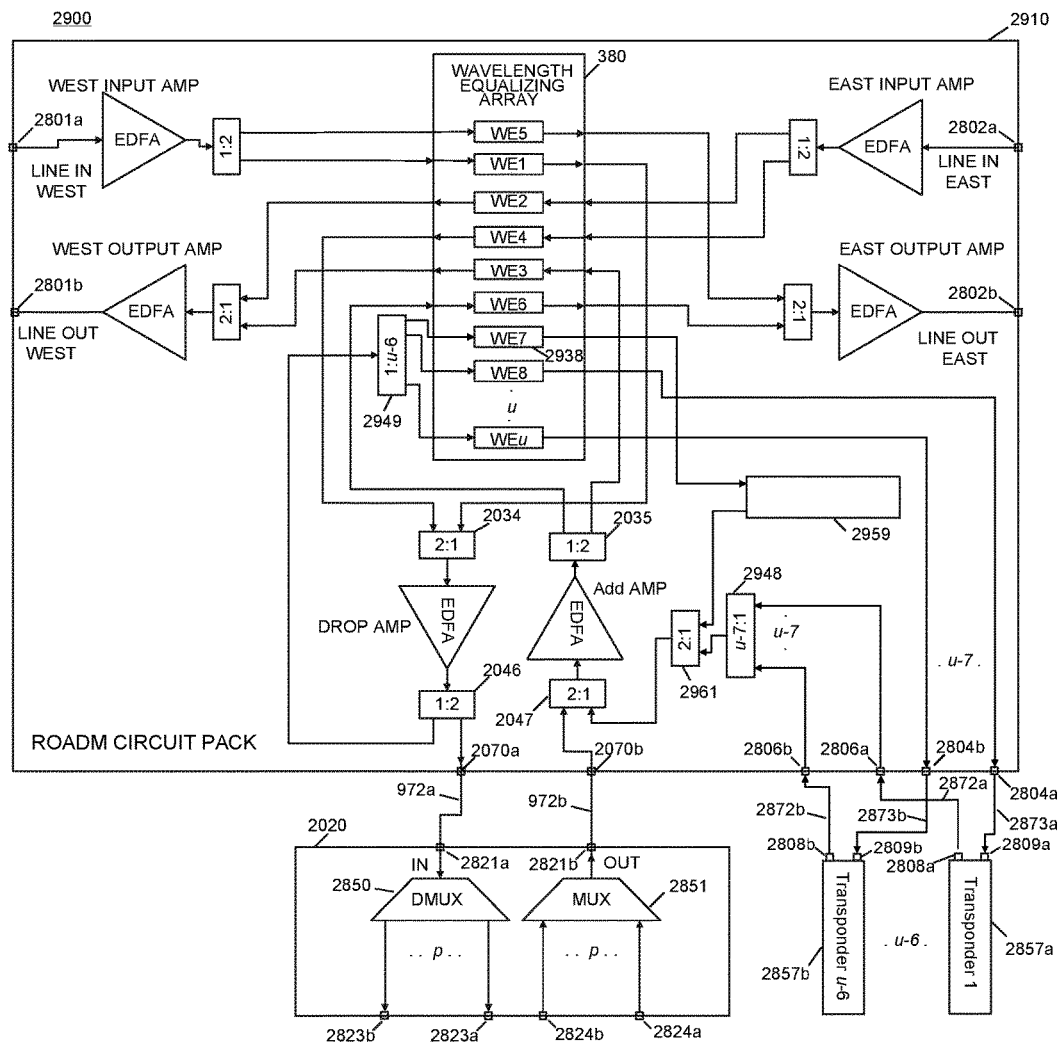
FIG. 29 is an illustration of an optical node comprising of a two degree ROADM on a circuit pack with embedded individual add/drop ports and an internal wavelength generator/receiver, and an external multiplexer/de-multiplexer circuit pack, and external transponders.

FIG. 29 is an illustration of an optical node 2900 that is similar to optical node 2800 (of FIG. 28), except that the ROADM circuit pack 2910 of 2900 contains an embedded optical transmitter/receiver 2959. The embedded optical transmitter/receiver 2959 may include the optical and electrical circuitry to serve as a fully functional transponder (making it identical to external transponders 2857*ab*), or it may simply contain the electrical circuitry required to generate and receive a test signal. The embedded optical transmitter/receiver 2959 is a directionless embedded optical transmitter/receiver, since a wavelength from either the first optical degree 2801*a* or the second optical degree 2802*a* is able to be forwarded to the embedded optical transmitter/receiver 2959, and the embedded optical transmitter/receiver 2959 can generate an optical wavelength to either the first optical degree 2801*b* or the second optical degree 2802*b*.

The optical wavelength generated by the embedded optical transmitter/receiver 2959 is combined with the optical wavelengths generated by the external transponders 2857*ab* using optical coupler 2961. These combined wavelengths are additionally combined with any wavelengths from the multiplexer/de-multiplexer circuit pack 2020 using optical coupler 2047, and the resulting combined added wavelengths are broadcasted to wavelength equalizers WE3 and WE6 (using coupler 2035), which are used to pass and block the added wavelengths to the first optical degree 2801*b* and the second optical degree 2802*b*. Additional wavelengths may be added by additional transponders (not shown) attached to the add ports of the multiplexer/de-multiplexer circuit pack 2020.

Wavelengths to drop from the first optical degree 2801*a* and the second optical degree 2802*a* are combined using optical coupler 2034, and the combined wavelengths to drop are sent to both the multiplexer/de-multiplexer circuit pack 2020 and the optical coupler 2949. Optical coupler 2949 is a 1 to u–6 optical coupler, and it is used to broadcast the wavelengths to drop to wavelength equalizers WE7 to WEu. Wavelength equalizer WE7 is used to select a wavelength for the embedded (internal) optical transmitter/receiver 2959, while wavelength equalizers WE8 to WEu are used to select wavelengths for the external transponders 2857*ab*. Additional wavelengths may be dropped to additional transponders (not shown) attached to the drop ports of the multiplexer/de-multiplexer circuit pack 2020.

Figure 30:
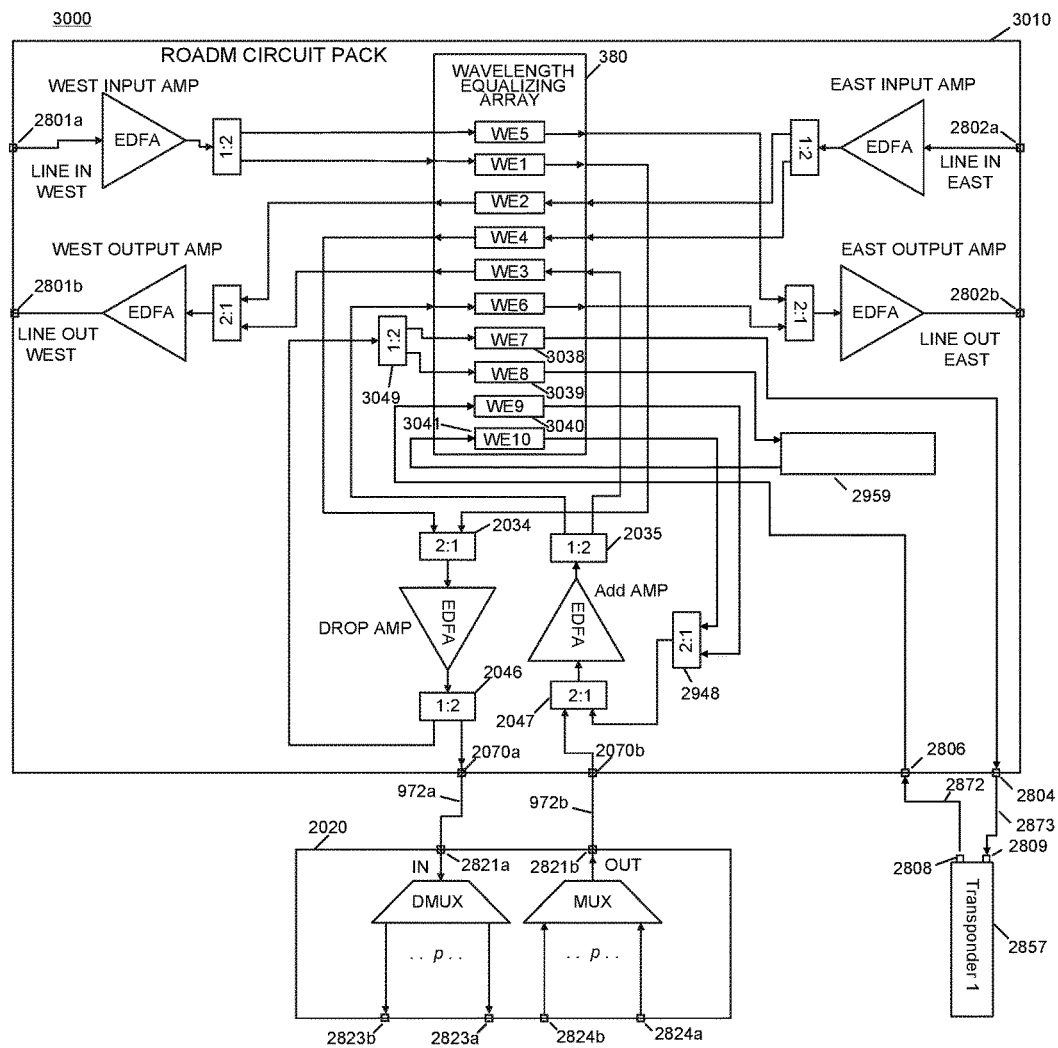
FIG. 30 is an illustration of an optical node comprising of a two degree ROADM on a circuit pack with an embedded individual add/drop port and an internal wavelength generator/receiver, and an external multiplexer/de-multiplexer circuit pack, and an external transponder.

FIG. 30 is an illustration of an optical node 3000 that is similar to optical node 2900 (of FIG. 29), except that the ROADM circuit pack 3010 of 3000 has only a single embedded add/drop port 2806,2804, although it is not limited to only a single embedded add/drop port. Also, both the embedded (internal) optical transmitter/receiver 2959 and the external transponder 2857 have their transmitted signals filtered by wavelength equalizers WE10 3041 and WE9 3040 respectively. Such filtering may be desired for cases where the sidemode suppression ratios of the lasers within the embedded optical transmitter/receiver 2959 and the external transponder 2857 are low.

As can be seen in FIG. 30, the output wavelength generated by the embedded optical transmitter/receiver 2959 is sent to WE10 3041, which is programmed to only pass the wavelength frequency generated by the embedded optical transmitter/receiver 2959. Similarly, the output wavelength generated by the external transponder 2857 is sent to WE9 3040, which is programmed to only pass the wavelength frequency generated by the external transponder 2857. The filtered outputs of WE9 and WE10 are then combined by optical coupler 2948, and the resulting signal is combined with any added wavelengths from the multiplexer/de-multiplexer circuit pack 2020 using optical coupler 2047. The added wavelengths from the optical coupler 2047 are broadcasted to both WE3 and WE6, which are used to pass and block added wavelengths to both the first optical degree 2801*b* and the second optical degree 2802*b*. Therefore, all added wavelengths are directionless.

In the drop direction, optical coupler 2034 is used to combine wavelengths from both the first optical degree 2801*a* and the second optical degree 2802*a*, and the resulting signal is broadcasted to both the multiplexer/de-multiplexer circuit pack 2020 and the optical coupler 3049. Optical coupler 3049 is used to broadcast the wavelengths to be dropped to WE7 3038 and WE8 3039, which are each programmed to select a single wavelength. WE7 3038 is used to select a single wavelength for the external optical transponder 2857, and WE8 3039 is used to select a single wavelength for the embedded optical transmitter/receiver 2959.

Figure 31:
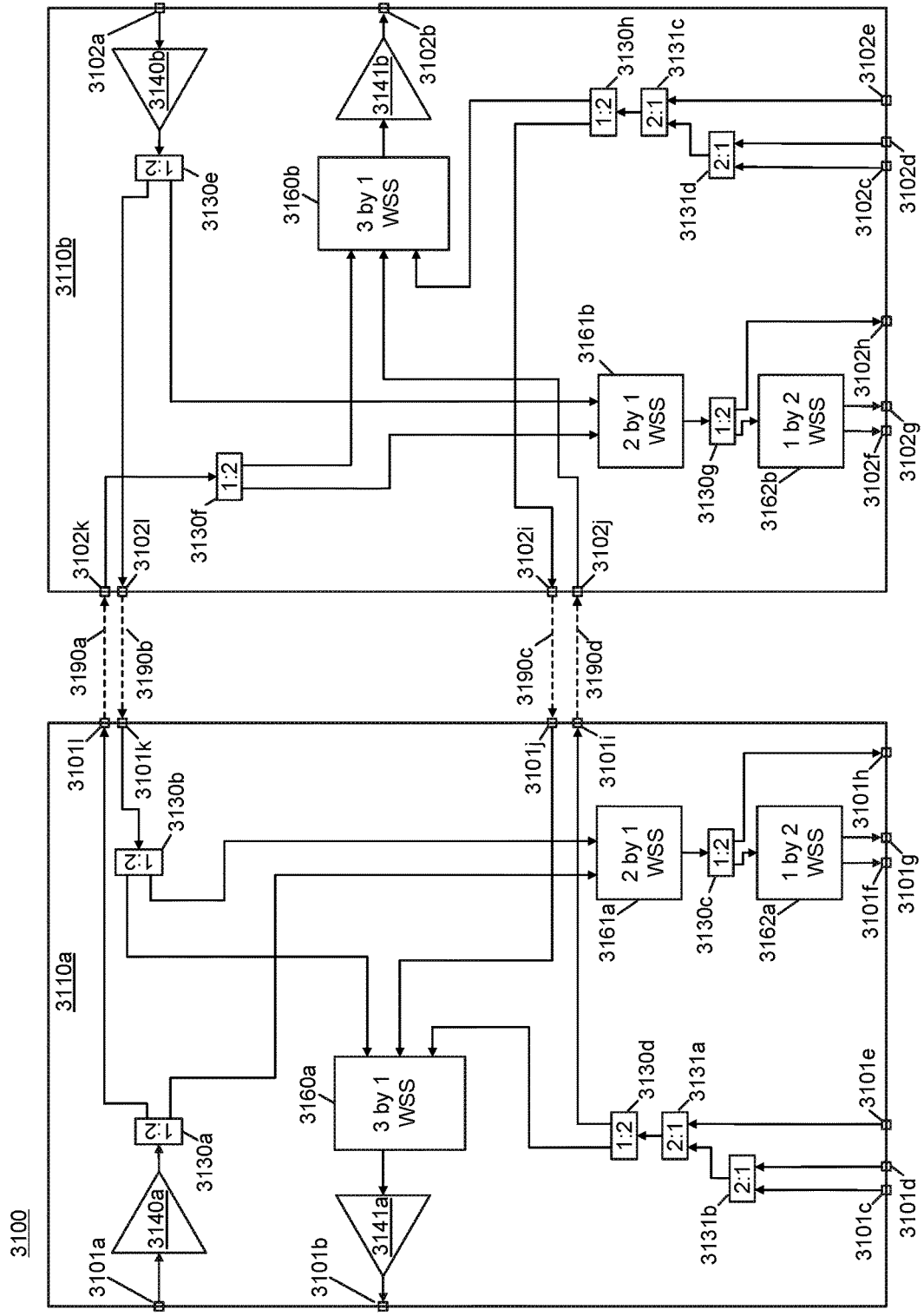
FIG. 31 is an illustration of a two-degree optical node comprised of two ROADMs with embedded individual directionless add/drop ports.

FIG. 31 is an illustration of a two-degree optical node 3100 comprised of two ROADMs 3110a and 3110b. The first ROADM 3110a comprises: a first degree 3101ab, a degree express port 3101kl, an add express port 3101ij, two embedded add ports 3101cd, an add expansion port 3101e, two embedded drop ports 3101fg, a drop expansion port 3101h, a degree input amplifier 3140a, a degree output amplifier 3141a, a 3 by 1 WSS device 3160a, a 2 by 1 WSS device 3161a, a 1 by 2 WSS device 3162a, optical couplers 3130a-d, and optical couplers 3131ab. Similarly the second ROADM 3110b comprises: a second degree 3102ab, a degree express port 3102kl, an add express port 3102ij, two embedded add ports 3102cd, an add expansion port 3102e, two embedded drop ports 3102fg, a drop expansion port 3102h, a degree input amplifier 3140b, a degree output amplifier 3141b, a 3 by 1 WSS device 3160b, a 2 by 1 WSS device 3161b, a 1 by 2 WSS device 3162b, optical couplers 3130e-h, and optical couplers 3131cd.

The degree express port 3101kl is connected to the degree express port 3102kl using optical jumper cables 3190ab. The add express port 3101ij is connected to the add express port 3102ij using optical jumper cables 3190cd.

On ROADM 3110a, optical coupler 313 1b is used to combine individual wavelengths applied to the embedded add ports 3101cd. The transmitter outputs of two transponders may be attached to embedded add ports 3101cd. The add expansion port 3101e may be attached to an optical multiplexer/de-multiplexer circuit pack such as 2020 in FIG. 30. Optical coupler 3131a is used to combine the optical wavelengths from optical coupler 313 1b with the optical wavelengths received at the add expansion port 3101e, and the combined wavelengths are broadcasted to both 3 by 1 WSS 3160a and the add express port 3101i. The optical coupler 3130b is used to broadcast wavelengths received from the degree express port 3101k to both the 3 by 1 WSS 3160a and the 2 by 1 WSS 3161a. The add express port 3101j forwards added wavelengths from ROADM 3110b to the 3 by 1 WSS 3160a. The 3 by 1 WSS 3160a is used to pass and block wavelengths from the embedded add ports 3101cd, the add expansion port 3101e, the degree express port 3101k, and the add express port 3101j to the first degree 3101b. The optical coupler 3130a is used to broadcast wavelengths from the first degree 3101a to the degree express port 3101l and the 2 by 1 WSS 3161a. The 2 by 1 WSS 3161a is used to pass and block wavelengths from the first degree and the degree express port 3101k to optical coupler 3130c. The optical coupler 3130c is used to broadcast wavelengths that are to be dropped to both the drop expansion port 3101h and the 1 by 2 WSS 3162a. The 1 by 2 WSS 3162a is used to select individual wavelengths to drop for the two embedded drop ports 3101fg. The optical receivers of two transponders may be attached to the embedded drop ports 3101fg. The drop expansion port 3101h may be attached to an optical multiplexer/de-multiplexer circuit pack such as 2020 in FIG. 30.

On ROADM 3110b, optical coupler 3131d is used to combine individual wavelengths applied to the embedded add ports 3102cd. The transmitter outputs of two transponders may be attached to embedded add ports 3102cd. The add expansion port 3102e may be attached to an optical multiplexer/de-multiplexer circuit pack such as 2020 in FIG. 30. Optical coupler 3131c is used to combine the optical wavelengths from optical coupler 3131d with the optical wavelengths received at the add expansion port 3102e, and the combined wavelengths are broadcasted to both 3 by 1 WSS 3160b and the add express port 3102i. The optical coupler 3130f is used to broadcast wavelengths received from the degree express port 3102k to both the 3 by 1 WSS 3160b and the 2 by 1 WSS 3161b. The add express port 3102j forwards added wavelengths from ROADM 3110a to the 3 by 1 WSS 3160b. The 3 by 1 WSS 3160b is used to pass and block wavelengths from the embedded add ports 3102cd, the add expansion port 3102e, the degree express port 3102k, and the add express port 3102j to the second degree 3102b. The optical coupler 3130e is used to broadcast wavelengths from the second degree 3102a to the degree express port 3102l and the 2 by 1 WSS 3161b. The 2 by 1 WSS 3161b is used to pass and block wavelengths from the second degree and the degree express port 3102k to optical coupler 3130g. The optical coupler 3130g is used to broadcast wavelengths that are to be dropped to both the drop expansion port 3102h and the 1 by 2 WSS 3162b. The 1 by 2 WSS 3162b is used to select individual wavelengths to drop for the two embedded drop ports 3102fg. The optical receivers of two transponders may be attached to the embedded drop ports 3102fg. The drop expansion port 3102h may be attached to an optical multiplexer/de-multiplexer circuit pack such as 2020 in FIG. 30.

The connected degree express ports 3101l and 3102k are used to forward all wavelengths received at the first degree 3101a of the first ROADM 3110a to the second ROADM 3110b. At the second ROADM 3110b, the wavelengths received from the first degree of the first ROADM may be either passed or blocked to the second degree 3102b using 3160a. Additionally, at the second ROADM 3110b, the wavelengths received from the first degree of the first ROADM may be dropped to the embedded drop ports 3102fg of the second ROADM and the drop expansion port 3102h.

The connected degree express ports 3101k and 3102l are used to forward all wavelengths received at the second degree 3102a of the second ROADM 3110b to the first ROADM 3110a. At the first ROADM 3110a, the wavelengths received from the second degree of the second ROADM may be either passed or blocked to the first degree 3101b using 3160a. Additionally, at the first ROADM 3110a, the wavelengths received from the second degree of the second ROADM may be dropped to the embedded drop ports 3101fg of the first ROADM and the drop expansion port 3101h.

Since wavelengths from either the first degree 3101a or from the second degree 3102a can be dropped to any of the embedded drop ports 3101fg, 3102fg on either ROADM, the embedded drop ports 3101fg, 3102fg are directionless. Also, since wavelengths from either the first degree 3101a or from the second degree 3102a can be dropped to both drop expansion ports 3101h, 3102h on either ROADM, the drop expansion ports 3101h, 3102h are directionless.

The connected add express ports 3101i and 3102j are used to forward added wavelengths received at embedded add ports 3101cd and add expansion port 3101e of the first ROADM 3110a to the second ROADM 3110b. At the second ROADM 3110b, the received add wavelengths from the first ROADM can be either passed or blocked to the second degree 3102b using 3160b. Similarly, the connected add express ports 3101j and 3102i are used to forward added wavelengths received at embedded add ports 3102cd and add expansion port 3102e of the second ROADM 3110b to the first ROADM 3110a. At the first ROADM 3110a, the received add wavelengths from the second ROADM can be either passed or blocked to the first degree 3101b using 3160a. Since wavelengths added at the add ports 3101c-e of the first ROADM 3110a and wavelengths added at the add ports 3102c-e of the of the second ROADM 3110b can be forwarded out the first degree 3101b and the second degree 3102b via the add express ports, the add ports 3101c-e and 3102c-e are directionless add ports.

Figure 32:
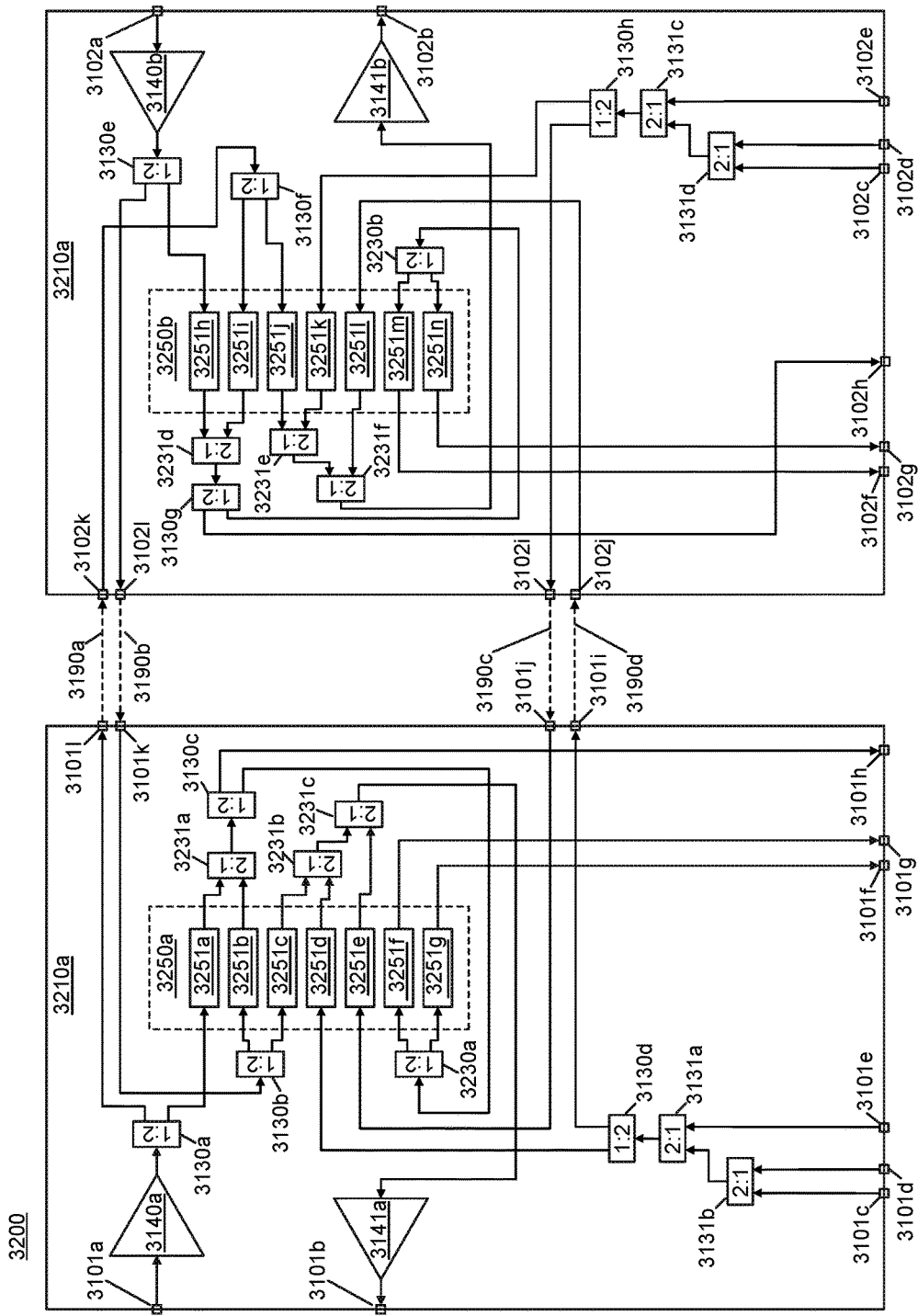
FIG. 32 is an illustration of a two-degree optical node comprised of two ROADM circuit packs with embedded individual directionless add/drop ports, each ROADM circuit pack constructed using a wavelength equalizing array.

FIG. 32 illustrates an optical node 3200 that is identical to optical node 3100, except that the WSS devices in each ROADM are replaced by wavelength equalizers and optical couplers. Namely, the 3 by 1 WSS 3160a is implemented using wavelength equalizers 3251c-e and optical couplers 323 1bc, and the 2 by 1 WSS 3161a is replaced by wavelength equalizers 3251ab and optical coupler 3231a, and the 1 by 2 WSS 3162a is replaced by wavelength equalizers 3251fg and optical coupler 3230a. Similarly, the 3 by 1 WSS 3160b is implemented using wavelength equalizers 3251j-l and optical couplers 3231ef, and the 2 by 1 WSS 3161b is replaced by wavelength equalizers 3251hi and optical coupler 3231d, and the 1 by 2 WSS 3162b is replaced by wavelength equalizers 3251mn and optical coupler 3230b.

The wavelength equalizers 3251a-g may be contained within a wavelength equalizing array 3250a. Similarly, the wavelength equalizers 3251h-n may be contained within a wavelength equalizing array 3250b.

On the first ROADM 3210a, it can be stated that wavelength equalizer 3251a is used to pass and block wavelengths from the first optical degree 3101a to the embedded drop ports 3101fg and the drop expansion port 3101h, and the wavelength equalizer 3251b is used to pass and block wavelengths from the second optical degree 3102a to the embedded drop ports 3101fg and the drop expansion port 3101h, and the wavelength equalizer 3251c is used to pass and block wavelengths from the second optical degree 3102a to the first optical degree 3101b, and the wavelength equalizer 3251d is used to pass and block wavelengths from embedded add ports 3101cd and add expansion port 3101e on the first ROADM 3210a to the first optical degree 3101b, and the wavelength equalizer 3251e is used to pass and block wavelengths from the embedded add ports 3102cd and add expansion port 3102h on the second ROADM 3210b to the first optical degree 3101b, and the wavelength equalizer 3251f is used to pass and block wavelengths from the first optical degree 3101a and the second optical degree 3102a to the first embedded drop port 3101g on the first ROADM 3210a, and the wavelength equalizer 3251g is used to pass and block wavelengths from the first optical degree 3101a and the second optical degree 3102a to the second embedded drop port 3101f on the first ROADM 3210a.

Similarly, on the second ROADM 3210b, it can be stated that wavelength equalizer 3251h is used to pass and block wavelengths from the second optical degree 3102a to the embedded drop ports 3102fg and the drop expansion port 3102h, and the wavelength equalizer 3251i is used to pass and block wavelengths from the first optical degree 3101a to the embedded drop ports 3102fg and the drop expansion port 3102h, and the wavelength equalizer 3251j is used to pass and block wavelengths from the first optical degree 3101a to the second optical degree 3102b, and the wavelength equalizer 3251k is used to pass and block wavelengths from embedded add ports 3102cd and add expansion port 3102e on the second ROADM 3210b to the second optical degree 3102b, and the wavelength equalizer 3251l is used to pass and block wavelengths from the embedded add ports 3101cd and add expansion port 3101h on the first ROADM 3210a to the second optical degree 3102b, and the wavelength equalizer 3251m is used to pass and block wavelengths from the second optical degree 3102a and the first optical degree 3101a to the first embedded drop port 3102g on the second ROADM 3210b, and the wavelength equalizer 3251n is used to pass and block wavelengths from the first optical degree 3101a and the second optical degree 3102a to the second embedded drop port 3102f on the second ROADM 3210b.

Figure 33A:
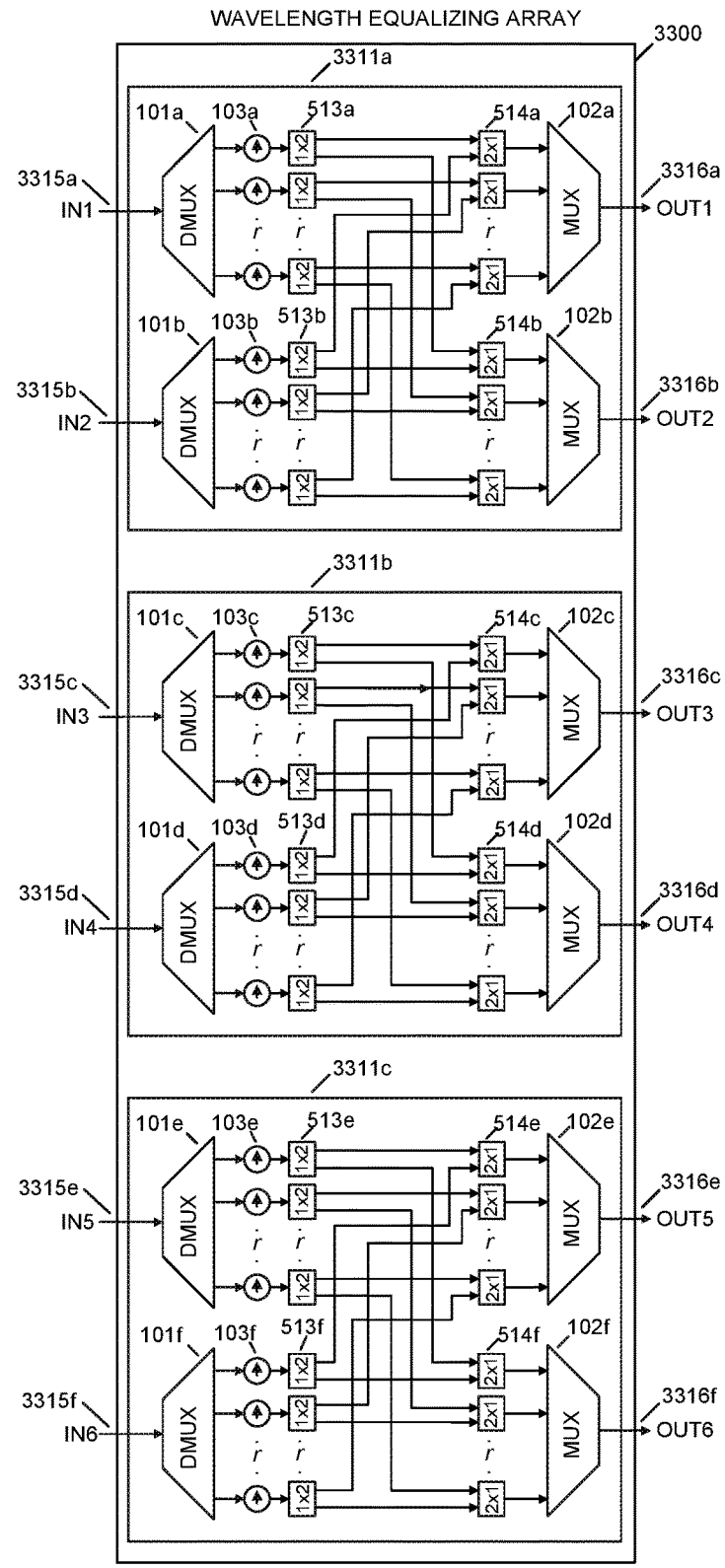
FIG. 33A is an illustration of an embodiment of a wavelength equalizing array containing six wavelength equalizers that can be configured to be any combination of 1 by 1 wavelength selective switches or 2 by 1 wavelength selective switches or 1 by 2 wavelength selective switches or 2 by 2 wavelength selective switches.

FIG. 33A is an illustration of an embodiment of a wavelength equalizing array containing six wavelength equalizers that can be configured to be any combination of 1 by 1 wavelength selective switches or 2 by 1 wavelength selective switches or 1 by 2 wavelength selective switches or 2 by 2 wavelength selective switches. More specifically, the wavelength equalizing array 3300 is comprised of three wavelength directing functions: 3311a, 3311b, and 3311c. Each wavelength directing function 3311a-c can be configured to be two 1 by 1 WSS functions, or a single 1 by 2 WSS function, or a single 2 by 1 WSS function, or a single 2 by 2 WSS function. For example, in order to configure wavelength directing function 3311a as two 1 by 1 WSS functions, the 1×2 switches 513a are programmed to direct their inputs to 2×1 switches 514a, and 2×1 switches 514a are programmed to forward the input wavelengths received from switches 513a to output OUT1 3316a, and the 1×2 switches 513b are programmed to direct their inputs to 2×1 switches 514b, and 2×1 switches 514b are programmed to forward the input wavelengths received from switches 513b to output OUT2 3316b. In order to configure wavelength directing function 3311a as a single 1 by 2 WSS function, 2×1 switches 514a are programmed to select their input wavelengths from switches 513a, and 2×1 switches 514b are programmed to select their input wavelengths from switches 513a, and input IN2 3315b is not used. Alternatively, in order to configure wavelength directing function 3311a as a single 1 by 2 WSS function, 2×1 switches 514a are programmed to select their input wavelengths from switches 513b, and 2×1 switches 514b are programmed to select their input wavelengths from switches 513b, and input IN1 3315a is not used. In order to configure wavelength directing function 3311a as a single 2 by 1 WSS function, 1×2 switches 513a are programmed to direct their inputs to 2×1 switches 514a, and 1×2 switches 513b are programmed to direct their inputs to 2×1 switches 514a, and output OUT2 3316b is not used. Alternatively, in order to configure wavelength directing function 3311a as a single 2 by 1 WSS function, 1×2 switches 513a are programmed to direct their inputs to 2×1 switches 514b, and 1×2 switches 513b are programmed to direct their inputs to 2×1 switches 514b, and output OUT1 3316a is not used. In order to configure wavelength directing function 3311a as a single 2 by 2 WSS device, each 1×2 switch in 513a is allowed to be programmed independent of one another and forward wavelengths towards either OUT1 3316a or OUT2 3316b, and each 1×2 switch in 513b is allowed to be programmed independent of one another and forward wavelengths towards either OUT1 3316a or OUT2 3316b, and each 2×1 switch in 514a is allowed to be programmed independent of one another and receive wavelengths from either IN1 3315a or IN2 3315b, and each 2×1 switch in 514b is allowed to be programmed independent of one another and receive wavelengths from either IN1 3315a or IN2 3315b. It can be stated that the wavelength directing function 3311a is operable to implement a first mode (two 1×1 WSS devices), a second mode (one 1 by 2 WSS device, with input IN2 not being used), a third mode (one 1 by 2 WSS function, with input IN1 not being used), a fourth mode (one 2 by 1 WSS function, with output OUT2 not being used), a fifth mode (one 2 by 1 WSS function, with output OUT1 not being used), and a sixth mode (one 2 by 2 WSS function).

It can also be stated the optical device 3300 comprises: a wavelength directing function 3311a, a first optical input 3315a used to provide a first source of wavelengths to the wavelength directing function 3311a, a second optical input 3315b used to provide a second source of wavelengths to the wavelength directing function 3311a, a first optical output 3316a used to output a first set of wavelengths from the wavelength directing function 3311a, and a second optical output 3316b used to output a second set of wavelengths from the wavelength directing function 3311a, wherein the wavelength directing function 3311a is operable to pass and block individual wavelengths from the first optical input 3315a to the first optical output 3316a and from the first optical input 3315a to the second optical output 3316b and from the second optical input 3315b to the first optical output 3316a and from the second optical input 3315b to the second optical output 3316b.

And the optical device 3300 further comprises: a second wavelength directing function 3311b, a third optical input 3315c used to provide a first source of wavelengths to the second wavelength directing function 3311b, a fourth optical input 3315d used to provide a second source of wavelengths to the second wavelength directing function 3311b, a third optical output 3316c used to output a first set of wavelengths from the second wavelength directing function 3311b, and a fourth optical output 3316d used to output a second set of wavelengths from the second wavelength directing function 3311b, wherein the second wavelength directing function 3311b is operable to pass and block individual wavelengths from the third optical input 3315c to the third optical output 3316c and from the third optical input 3315c to the fourth optical output 3316d and from the fourth optical input 3315d to the third optical output 3316c and from the fourth optical input 3315d to the fourth optical output 3316d, and wherein the second wavelength directing function 3311b is not operable to pass and block individual wavelengths from the third optical input 3315c to the first optical output 3316a and from the third optical input 3315c to the second optical output 3316b and from the fourth optical input 3315d to the first optical output 3316a and from the fourth optical input 3315d to the second optical output 3316b, and wherein the first wavelength directing function 3311a is not operable to pass and block individual wavelengths from the first optical input 3315a to the third optical output 3316c and from the first optical input 3315a to the fourth optical output 3316d and from the second optical input 3315b to the third optical output 3316c and from the second optical input 3315b to the fourth optical output 3316d.

Figure 33B:
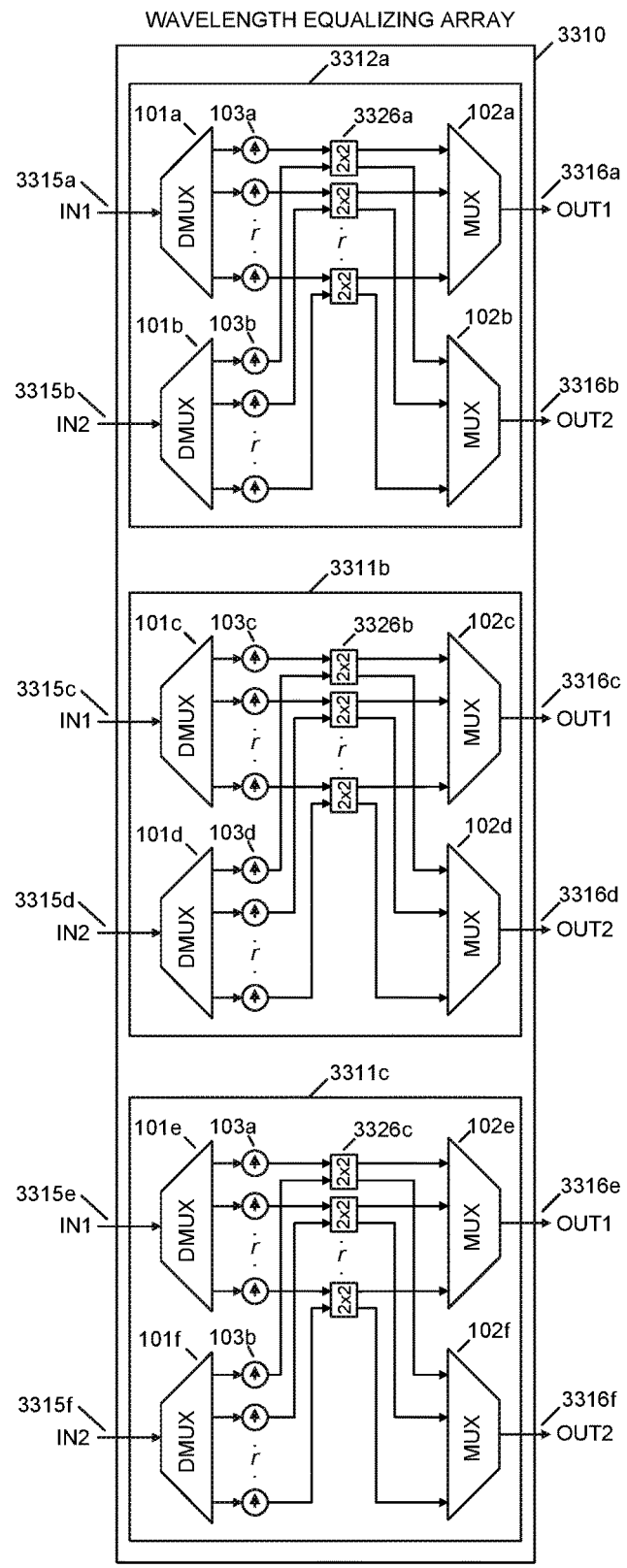
FIG. 33B is an illustration of an embodiment of a wavelength equalizing array containing six wavelength equalizers that can be configured to be any combination of 1 by 1 wavelength selective switches or 2 by 1 wavelength selective switches or 1 by 2 wavelength selective switches or 2 by 2 wavelength selective switches.

FIG. 33B is an illustration of an embodiment of a wavelength equalizing array containing six wavelength equalizers that can be configured to be any combination of 1 by 1 wavelength selective switches or 2 by 1 wavelength selective switches or 1 by 2 wavelength selective switches or 2 by 2 wavelength selective switches. More specifically, the wavelength equalizing array 3310 is comprised of three wavelength directing functions: 3312a, 3312b, and 3312c. Each wavelength directing function 3312a-c can operate as two 1 by 1 WSS functions, or a single 1 by 2 WSS function, or a single 2 by 1 WSS function, or a single 2 by 2 WSS function. However, since each wavelength directing function 3312a-c utilizes only one 2×2 optical switch 3326a for each wavelength, when operating as two 1 by 1 WSS functions, all the optical switches of a given wavelength directing function are set to the straight through state (as opposed to the cross state). For example, if wavelength directing function 3312a is programmed to be two 1 by 1 WSS functions, then 2×2 switches 3326a are all set to the through state so that all the wavelengths from IN1 3315a are forwarded to OUT1 3316a, and all the wavelengths from IN2 3315b are forwarded to OUT2 3316b. However, when operating as a 1 by 2 WSS function or a 2 by 1 WSS function, or a 2 by 2 WSS function, each 2×2 switch within a given wavelength directing function is set independent of all other 2×2 switches within the given wavelength directing function. For instance, if wavelength directing function 3312a is being used as a 2 by 1 WSS function with OUT2 3316b not being used, then each switch within 3326a would be set to either the through state (when selecting a particular wavelength from IN1 3315a) or the cross state (when selecting the particular wavelength from IN2 3315b), and the unused wavelength would be sent to OUT2 3316b. It should be noted however, that the unused (unselected) wavelength could be attenuated by the appropriate attenuator within 103a and 103b.

Figure 34:
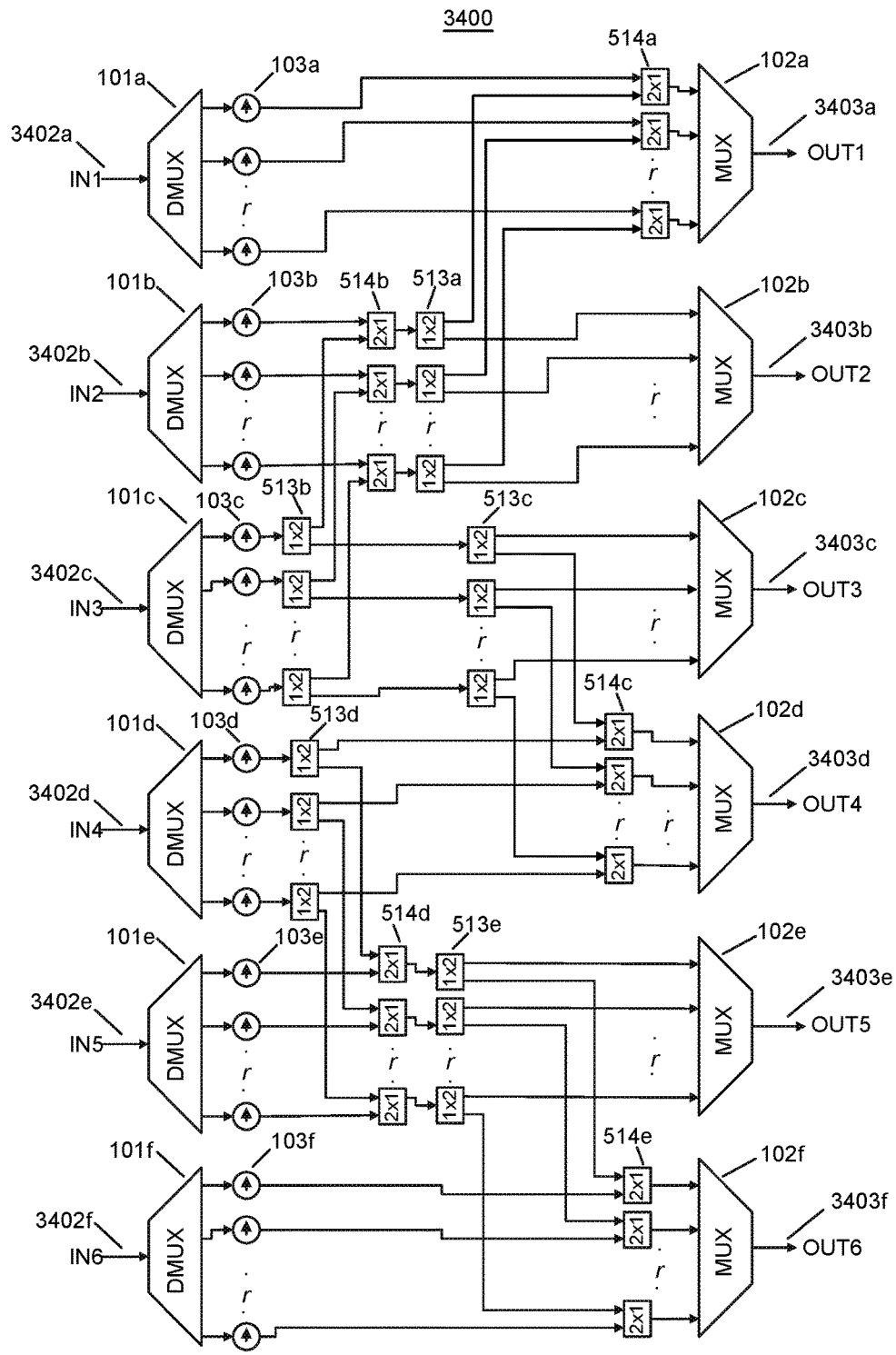
FIG. 34 is an illustration of a wavelength equalizing array containing six wavelength equalizers that can be configured to be any combination of 1 by 1 wavelength selective switches, 2 by 1 wavelength selective switches, 1 by 2 wavelength selective switches, 1 by 3 wavelength selective switches, or 3 by 1 wavelength selective switches.

FIG. 34 shows a wavelength equalizing array 3400 containing six wavelength equalizers that can be configured (by setting the 1×2, and 2×1 switches appropriately) as either 1 by 3 WSS functions, 1 by 2 WSS functions, 2 by 1 WSS functions, 3 by 1 WSS functions, or 1 by 1 WSS functions. Additionally, by setting the 1×2 and 2×1 switches appropriately, a 1 by 4 WSS can be configured. A 1 by 4 WSS function is formed using the top four wavelength equalizers (using IN3 3402c, OUT1 3403a, OUT2 3403b, OUT3 3403c, and OUT4 3403d). A first 1 by 3 WSS function is formed by the top three wavelength equalizers (using IN3 3402c, OUT1 3403a, OUT2 3403b, OUT3 3403c), while a second 1 by 3 device is formed by the bottom three wavelength equalizers (using IN4 3402d, OUT4 3403d, OUT5 3403e, and OUT 6 3403f). In order to use the wavelength equalizing array as 3 by 1 WSS functions, a first 3 by 1 WSS function is formed by the top three wavelength equalizers (using IN1 3402a, IN2 3402b, IN3 3402c, and OUT1 3403a), while a second 3 by 1 WSS function is formed by the bottom three wavelength equalizers (using IN4 3402d, IN5 3402e, IN6 3402f, and OUT6 3403f).

The wavelength equalizing array 3400 can alternatively be used to create three 1 by 2 WSS functions by using IN2 3402b, OUT1 3403a and OUT2 3403b as the first 1 by 2 WSS, using IN3 3402c, OUT3 3403c, and OUT4 3403d as the second 1 by 2 WSS, and using IN5 3402e, OUT5 3403e, and OUT6 3403f as the third 1 by 2 WSS. Similarly, the wavelength equalizing array 3400 can be used to create three 2 by 1 WSS functions by using IN1 3402a, IN2 3402b, and OUT1 3403a as the first 2 by 1 WSS, using IN3 3402c, IN4 3402d, and OUT4 3403d as the second 2 by 1 WSS, and using IN5 3402e, IN6 3402f, and OUT6 3403f as the third 2 by 1 WSS.

Finally, the wavelength equalizing array 3400 can be used to create six 1 by 1 WSS functions by programming all switches such that all input wavelengths arriving on a given port INx are forwarded to the corresponding output port OUTx (wherein x=1 to 6).

It should also be noted that the structure of 3400 provides the ability to form a 1 by 2 WSS function by using any two consecutive output ports on the structure of 3400. For instance, a 1 by 2 WSS function can be formed using consecutive outputs OUT1 3403a and OUT2 3403b along with IN2 3402b, and a 1 by 2 WSS function can be formed using consecutive outputs OUT2 3403b and OUT3 3403c along with IN3 3402c, and a 1 by 2 WSS function can be formed using consecutive outputs OUT3 3403c and OUT4 3403d along with IN3 3402c, and a 1 by 2 WSS function can be formed using consecutive outputs OUT4 3403d and OUT5 3403e along with IN4 3402d, and a 1 by 2 WSS function can be formed using consecutive outputs OUT5 3403e and OUT6 3403f along with IN5 3402e.

It should also be noted that the structure of 3400 provides the ability to form a 2 by 1 WSS function by using any two consecutive input ports on the structure of 3400. For instance, a 2 by 1 WSS function can be formed using consecutive inputs IN1 3402a and IN2 3402b along with OUT1 3403a, and a 2 by 1 WSS function can be formed using consecutive inputs IN2 3402b and IN3 3402c along with OUT2 3403b, and a 2 by 1 WSS function can be formed using consecutive inputs IN3 3402c and IN4 3402d along with OUT4 3403d, and a 2 by 1 WSS function can be formed using consecutive inputs IN4 3402d and IN5 3402e along with OUT5 3403e, and a 2 by 1 WSS function can be formed using consecutive inputs IN5 3402e and IN6 3402f along with OUT6 3403f.

Any combination of 1 by 3 WSS functions, 1 by 2 WSS functions, 3 by 1 WSS functions, 2 by 1 WSS functions, and 1 by 1 WSS functions can be created using the wavelength equalizing array 3400. For instance, wavelength equalizing array 3400 can be used to implement a single 1 by 3 WSS function, a single 1 by 2 WSS function, and a single 1 by 1 WSS function. Alternatively, the wavelength equalizing array 3400 can be used to implement two 1 by 2 WSS functions, and two 1 by 1 WSS functions. In this way, a single wavelength equalizing array device can be used in a product to create a product with multiple distinct capabilities, while not incurring the cost and complexity of creating a single 6 by 6 WSS function.

It should be noted that when using the 1 by 4 WSS function (comprising of IN3 3402c, OUT1 3403a, OUT2 3403b, OUT3 3403c, and OUT4 3403c), the last two wavelength equalizers can be used to form either two 1 by 1 WSS functions or a single 1 by 2 WSS function (using IN5 3402e as the input), or one 2 by 1 WSS function (using OUT6 3403f as the output).

The optical device 3400 may be described without the concept of modes of operation by simply noting the possible paths between optical inputs and optical outputs within the device. From FIG. 34, it can be noted that there is an optical path between input 3402a and output 3403a, and there is an optical path between input 3402b and output 3403b, and there is an optical path between input 3402b and output 3403a, but there is no optical path that exists between input 3402a and output 3403b. Therefore optical device 3400 comprises, a wavelength directing function, a first optical input 3402a used to provide a first source of wavelengths to the wavelength directing function, a second optical input 3402b used to provide a second source of wavelengths to the wavelength directing function, a first optical output 3403a used to output a first set of wavelengths from the wavelength directing function, and a second optical output 3403b used to output a second set of wavelengths from the wavelength directing function, wherein the wavelength directing function a is operable to pass and block individual wavelengths from the first optical input 3402a to the first optical output 3403a and from the second optical input 3402b to the first optical output 3403a and from the second optical input 3402b to the second optical output 3403b, and wherein the wavelength directing function is not operable to pass and block individual wavelengths from the first optical input 3402a to the second optical output 3403b.

The optical device 3400, further comprises, a third optical input 3402c, used to provide a third source of wavelengths to the wavelength directing function, and a third optical output 3403c used to output a third set of wavelengths from the wavelength directing function, wherein the wavelength directing function is operable to pass and block individual wavelengths from the third optical input 3402c to the first optical output 3403a and from the third optical input 3402c to the second optical output 3403b and from the third optical input 3402c to the third optical output 3403c, and wherein the wavelength directing function is not operable to pass and block individual wavelengths from the first optical input 3402a to the third optical output 3403c and from the second optical input 3402b to the third optical output 3403c.

The optical device 3400, further comprises, a fourth optical input 3402d, used to provide a fourth source of wavelengths to the wavelength directing function, and a fourth optical output 3403d used to output a fourth set of wavelengths from the wavelength directing function, wherein the wavelength directing function is operable to pass and block individual wavelengths from the third optical input 3402c to the fourth optical output 3403d and from the fourth optical input 3402d to the fourth optical output 3403d, and wherein the wavelength directing function is not operable to pass and block individual wavelengths from the first optical input 3402a to the fourth optical output 3403d and from the second optical input 3402b to the fourth optical output 3403d and from the fourth optical input 3402d to the first optical output 3403a and from the fourth optical input 3402d to the second optical output 3403b and from the fourth optical input 3402d to the third optical output 3403c.

The optical device of 3400, further comprises, a fifth optical input 3402e, used to provide a fifth source of wavelengths to the wavelength directing function, and a fifth optical output 3403e used to output a fifth set of wavelengths from the wavelength directing function, wherein the wavelength directing function is operable to pass and block individual wavelengths from the fourth optical input 3402d to the fifth optical output 3403e and from the fifth optical input 3402e to the fifth optical output 3403e, and wherein the wavelength directing function is not operable to pass and block individual wavelengths from the first optical input 3402a to the fifth optical output 3403e and from the second optical input 3402b to the fifth optical output 3403e and from the third optical input 3402c to the fifth optical output 3403e and from the fifth optical input 3402e to the first optical output 3403a and from the fifth optical input 3402e to the second optical output 3403b and from the fifth optical input 3402e to the third optical output 3403c and from the fifth optical input 3402e to the fourth optical output 3403d.

The optical device of 3400, further comprises, a sixth optical input 3402f, used to provide a sixth source of wavelengths to the wavelength directing function, and a sixth optical output 3403f used to output a sixth set of wavelengths from the wavelength directing function, wherein the wavelength directing function is operable to pass and block individual wavelengths from the fourth optical input 3402d to the sixth optical output 3403f and from the fifth optical input 3402e to the sixth optical output 3403f and from the sixth optical input 3402f to the sixth optical output 3403f, and wherein the wavelength directing function is not operable to pass and block individual wavelengths from the first optical input 3402a to the sixth optical output 3403f and from the second optical input 3402b to the sixth optical output 3403f and from the third optical input 3402c to the sixth optical output 3403f and from the sixth optical input 3402f to the first optical output 3403a and from the sixth optical input 3402f to the second optical output 34503b and from the six optical input 3402f to the third optical output 3403c and from the sixth optical input 3402f to the fourth optical output 3403d and from the sixth optical input 3402f to the fifth optical output 3403e.

Although wavelength equalizing array 3400 is shown as implemented with individual switches, multiplexers, and de-multiplexers, the actual switching functions can be accomplished with free-space optics wherein multiple switching and filtering functions are combined in order to accomplish identical switching and filtering functionality.

Figure 35A:
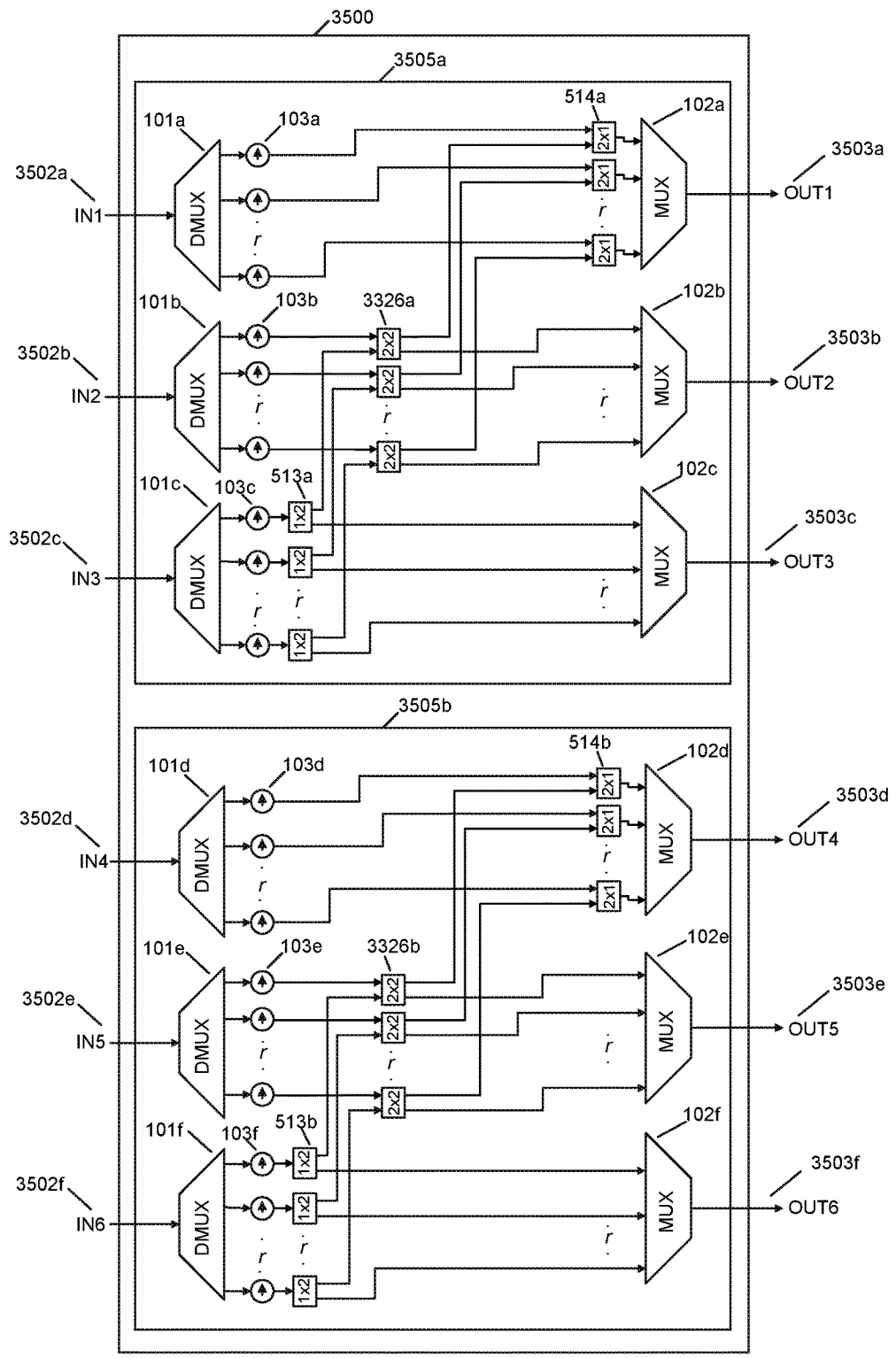
FIG. 35A is an illustration of an embodiment of a wavelength equalizing array containing six wavelength equalizers that can be configured to be any combination of 1 by 1 wavelength selective switches or 2 by 1 wavelength selective switches or 1 by 2 wavelength selective switches or 3 by 1 wavelength selective switches or 1 by 3 wavelength selective switches.

FIG. 35A is an illustration of an embodiment of a wavelength equalizing array containing six wavelength equalizers that can be configured to be any combination of 1 by 1 wavelength selective switches or 2 by 1 wavelength selective switches or 1 by 2 wavelength selective switches or 3 by 1 wavelength selective switches or 1 by 3 wavelength selective switches. Optical device 3500 comprises a first wavelength directing function 3505*a* and an identical second wavelength directing function 3505*b*.

In a first mode, the wavelength directing function 3505*a* operates as three independent 1 by 1 WSS functions. The wavelength directing function 3505*a* is programmed to operate in the first mode by configuring all the 2×1 switches of 514*a* to select their inputs from attenuators 103*a*, and by configuring all the 2×2 switches within 3326*a* to be in the cross state (such that the outputs of the attenuators 103*b* are forwarded to multiplexer 102*b*), and by configuring all the 1×2 switches in 513*a* to forward their input signals to multiplexer 102*c*.

In a second mode of operation, the wavelength directing function 3505*a* operates as a single 3 by 1 WSS function. When the wavelength directing function 3505*a* is operating as a 3 by 1 WSS function, the inputs IN1 3502*a*, IN2 3502*b*, and IN3 3502*c* are used, and the output OUT1 3503*a* is used. The wavelength directing function 3505*a* is programmed to operate in the second mode by configuring all the 1×2 switches of 513*a* to forward their inputs to the 2×2 switches 3326*a*. Then in order to select a given wavelength from IN3 3502*c*, the 2×2 switch of 3326*a* corresponding to the given wavelength is set to the cross state, and the 2×1 switch of 514*a* corresponding to the given wavelength is set to choose its input from the 2×2 switch 3326*a* of the given wavelength. In order to select a given wavelength from IN2 3502*b*, the 2×2 switch of 3326*a* corresponding to the given wavelength is set to the straight through state, and the 2×1 switch of 514*a* corresponding to the given wavelength is set to choose its input from the 2×2 switch 3326*a* of the given wavelength. In order to select a given wavelength from IN1 3502*a*, the 2×1 switch of 514*a* corresponding to the given wavelength is set to choose its input from the attenuator 103*a* corresponding to the given wavelength.

In a third mode of operation, the wavelength directing function 3505*a* operates as a single 1 by 3 WSS function. When the wavelength directing function 3505*a* is operating as a 1 by 3 WSS function, the input IN3 3502*c* is used, and the outputs OUT1 3503*a*, OUT2 3503*b*, and OUT3 3503*c* are used. The wavelength directing function 3505*a* is programmed to operate in the third mode by configuring all the 2×1 switches of 514*a* to select their inputs from the 2×2 switches 3326*a*. Then in order to forward a given wavelength from IN3 3502*c* to OUT3 3503*c*, the 1×2 switch of 513*a* corresponding to the given wavelength is set to forward its input to multiplexer 102*c*. In order to forward a given wavelength from IN3 3502*c* to OUT2 3503*b*, the 1×2 switch of 513*a* corresponding to the given wavelength is set to forward its input to the 2×2 switch of 3326*a* corresponding to the given wavelength, and the 2×2 switch of 3326*a* that corresponds to the given wavelength is set to the straight through state, such that the wavelength is directed to multiplexer 102*b*. In order to forward a given wavelength from IN3 3502*c* to OUT1 3503*a*, the 1×2 switch of 513*a* corresponding to the given wavelength is set to forward its input to the 2×2 switch of 3326*a* corresponding to the given wavelength, and the 2×2 switch of 3326*a* that corresponds o the given wavelength is set to the cross state, such that the wavelength is directed to the switches 514*a*.

In a fourth mode of operation, the wavelength directing function 3505*a* operates as a 2 by 1 WSS function and a 1 by 1 WSS function, using inputs IN1 3502*a* and IN2 3502*b* and output OUT1 3503*a* as the inputs and output of the 2 by 1 WSS function, while setting all the switches of 513*a* to direct their inputs to multiplexer 102*c*, and setting all the switches 3326*a* to be in the straight through state, and then using switches 514*a* to select wavelengths from either attenuators 103*a* or the 2×2 switches 3326*a*.

In a fifth mode of operation, the wavelength directing function 3505*a* operates as a 2 by 1 WSS function and a 1 by 1 WSS function, using inputs IN2 3502*b* and IN3 3502*c* and output OUT2 3503*b* as the inputs and output of the 2 by 1 WSS function, while setting all the switches of 514*a* to select their inputs from attenuators 103*a*, and setting all the switches 513*a* to forward their inputs to the 2×2 switches 3326*a*, and then using switches 3326*a* to select wavelengths from either attenuators 103*b* or the 1×2 switches 513*a*.

In a sixth mode of operation, the wavelength directing function 3505*a* operates as a 2 by 1 WSS function and a 1 by 1 WSS function, using inputs IN1 3502*a* and IN3 3502*c* and output OUT1 3503*a* as the inputs and output of the 2 by 1 WSS function, while setting all the switches of 513*a* to direct their inputs to switches 3326*a*, and setting all the switches 3326*a* to the cross state (such that the outputs of the attenuators 103*b* are forwarded to multiplexer 102*b*, and the inputs from 513*a* are forwarded to switches 514*a*), and then using switches 514*a* to select wavelengths from either attenuators 103*a* or the 2×2 switches 3326*a*.

In a seventh mode of operation, the wavelength directing function 3505*a* operates as 1 by 2 WSS function and a 1 by 1 WSS function, using input IN2 3502*b* and outputs OUT2 3503*b* and OUT1 3503*a* as the input and outputs of the 1 by 2 WSS function, while setting all the switches of 513*a* to forward their inputs to multiplexer 102*c*, and setting all the switches of 514*a* to select their inputs from the 2×2 switches 3326*a*, and then using the switches 3326*a* to direct wavelengths to either the switches 514*a* or the multiplexer 102*b*.

In an eighth mode of operation, the wavelength directing function 3505*a* operates as 1 by 2 WSS function and a 1 by 1 WSS function, using input IN3 3502*c* and outputs OUT2 3503*b* and OUT3 3503*c* as the input and outputs of the 1 by 2 WSS function, while setting all the switches of 514*a* to select their inputs the attenuators 103*a*, and setting all the switches of 3326*a* to be in the straight through state, and then using the switches 513*a* to direct wavelengths to either the switches 3326*a* or the multiplexer 102*c*.

In a ninth mode of operation, the wavelength directing function 3505*a* operates as 1 by 2 WSS function and a 1 by 1 WSS function, using input IN3 3502*c* and outputs OUT1 3503*a* and OUT3 3503*c* as the input and outputs of the 1 by 2 WSS function, while setting all the switches of 514*a* to select their inputs from the 2×2 switches 3326*a*, and setting all the switches of 3326*a* to be in the cross state, and then using the switches 513*a* to direct wavelengths to either the switches 3326*a* or the multiplexer 102*c*.

The optical device 3500 may be described without the concept of modes of operation by simply noting the possible paths between optical inputs and optical outputs within the device. From FIG. 35A, it can be noted that there is an optical path between input 3502*a* and output 3503*a*, and there is an optical path between input 3502*b* and output 3503*b*, and there is an optical path between input 3502*b* and output 3503*a*, but there is no optical path that exists between input 3502*a* and output 3503*b*. Therefore optical device 3500 comprises, a wavelength directing function 3505*a*, a first optical input 3502*a* used to provide a first source of wavelengths to the wavelength directing function, a second optical input 3502*b* used to provide a second source of wavelengths to the wavelength directing function, a first optical output 3503*a* used to output a first set of wavelengths from the wavelength directing function, and a second optical output 3503*b* used to output a second set of wavelengths from the wavelength directing function, wherein the wavelength directing function 3505*a* is operable to pass and block individual wavelengths from the first optical input 3502*a* to the first optical output 3503*a* and from the second optical input 3502*b* to the first optical output 3503*a* and from the second optical input 3502*b* to the second optical output 3503*b*, and wherein the wavelength directing function is not operable to pass and block individual wavelengths from the first optical input 3502*a* to the second optical output 3503*b*.

The optical device 3500, further comprises, a third optical input 3502*c* used to provide a third source of wavelengths to the wavelength directing function, and a third optical output 3503*c* used to output a third set of wavelengths from the wavelength directing function, wherein the wavelength directing function 3505*a* is operable to pass and block individual wavelengths from the third optical input 3502*c* to the first optical output 3503*a* and from the third optical input 3502*c* to the second optical output 3503*b* and from the third optical input 3502*c* to the third optical output 3503*c*, and wherein the wavelength directing function 3505*a* is not operable to pass and block individual wavelengths from the first optical input 3502*a* to the third optical output 3503*c* and from the second optical input 3502*b* to the third optical output 3503*c*.

The optical device 3500, further comprises, a second wavelength directing function 3505*b*, a fourth optical input 3502*d* used to provide a first source of wavelengths to the second wavelength directing function 3505*b*, a fifth optical input 3502*e* used to provide a second source of wavelengths to the second wavelength directing function 3505*b*, a sixth optical input 3502*f* used to provide a third source of wavelengths to the second wavelength directing function 3505*b*, a fourth optical output 3503*d* used to output a first set of wavelengths from the second wavelength directing function 3505*b*, a fifth optical output 3503*e* used to output a second set of wavelengths from the second wavelength directing function 3505*b*, a sixth optical output 3503*f* used to output a third set of wavelengths from the second wavelength directing function 3505*b*, wherein the second wavelength directing function 3505*b* is only operable to pass and block individual wavelengths from the fourth optical input 3502*d* to the fourth optical output 3503*d* and from fifth optical input 3502*e* to the fourth optical output 3503*d* and from the fifth optical input 3502*e* to the fifth optical output 3503*e* and from sixth optical input 3502*f* to the fourth optical output 3503*d* and from the sixth optical input 3502*f* to the fifth optical output 3503*e* and from the sixth optical input 3502*f* to the sixth optical output 3503*f*.

Figure 35B:
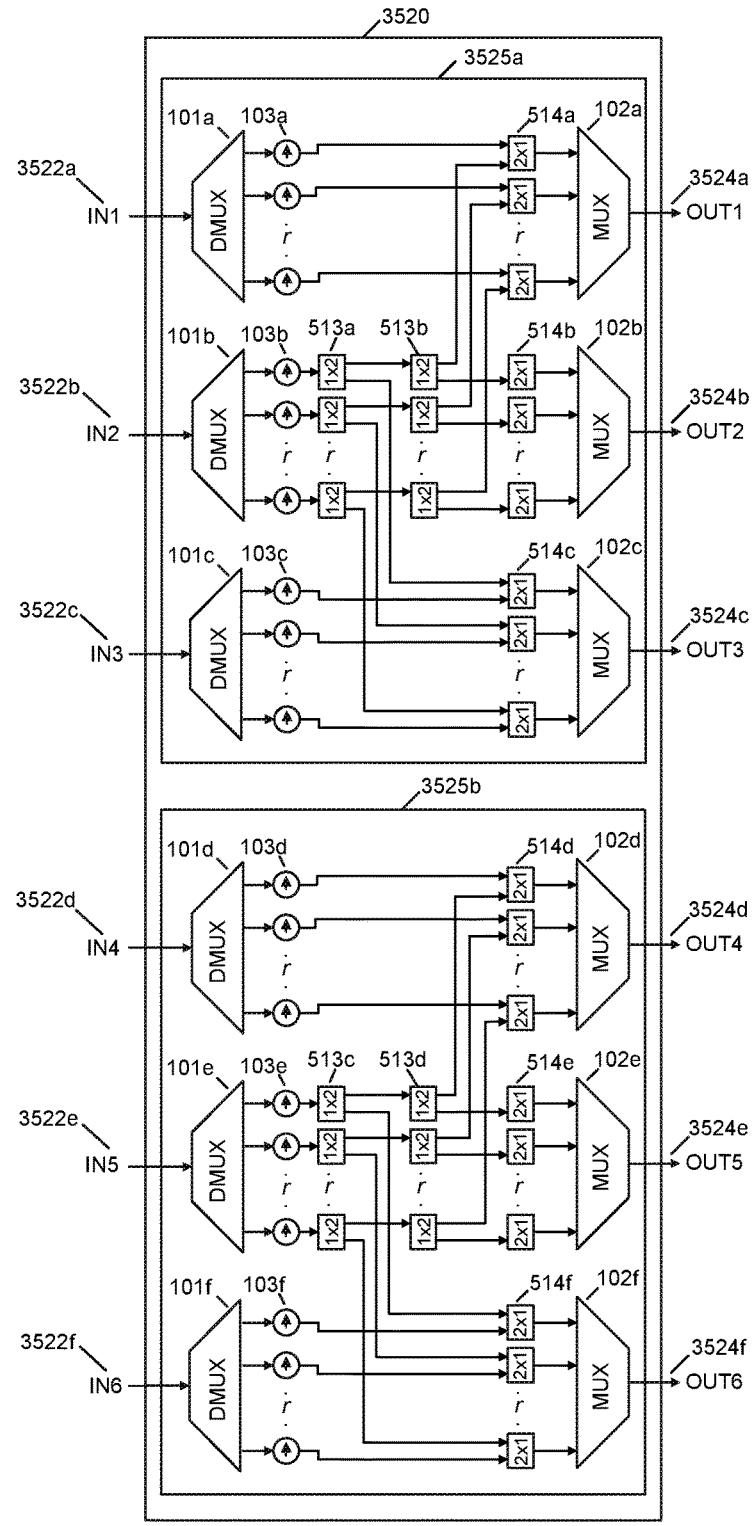
FIG. 35B is an illustration of an embodiment of a wavelength equalizing array containing six wavelength equalizers that can be configured to be any combination of 1 by 1 wavelength selective switches or 2 by 1 wavelength selective switches or 1 by 2 wavelength selective switches or 1 by 3 wavelength selective switches.

FIG. 35B is an illustration of an embodiment of a wavelength equalizing array 3520 containing six wavelength equalizers that can be configured to be any combination of 1 by 1 wavelength selective switches or 2 by 1 wavelength selective switches or 1 by 2 wavelength selective switches or 1 by 3 wavelength selective switches. The optical device 3520 comprises of two identical wavelength directing functions 3525*a* and 3525*b*. The wavelength directing functions 3525*ab* are similar to the wavelength directing function 3505*a* of FIG. 35A, except that the wavelength directing functions 3525*ab* are not capable of operating as 3 by 1 WSS functions, and therefore are more limited in their functionality.

Optical device 3520 comprises: a wavelength directing function 3525*a*, a first optical input 3522*a* used to provide a first source of wavelengths to the wavelength directing function 3525*a*, a second optical input 3522*b* used to provide a second source of wavelengths to the wavelength directing function 3525*a*, a first optical output 3524*a* used to output a first set of wavelengths from the wavelength directing function 3525*a*, and a second optical output 3524*b* used to output a second set of wavelengths from the wavelength directing function 3525*a*, wherein the wavelength directing function 3525*a* is operable to pass and block individual wavelengths from the first optical input 3522*a* to the first optical output 3524*a* and from the second optical input 3522*b* to the first optical output 3524*a* and from the second optical input 3522*b* to the second optical output 3524*b*, and wherein the wavelength directing function 3525*a* is not operable to pass and block individual wavelengths from the first optical input 3522*a* to the second optical output 3524*b*.

The optical device 3520 further comprises: a third optical input 3522*c*, used to provide a third source of wavelengths to the wavelength directing function 3525*a*, and a third optical output 3524*c* used to output a third set of wavelengths from the wavelength directing function 3525*a*, wherein the wavelength directing function 3525*a* is operable to pass and block individual wavelengths from the third optical input 3522*c* to the third optical output 3524*c* and from the second optical input 3522*b* to the third optical output 3524*c*, and wherein the wavelength directing function 3525*a* is not operable to pass and block individual wavelengths from the first optical input 3522*a* to the third optical output 3524*c* and from the third optical input 3522*c* to the first optical output 3524*a* and from the third optical input 3522*c* to the second optical output 3524*b*.

Figure 35C:
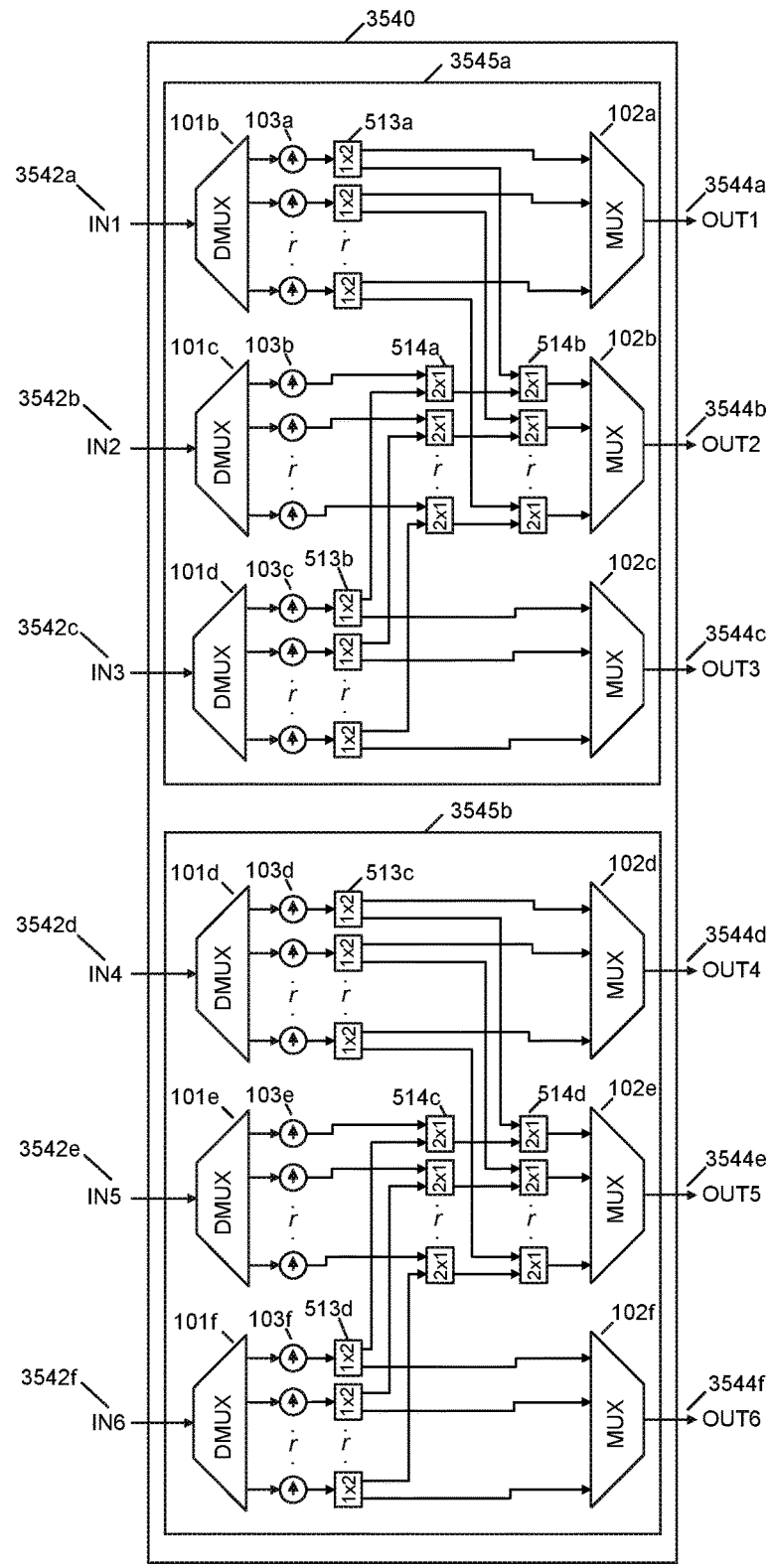
FIG. 35C is an illustration of an embodiment of a wavelength equalizing array containing six wavelength equalizers that can be configured to be any combination of 1 by 1 wavelength selective switches or 2 by 1 wavelength selective switches or 1 by 2 wavelength selective switches or 3 by 1 wavelength selective switches.

FIG. 35C is an illustration of an embodiment of a wavelength equalizing array 3540 containing six wavelength equalizers that can be configured to be any combination of 1 by 1 wavelength selective switches or 2 by 1 wavelength selective switches or 1 by 2 wavelength selective switches or 3 by 1 wavelength selective switches. The optical device 3540 comprises of two identical wavelength directing functions 3545*a* and 3545*b*. The wavelength directing functions 3545*ab* are similar to the wavelength directing function 3505*a* of FIG. 35A, except that the wavelength directing functions 3545*ab* are not capable of operating as 1 by 3 WSS functions, and therefore are more limited in their functionality.

Optical device 3540 comprises: a wavelength directing function 3545*a*, a first optical input 3542*a* used to provide a first source of wavelengths to the wavelength directing function 3545*a*, a second optical input 3542*b* used to provide a second source of wavelengths to the wavelength directing function 3545*a*, a first optical output 3544*a* used to output a first set of wavelengths from the wavelength directing function 3545*a*, and a second optical output 3544*b* used to output a second set of wavelengths from the wavelength directing function 3545*a*, wherein the wavelength directing function 3545*a* is operable to pass and block individual wavelengths from the first optical input 3542*a* to the first optical output 3544*a* and from the first optical input 3542*a* to the second optical output 3544*b* and from the second optical input 3542*b* to the second optical output 3544b, and wherein the wavelength directing function 3545a is not operable to pass and block individual wavelengths from the second optical input 3542b to the first optical output 3544a.

The optical device 3540, further comprises: a third optical input 3542c used to provide a third source of wavelengths to the wavelength directing function 3545a, and a third optical output 3544c used to output a third set of wavelengths from the wavelength directing function 3545a, wherein the wavelength directing function 3545a is operable to pass and block individual wavelengths from the third optical input 3542c to the second optical output 3544b and from the third optical input 3542c to the third optical output 3544c, and wherein the wavelength directing function 3545a is not operable to pass and block individual wavelengths from the first optical input 3542a to the third optical output 3544c and from the second optical input 3542b to the third optical output 3544c and from the third optical input 3542c to the first optical output 3544a.

Figure 36:
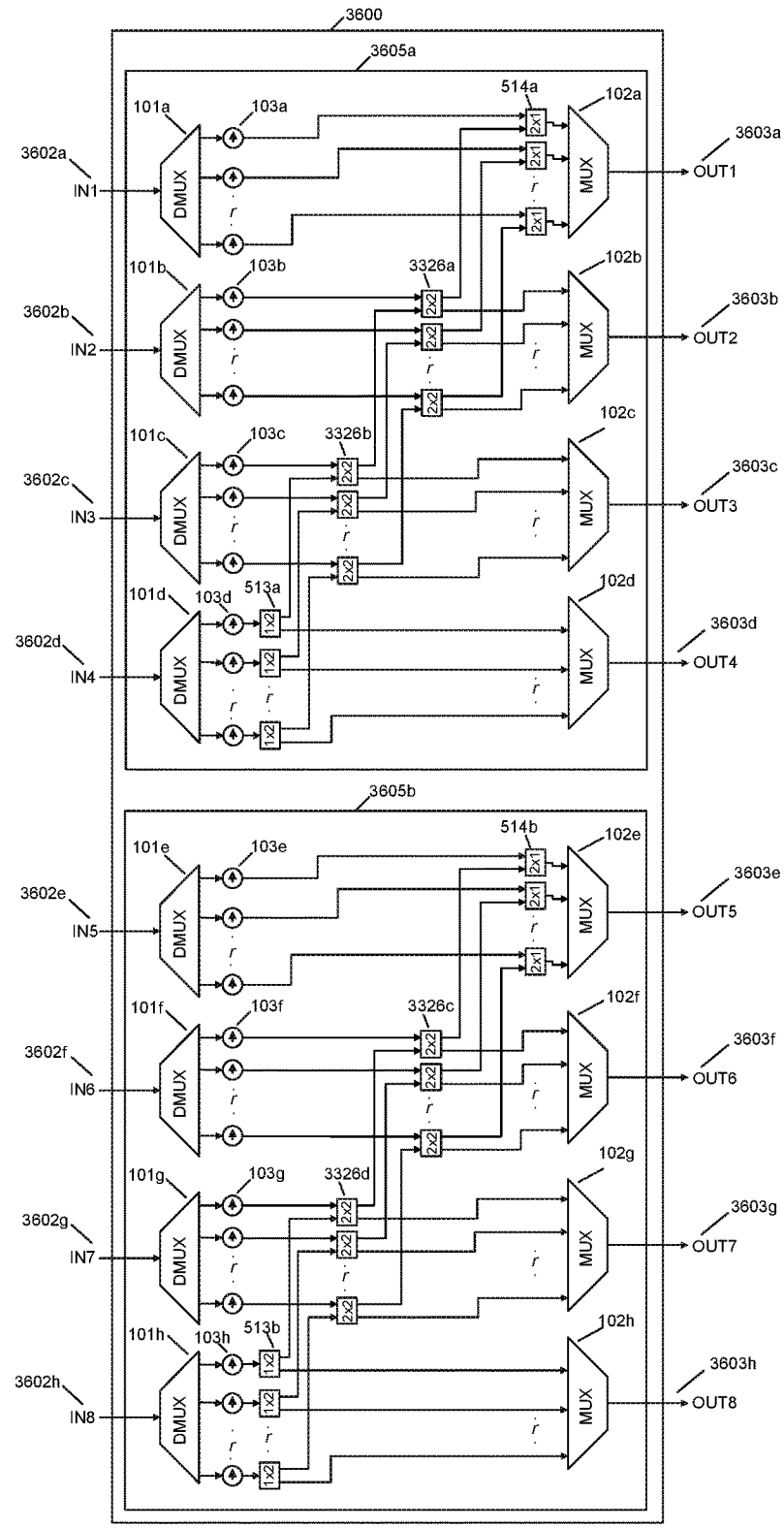
FIG. 36 is an illustration of an embodiment of a wavelength equalizing array containing eight wavelength equalizers that can be configured to be any combination of 1 by 1 wavelength selective switches or 2 by 1 wavelength selective switches or 1 by 2 wavelength selective switches or 3 by 1 wavelength selective switches or 1 by 3 wavelength selective switches or 4 by 1 wavelength selective switches or 1 by 4 wavelength selective switches.

FIG. 36 is an illustration of an embodiment of a wavelength equalizing array 3600 containing eight wavelength equalizers that can be configured to be any combination of 1 by 1 wavelength selective switches or 2 by 1 wavelength selective switches or 1 by 2 wavelength selective switches or 3 by 1 wavelength selective switches or 1 by 3 wavelength selective switches or 4 by 1 wavelength selective switches or 1 by 4 wavelength selective switches. Each of the two wavelength directing functions 3605ab within 3600 operate identically to the wavelength directing function 3505a of FIG. 35a with respect to the first three inputs 3602a-c, 3602e-g and with respect to the first three outputs 3603a-c, 3603e-g of the two wavelength directing functions 3605ab. However, since because each of the two wavelength directing functions 3605ab have an additional input 3602d, 3602h, and an additional output 3603d, 3603h, and an additional set of 2×2 switches, each of the two wavelength directing functions 3605ab can be operated as 1 by 4 WSS functions and 4 by 1 WSS functions. When operating as 1 by 4 WSS functions, inputs IN4 3602d and IN8 3602h are the inputs to the two 1 by 4 WSS functions. When operating as 4 by 1 WSS functions, outputs OUT1 3603a and OUT5 3603e are the outputs of the two 4 by 1 WSS functions.

Therefore, optical device 3600 comprises, a wavelength directing function 3605a, a first optical input 3602a used to provide a first source of wavelengths to the wavelength directing function 3605a, a second optical input 3602b used to provide a second source of wavelengths to the wavelength directing function 3605a, a first optical output 3603a used to output a first set of wavelengths from the wavelength directing function 3605a, and a second optical output 3603b used to output a second set of wavelengths from the wavelength directing function 3605a, wherein the wavelength directing function 3605a is operable to pass and block individual wavelengths from the first optical input 3602a to the first optical output 3603a and from the second optical input 3602b to the first optical output 3603a and from the second optical input 3602b to the second optical output 3603b, and wherein the wavelength directing function is not operable to pass and block individual wavelengths from the first optical input 3602a to the second optical output 3603b.

The optical device 3500, further comprises, a third optical input 3602c, used to provide a third source of wavelengths to the wavelength directing function 3605a, and a third optical output 3603c used to output a third set of wavelengths from the wavelength directing function 3605a, wherein the wavelength directing function 3605a is operable to pass and block individual wavelengths from the third optical input 3602c to the first optical output 3603a and from the third optical input 3602c to the second optical output 3603b and from the third optical input 3602c to the third optical output 3603c, and wherein the wavelength directing function 3605a is not operable to pass and block individual wavelengths from the first optical input 3602a to the third optical output 3603c and from the second optical input 3602b to the third optical output 3603c.

The optical device 3600, further comprises, a fourth optical input 3602d, used to provide a fourth source of wavelengths to the wavelength directing function 3605a, and a fourth optical output 3603d used to output a fourth set of wavelengths from the wavelength directing function 3605a, wherein the wavelength directing function 3605a is operable to pass and block individual wavelengths from the fourth optical input 3602d to the first optical output 3603a and from the fourth optical input 3602d to the second optical output 3603b and from the fourth optical input 3602d to the third optical output 3603c and from the fourth optical input 3602d to the fourth optical output 3603d, and wherein the wavelength directing function 3605a is not operable to pass and block individual wavelengths from the first optical input 3602a to the fourth optical output 3603d and from the second optical input 3602b to the fourth optical output 3603d and from the third optical input 3602c to the fourth optical output 3603d.

FIG. 37A is an illustration of a wavelength equalizing array containing eight wavelength equalizers that can be configured to be any combination of 1 by 1 wavelength selective switches or 2 by 1 wavelength selective switches or 1 by 2 wavelength selective switches. Each wavelength directing function 3725a-d behaves in a manner identical to the wavelength directing functions 511a-c of wavelength equalizing array 510 if the inputs and outputs of each wavelength equalizer 3725a-d have their numbering reversed.

FIG. 37B is a simplified schematic diagram of the wavelength equalizing array of FIG. 37A, that shows the permissible flow of wavelengths through the wavelength equalizing array. For instance, the top horizontal arrow within 3725a of FIG. 37B illustrates that wavelengths may be directed from the first input to the first output, and the bottom horizontal arrow within 3725a of FIG. 37B illustrates that wavelengths may be directed from the second input to the second output, and the diagonal arrow within 3725a of FIG. 37B indicates that wavelengths may be directed from the second input to the first output, while the lack of a diagonal arrow between the first input and the second output illustrates that wavelengths cannot be directed from the first input to the second output.

FIG. 37C is a simplified schematic diagram of a wavelength equalizing array like that of FIG. 37A, except it only contains six wavelength equalizers.

Figure 38:
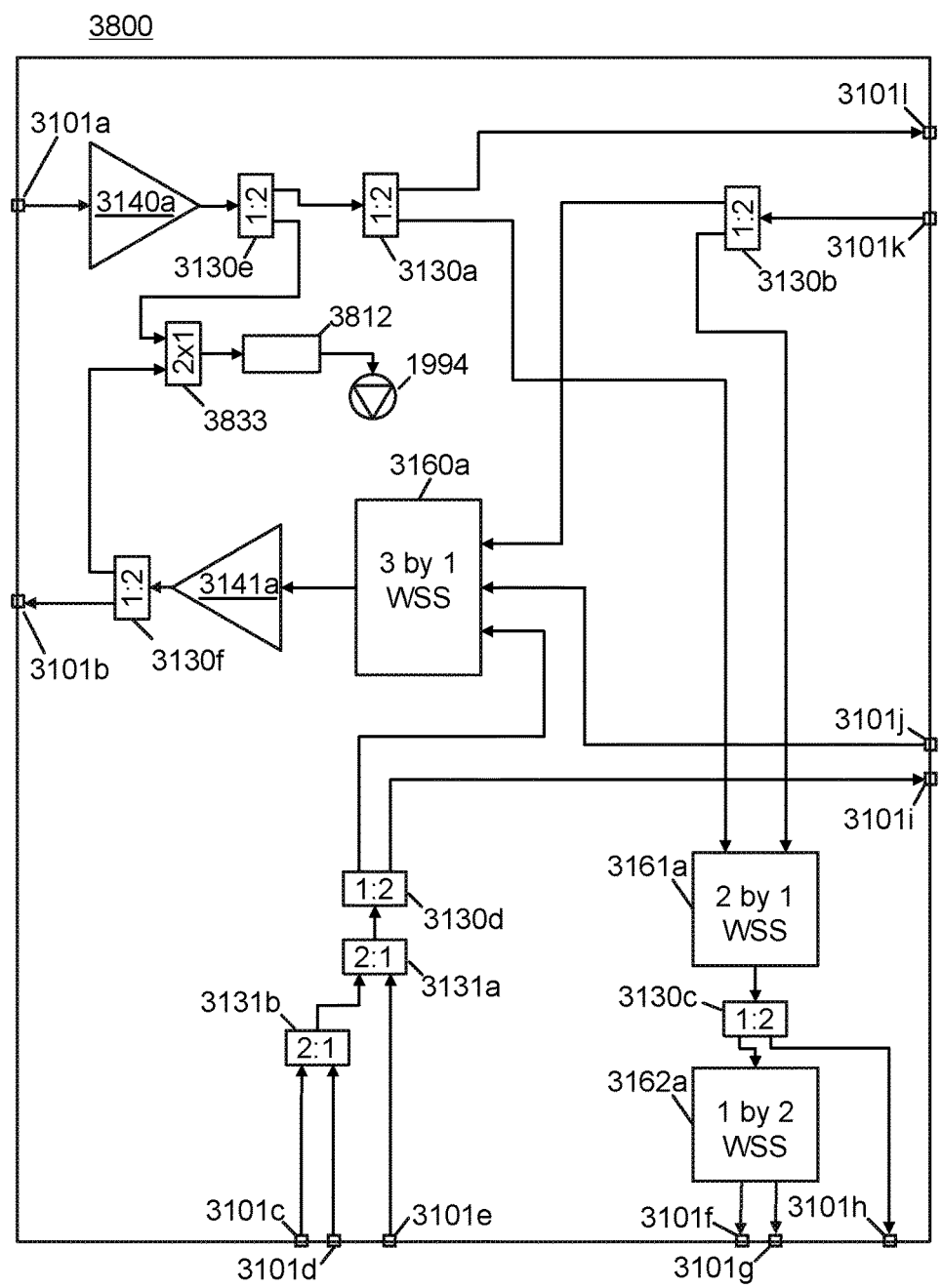
FIG. 38 is an illustration of a ROADM comprising of one optical degree, one degree express port, one add express port, and embedded add/drop ports.

FIG. 38 is an illustration of a ROADM 3800 comprising of one optical degree 3101ab, one degree express port 3101kl, one add express port 3101ij, embedded add/drop ports 3101cd, 3101fg, and an add/drop expansion port 3101e, 3101h. The ROADM 3800 behaves identically to the ROADM 3110a of FIG. 31, with the exception that the ROADM 3800 includes a photodiode 1994 used for wavelength power level measuring, a tunable filter 3812 used to select a wavelength for the photodiode 1994, optical taps in the form of 1 to 2 optical couplers 3130ef used to broadcast the wavelengths arriving and exiting the optical degree to a broadband 2 to 1 optical switch 3833 (waveguide 2 to 1 optical switch), wherein the optical switch 3833 is used to forward either wavelengths arriving at 3101*a* or wavelengths exiting 3101*b* to the tunable filter 3812.

Figure 39:
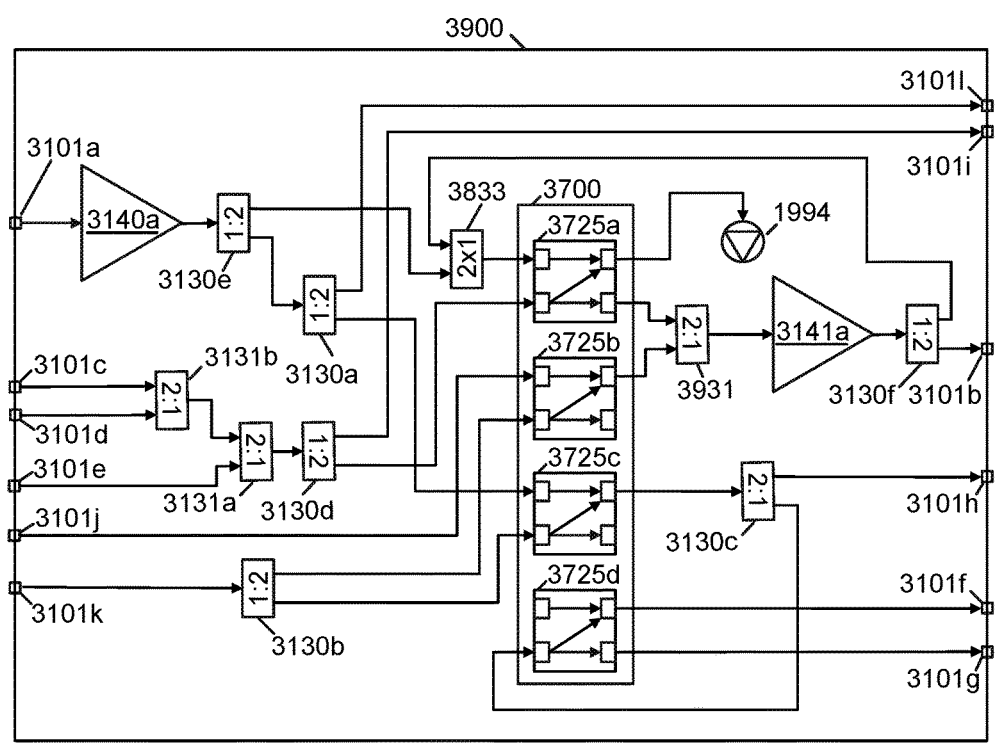
FIG. 39 is the ROADM of FIG. 38 constructed using the wavelength equalizing array 3700 of FIG. 37A.

FIG. 39 shows the ROADM of FIG. 38 constructed using the wavelength equalizing array 3700 of FIG. 37A. As can be seen in FIG. 39, the ROADM 3900 no longer includes the 3 by 1 WSS 3160*a*, the 2 by 1 WSS 3161*a*, the 1 by 2 WSS 3162*a*, or the tunable filter 3812 shown in the ROADM 3800. Instead, within the ROADM 3900, the optical device 3700 along with the coupler 3931 is used to replace all of these functions. In the ROADM 3900, the top portion of wavelength directing function 3725*a* is used to replace the tunable filter 3812, the bottom portion of wavelength directing function 3725*a* is combined with the wavelength directing function 3725*b* to replace the 3 by 1 WSS 3160*a* (using the coupler 3931), the wavelength directing function 3725*c* is used to replace the 2 by 1 WSS 3161*a*, and the wavelength directing function 3725*d* is used to replace the 1 by 2 WSS 3162*a*. This example illustrates the extreme versatility of the wavelength directing functions within 3700.

Figure 40:
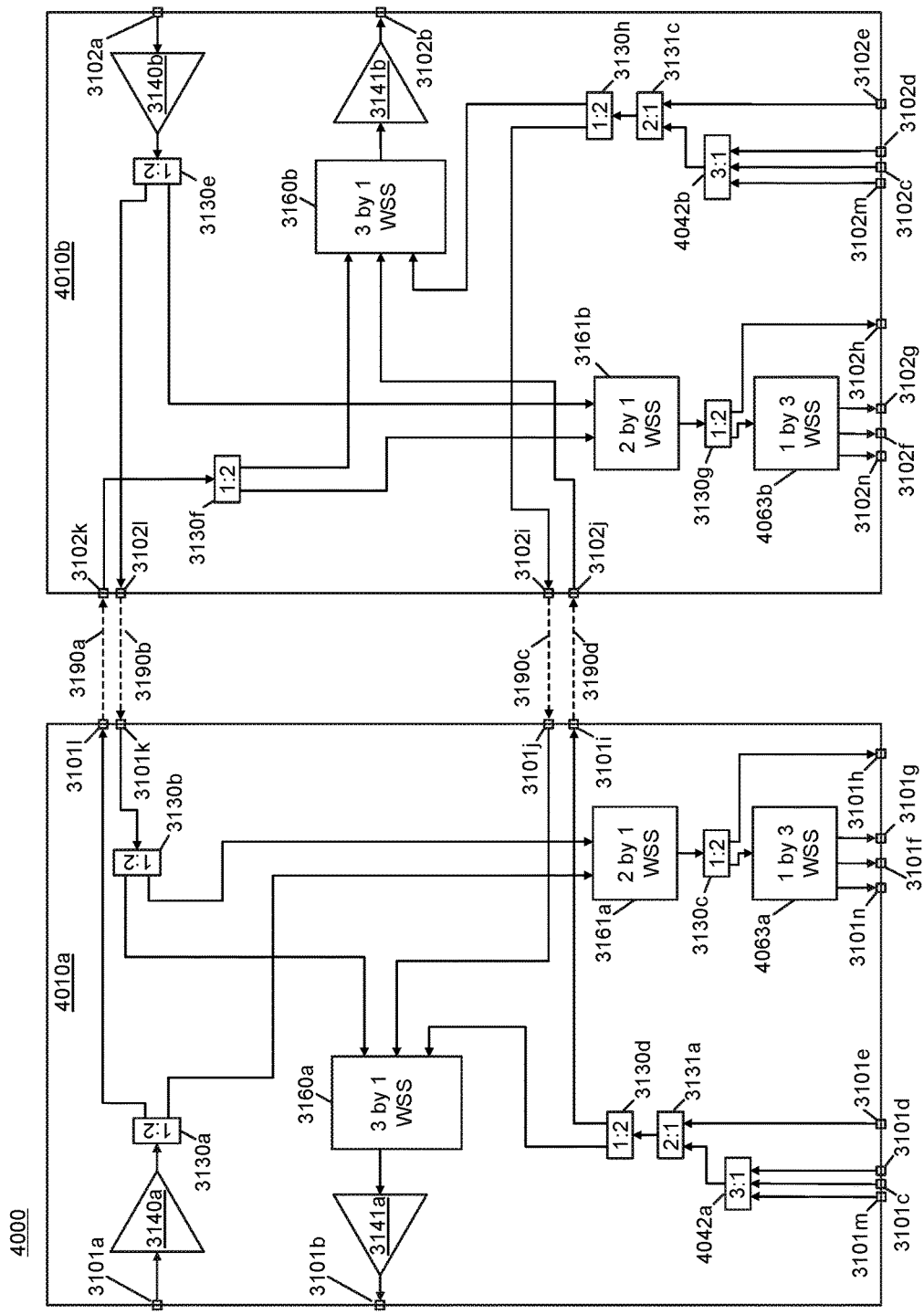
FIG. 40 is an illustration of a two-degree optical node comprised of two ROADMs with embedded individual directionless add/drop ports.

FIG. 40 is an illustration of a two-degree optical node 4000 comprised of two ROADMs 4010*ab* with embedded directionless add/drop ports 3101*cdm*, 3101*fgn* and 3102*cdm*, 3102*fgn*. Each of the ROADMs 4010*ab* behaves identically to the ROADM 3110*a* of FIG. 31, except that the ROADMs 4010*ab* each contain one additional embedded add/drop port (3 ports instead of 2). Because of this, each of the ROADMs 4010*ab* contains a 1 by 3 WSS instead of a 1 by 2 WSS.

Figure 41:
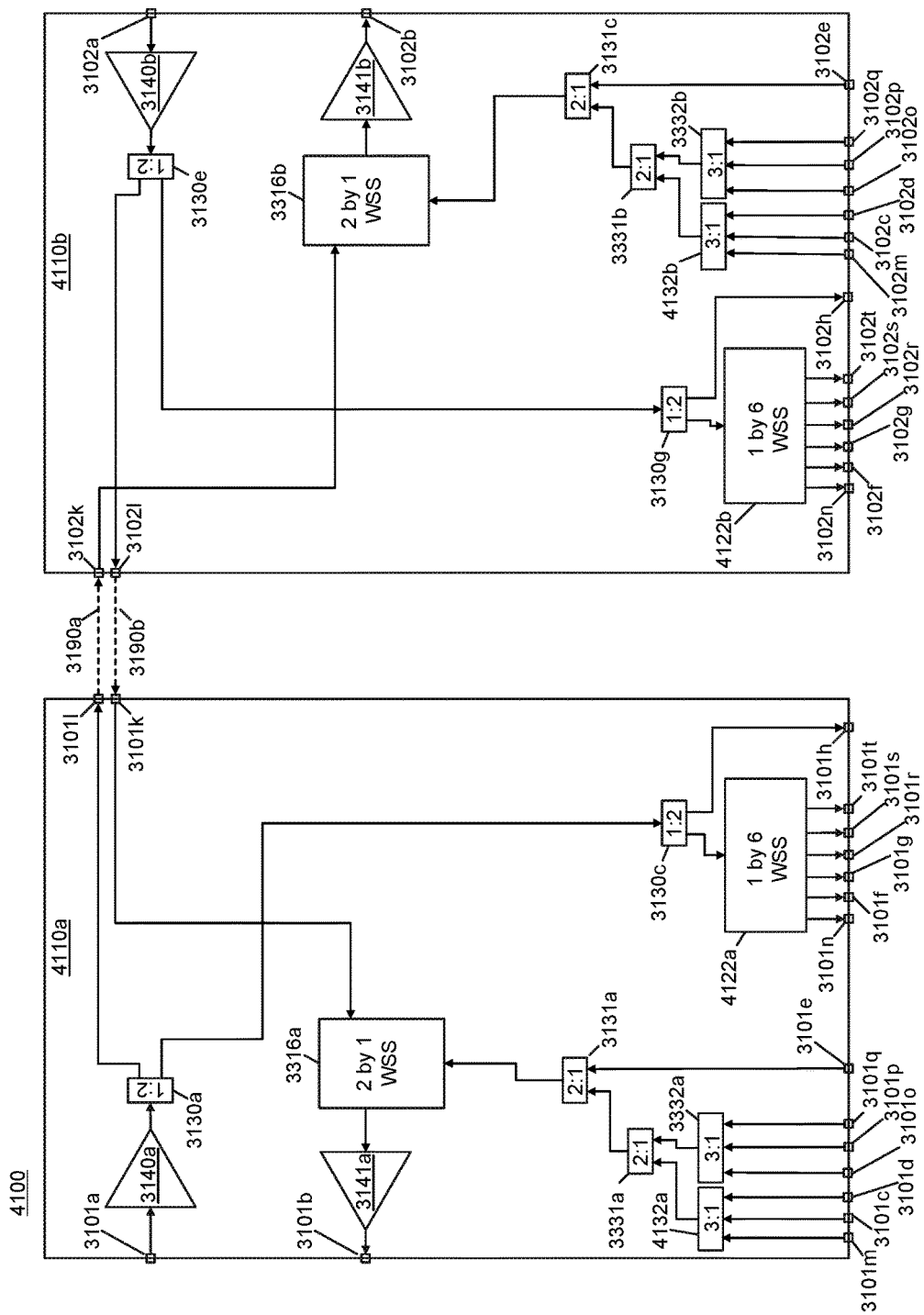
FIG. 41 is an illustration of a two-degree optical node comprised of two ROADMs with embedded individual add/drop ports.

FIG. 41 is an illustration of a two-degree optical node 4100 comprised of two ROADMs 4110*ab* with embedded add/drop ports 3101*cdmopq*, 3101*fgnrst* and 3102*cdmopq*, 3102*fgnrst* that are not directionless. The ROADMs 4110*ab* are similar to the ROADMs 4010*ab* of FIG. 40, except the ROADMS 4010*ab* each have three embedded "directionless" add/drop ports, while the ROADMs 4110*ab* each have six embedded add drop ports that are "not directionless" (but instead dedicated to a degree). Because of these differences, the ROADMs 4110*ab* each contain one 2 by 1 WSS and one 1 by 6 WSS (instead of the one 3 by 1 WSS, the one 2 by 1 WSS, and the one 1 by 3 WSS contained on the ROADMs 4010*ab*).

Figure 42A:
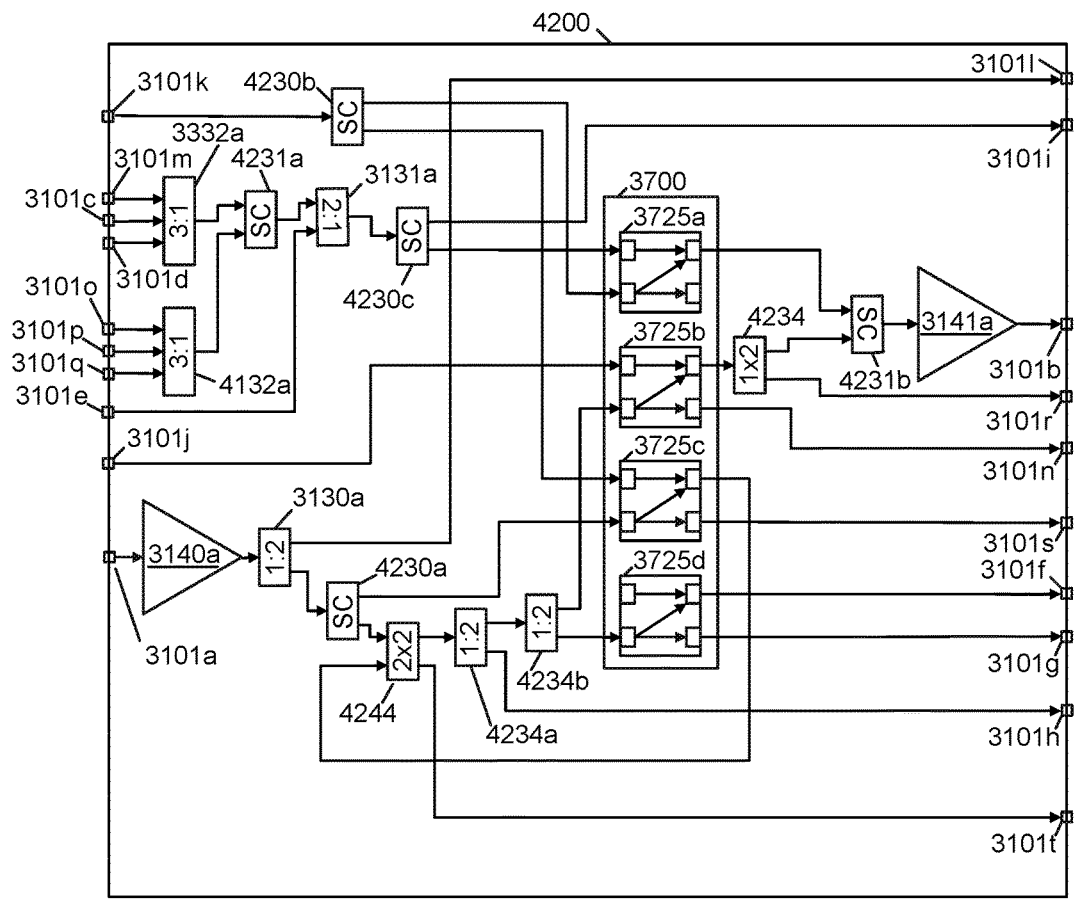
FIG. 42A is an illustration of a ROADM with two operating modes constructed using the wavelength equalizing array 3700 of FIG. 37A.

FIG. 42A is an illustration of a ROADM 4200 with two operating modes, constructed using the wavelength equalizing array 3700 of FIG. 37A. The ROADM 4200 can be configured to operate in a first mode such that it performs the function of the ROADM 4010*a* of FIG. 40, and the ROADM 4200 can be configured to operate in a second mode such that it performs the function of the ROADM 4110*a* of FIG. 41. It does this by replacing all the WSS devices contained within ROADMs 4010*a* and 4110*a* with the optical device 3700 of FIG. 37A. Configuring the ROADM 4200 to perform the function of ROADM 4010*a* or ROADM 4110*a* is done by configuring the 2×2 broadband optical switch 4244, configuring the 1×2 broadband optical switch 4234, and by configuring the five switchable optical couplers 423 lab, 4230*a-c*.

The broadband optical switches 4244 and 4234 are designed to switch an entire band of wavelengths (such as the r wavelengths shown within optical device 3700 of FIG. 37A). The broadband switches 4244 and 4234 are waveguide switches, meaning they switch at the waveguide level (i.e., the fiber level). This means that broadband switch 4234 directs ALL the wavelengths arriving on its input waveguide (i.e., input fiber) to either its top waveguide output (directed to coupler 4231*b*) or to its bottom waveguide output (directed to optical port 3101*r*). The broadband switch 4234 is not capable of directing some wavelengths to its top output and some wavelengths to its bottom output, but instead it directs all wavelengths to the top output or all wavelengths to the bottom output. Therefore, the 1×2 broadband (waveguide) switch 4234 can be implemented much simpler than a 1 by 2 WSS device, which is considered to be a wavelength switch, rather than a waveguide switch, as the 1 by 2 WSS device can selectively switch different wavelengths to each of its two output ports. For example, the 1×2 broadband switch (i.e., waveguide switch) may be implemented with simple Mach-Zehnder Interferometers.

The switchable optical couplers 423 lab and 4230*a-c* in ROADM 4200 are able to be configured with two different optical coupling ratios, the first optical coupling ratio may be that of a simple 50/50 ratio, while the second optical coupling ratio may be a 99/1 coupling ratio, although the switchable coupler (SC) is not limited to these two ratios.

Figure 42B:
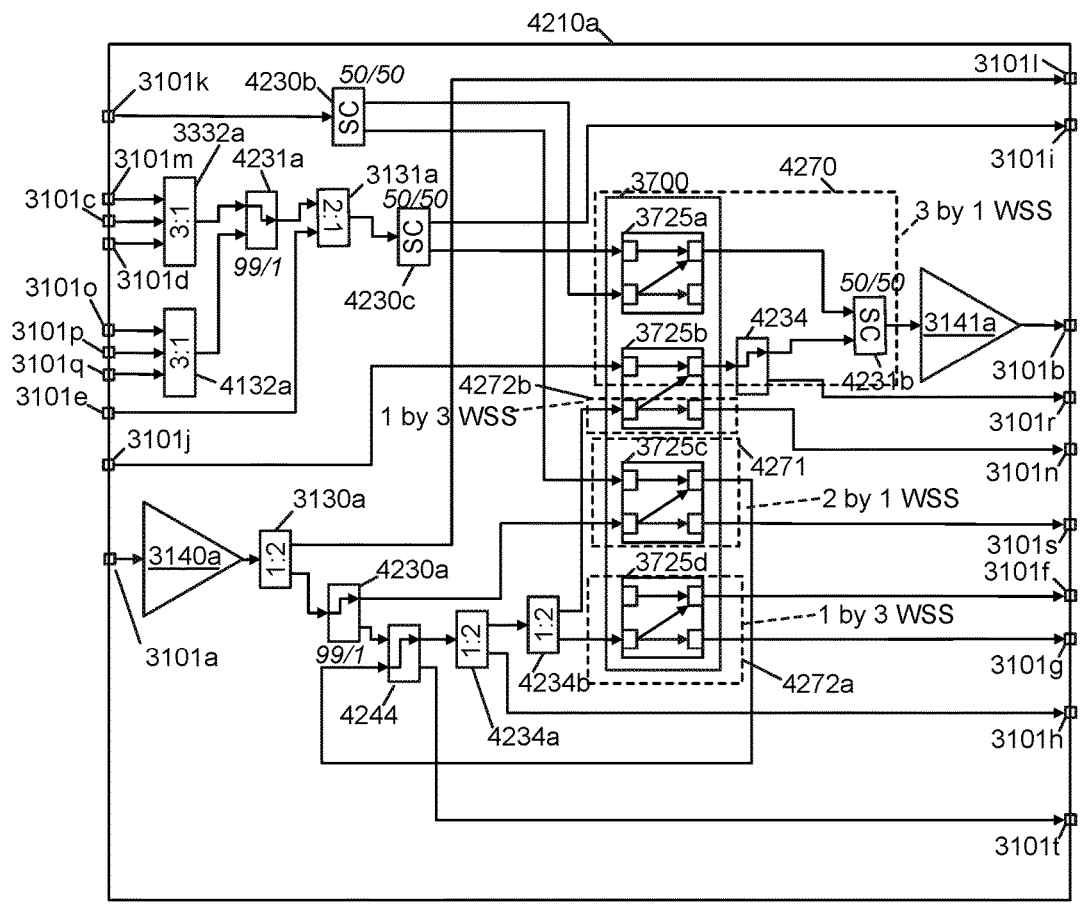
FIG. 42B is the ROADM of FIG. 42A configured to mimic the ROADM of FIG. 40.

As shown in FIG. 42B, in order to configure the ROADM 4200 to perform the function of ROADM 4010*a* of FIG. 40, switchable coupler 4231*a* is set to a 99/1 coupling ratio with 99% of the light at the output of the coupler 4231*a* from the coupler 3332*a* (essential creating a direct connect from coupler 3332*a* to coupler 3131*a*). In addition, switchable coupler 4230*c* is set to a 50/50 coupling ratio, thus mimicking the 1 to 2 coupler 3130*d* of ROADM 4010*a*. In addition, switchable coupler 4230*a* is set to a 99/1 coupler, thereby creating essentially a direct connection from coupler 3130*a* to 3725*c*. In addition, coupler 4231*b* is set to a 50/50 coupling ratio. In addition, switchable coupler 4230*b* is set to be a 50/50 coupler. In addition, 1×2 switch 4234 is set to connect its input to coupler 4231*b*. In addition, 2×2 switch 4244 is set to the cross state, thereby connecting the output of 3725*c* to coupler 4234*a*. The 3 by 1 WSS 4270 is formed by the combination of 3725*a*, the upper half of 3725*b*, and coupler 4231*b*. The 2 by 1 WSS 4271 is formed by 3 725*c*. The 1 by 3 WSS 4272*ab* is formed by 3 725*d* and the lower half of 3725*b* and coupler 4234*b*.

Figure 42C:
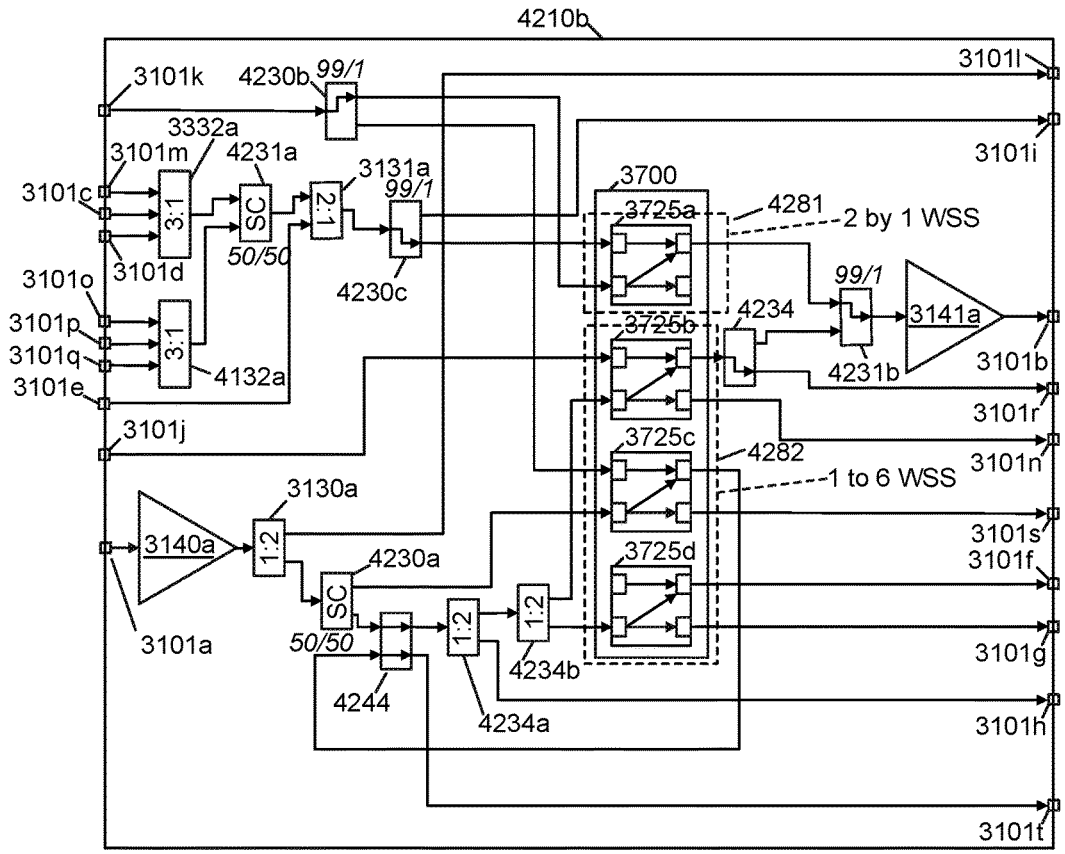
FIG. 42C is the ROADM of FIG. 42A configured to mimic the ROADM of FIG. 41.
Figure 42D:
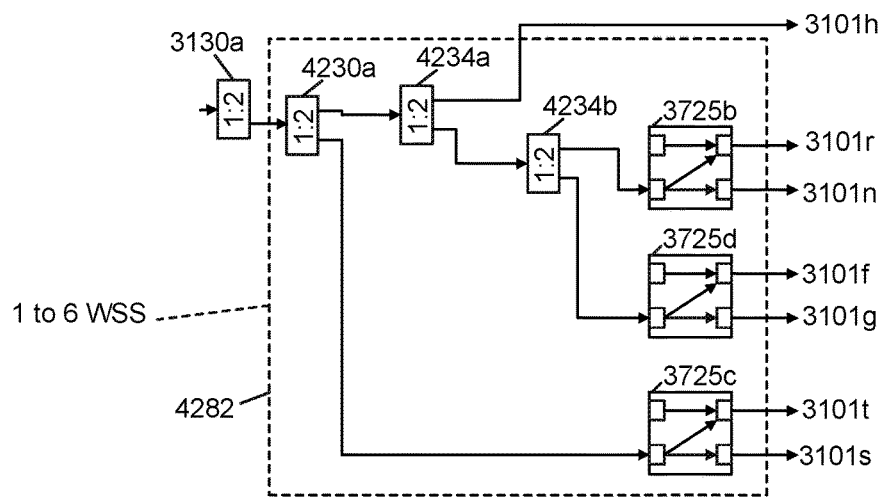
FIG. 42D is a more detailed diagram of the 1 by 6 wavelength selective switch function of the ROADM of FIG. 42C.

As shown in FIG. 42C, in order to configure the ROADM 4200 to perform the function of ROADM 4110*a* of FIG. 41, switchable coupler 4230*b* is set to a 99/1 coupling ratio, essentially creating a direct connect from input 3101*k* to 3725*a*. In addition, switchable coupler 4231*a* is set to a 50/50 coupling ratio. In addition, switchable coupler 4230*c* is set to a 99/1 coupler, thereby creating essentially a direct connection from coupler 3131*a* to 3725*a*. In addition, coupler 4230*a* is set to a 50/50 coupling ratio. In addition, switchable coupler 4231*b* is set to a 99/1 coupler, essentially creating a direct connection from 3725*a* to amplifier 3141*a*. In addition, 1×2 switch 4234 is set to connect its input to output 3101*r*. In addition, 2×2 switch 4244 is set to the straight through state, thereby connecting the output of 3725*c* to output 3101*t*, and also connecting the lower output of coupler 4230*a* to coupler 4234*a*. The 2 by 1 WSS 4281 is formed by 3 725*a*. The 1 by 6 WSS 4282 is formed by 3 725*b-d* and couplers 4230*a*, 4234*a*, and 4234*b*, as shown in greater detail in FIG. 42D.

ROADM 4200 illustrates how in a first mode of operation, a wavelength directing function 3725*c* can be utilized as a 2 by 1 WSS device, while in a second mode of operation the same wavelength directing function 3725*c* can be utilized as a 1 by 2 WSS device. It also illustrates how in the first mode of operation the unused output of the wavelength directing function 3725*c* (the output connected to port 3101*s*) can be connected in anticipation of using the output for the second mode of operation. Also, it shows a given input of the wavelength directing function (the input connected to coupler 4230*b*) can be connected to the wavelength directing function for use only during the first mode of operation.

Therefore, when converting a wavelength directing function 3725c between a 2 by 1 WSS and a 1 by 2 WSS, one input of the wavelength directing function is always dedicated to the 2 by 1 WSS function, and one output is always dedicated to the 1 by 2 WSS function, and at most only one input and one output of the wavelength directing function need to be connected to other signals when going between the two modes.

Figure 43:
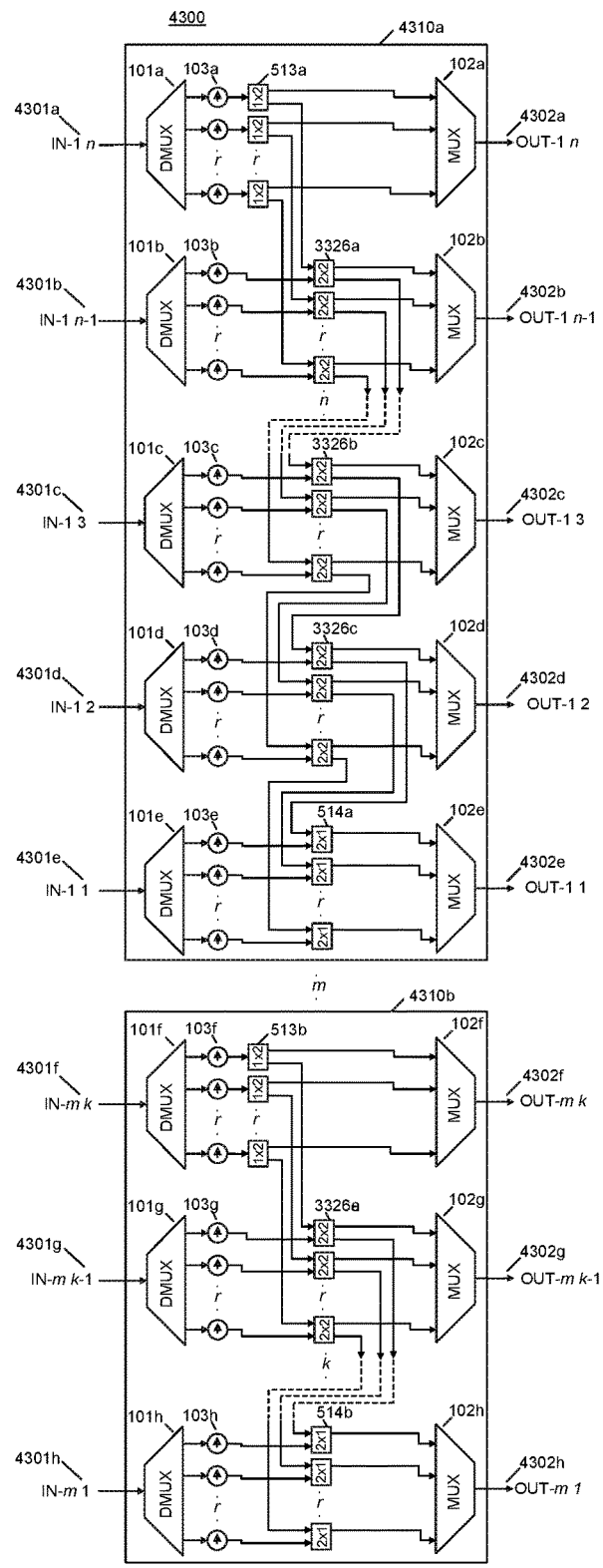
FIG. 43 is an illustration of an embodiment of a wavelength equalizing array containing m wavelength directing functions, each comprising n and k wavelength equalizers.

FIG. 43 is an illustration of an embodiment of an optical device 4300 containing m number of wavelength directing functions, each comprising some arbitrary number of wavelength equalizers. The optical device 4300 extends optical device 510 to include m number of wavelength directing functions (instead of 3), with each wavelength directing function having some arbitrary number of inputs outputs (instead of only 2 inputs and 2 outputs). Therefore, the wavelength directing function 4310a can be used to implement WSS functions as large as 1 by n WSS functions and n by 1 WSS functions, as well as any devices smaller than 1 by n WSS functions and n by 1 WSS functions.

The optical device 4300 comprises: n number of wavelength division multiplexed optical inputs 4301a-e, numbered 1 to n, n number of wavelength division multiplexed optical outputs 4302a-e, numbered 1 to n, and a wavelength directing function 4310a, wherein the wavelength directing function 4310a is operable to direct wavelengths from any given input i of the n number of wavelength division multiplexed optical inputs 4301a-e to only outputs 1 to i of the n number of wavelength division multiplexed optical outputs 4302a-e, wherein i=1 to n.

The optical device 4300 further comprises: k number of additional wavelength division multiplexed optical inputs 4301f-h, numbered 1 to k, k number of additional wavelength division multiplexed optical outputs 4302f-h, numbered 1 to k, and a second wavelength directing function 4310b, wherein the second wavelength directing function 4310b is operable to direct wavelengths from any given input j of the k number of additional wavelength division multiplexed optical inputs 4301f-h to only outputs 1 to j of the k number of additional wavelength division multiplexed optical outputs 4302f-h, wherein j=1 to k. For the optical device 4300, k may equal n in first embodiment. For the optical device 4300, k may not equal n in a second embodiment. Therefore, the number of inputs and outputs within each of the m wavelength directing function within 4300 may be different from one another.

It should be noted that the individual wavelength switches used within the various wavelength equalizing arrays (such as switches 513a, 514a, and 3326a shown in 3600 of FIG. 36), may be implemented with ring resonators within a photonic integrated chip (PIC). Alternatively, free space optics may be used to create the individual wavelength switches.

In the foregoing description, the invention is described with reference to specific example embodiments thereof. It will, however, be evident that various modifications and changes may be made thereto without departing from the broader spirit and scope of the present invention. The specification and drawings are accordingly to be regarded in an illustrative rather than restrictive sense.

What is claimed is:
1. An optical device comprising:
   a first optical input port;
   a second optical input port;
   a first optical output port;
   a second optical output port;
   a first wavelength equalizer, operable to pass and block individual wavelengths from the first optical input port to the first optical output port;
   a second wavelength equalizer;
   an optical coupler, used to combine wavelengths from the first wavelength equalizer and the second wavelength equalizer; and
   one or more broadband optical switches residing external to the first wavelength equalizer and the second wavelength equalizer, and operable to be set to a first state and to a second state, wherein when the one or more broadband optical switches are set to the first state, the second wavelength equalizer is operable to pass and block individual wavelengths from the second optical input port to the second optical output port, and the second wavelength equalizer is not operable to pass and block individual wavelengths from the second optical input port to the first optical output port, and wherein when the one or more broadband optical switches are set to the second state, the second wavelength equalizer is operable to pass and block individual wavelengths from the second optical input port to the first optical output port, and the second wavelength equalizer is not operable to pass and block individual wavelengths from the second optical input port to the second optical output port.

2. The optical device of claim 1, wherein the first wavelength equalizer is not operable to pass and block individual wavelengths from the first optical input port to the second optical output port.

3. The optical device of claim 1, wherein the one or more broadband optical switches comprises:
   a first broadband optical switch type, wherein the first broadband optical switch type comprises at least one optical output and a first optical input and at least a second optical input, and operable to direct a first inputted wavelength division multiplexed (WDM) signal from the first optical input to the at least one optical output when set to the first state, and operable to direct a second inputted WDM signal from the at least a second optical input to the at least one optical output when set to the second state; and
   a second broadband optical switch type, wherein the second broadband optical switch type comprises at least one optical input and a first optical output and at least a second optical output, and operable to direct an inputted WDM signal from the at least one optical input to the first optical output when set to the first state, and operable to direct the inputted WDM signal from the at least one optical input to the at least a second optical output when set to the second state.

4. The optical device of claim 1, wherein the first wavelength equalizer has only one optical input and only one optical output, and wherein the second wavelength equalizer has only one optical input and only one optical output.

5. The optical device of claim 1, wherein the first wavelength equalizer and the second wavelength equalizer each comprises:
   a single optical input;
   a wavelength de-multiplexer connected to the single optical input;
   a plurality of variable optical attenuators connected to the wavelength de-multiplexer;
   a wavelength multiplexer connected to the plurality of variable optical attenuators; and
   a single optical output connected to the wavelength multiplexer.

6. The optical device of claim 1, wherein when the one or more broadband optical switches are set to the second state, the optical coupler is used to combine wavelengths from the first wavelength equalizer and the second wavelength equalizer, and wherein when the one or more broadband optical switches are set to the first state, the optical coupler is not used to combine wavelengths from the first wavelength equalizer and the second wavelength equalizer.

7. The optical device of claim 1, wherein the one or more broadband optical switches comprises:
  a first broadband optical switch having a first broadband optical switch input and a first broadband optical switch 1st output and a first broadband optical switch 2nd output;
  a second broadband optical switch having a second broadband optical switch input and a second broadband optical switch 1st output and a second broadband optical switch 2nd output; and
  a third broadband optical switch having a third broadband optical switch output and a third broadband optical switch 1st input and a third broadband optical switch 2nd input,
  wherein the optical coupler includes a first coupler input, a second coupler input, and a coupler output, and wherein the first wavelength equalizer has a first wavelength equalizer input and a first wavelength equalizer output, and wherein the second wavelength equalizer has a second wavelength equalizer input and a second wavelength equalizer output, and wherein the first optical input port is connected to the first wavelength equalizer input, and wherein the second optical input port is connected to the second wavelength equalizer input, and wherein the first wavelength equalizer output is connected to the first broadband optical switch input, and wherein the second wavelength equalizer output is connected to the second broadband optical switch input, and wherein the first broadband optical switch 1st output is connected to the third broadband optical switch 1st input, and wherein the first broadband optical switch 2nd output is connected to the first coupler input, and wherein the second broadband optical switch 1st output is connected to the second coupler input, and wherein the second broadband optical switch 2nd output is connected to the second optical output port, and wherein the coupler output is connected to the third broadband optical switch 2nd input, and wherein the third broadband optical switch output is connected to the first optical output port.

8. The optical device of claim 7, wherein the first wavelength equalizer is operable to emit a first wavelength division multiplexed signal, and wherein the second wavelength equalizer is operable to emit a second wavelength division multiplexed signal, and wherein the optical coupler is operable to emit a third wavelength division multiplexed signal, wherein when the one or more broadband optical switches are set to the first state, the first wavelength division multiplexed signal is switched by the first broadband optical switch and by the third broadband optical switch to the first optical output port, and the second wavelength division multiplexed signal is switched by the second broadband optical switch to the second optical output port, and wherein when the one or more broadband optical switches are set to the second state, the first wavelength division multiplexed signal is switched by the first broadband optical switch to the first coupler input, and the second wavelength division multiplexed signal is switched by the second broadband optical switch to the second coupler input, and the third wavelength division multiplexed signal is switched by the third broadband optical switch to the first optical output port.

9. The optical device of claim 1, wherein the one or more broadband optical switches comprises:
  a first broadband optical switch having one optical input and two optical outputs;
  a second broadband optical switch having one optical input and two optical outputs; and
  a third broadband optical switch having two optical inputs and one optical output,
  wherein the first broadband optical switch is used to switch a wavelength division multiplexed (WDM) signal from the first wavelength equalizer to the optical coupler and to the third broadband optical switch, and wherein the second broadband optical switch is used to switch a WDM signal from the second wavelength equalizer to the optical coupler and to the second optical output port, and wherein the third broadband optical switch is used to switch a WDM signal from the first broadband optical switch to the first optical output port, and wherein the third broadband optical switch is used to switch a WDM signal from the optical coupler to the first optical output port.

10. The optical device of claim 1, wherein the optical coupler is a variable optical coupler.

11. The optical device of claim 1, wherein the optical coupler is a variable optical coupler having a first coupler input, a second coupler input, and a coupler output, and wherein the one or more broadband optical switches comprises a single broadband optical switch having a switch input and a first switch output and a second switch output, and wherein the first wavelength equalizer has a first wavelength equalizer input and a first wavelength equalizer output, and wherein the second wavelength equalizer has a second wavelength equalizer input and a second wavelength equalizer output, and wherein the first optical input port is connected to the first wavelength equalizer input, and wherein the second optical input port is connected to the second wavelength equalizer input, and wherein the second wavelength equalizer output is connected to the switch input, and wherein the first switch output is connected to the second optical output port, and wherein the second switch output is connected to the first coupler input, and wherein the first wavelength equalizer output is connected to the second coupler input, and wherein the coupler output is connected to the first optical output port.

12. An optical device comprising:
  a first optical input port, used to input a first wavelength division multiplexed (WDM) optical signal;
  a second optical input port, used to input a second WDM optical signal;
  a first optical output port;
  a second optical output port;
  a first WDM de-multiplexer function, used to de-multiplex the first WDM optical signal into individual wavelengths;
  a second WDM de-multiplexer function, used to de-multiplex the second WDM optical signal into individual wavelengths;
  a variable optical attenuator function, used to attenuate individual wavelengths within the first WDM optical signal and within the second WDM optical signal;
  a first WDM multiplexer function, used to multiplex individual wavelengths for the first optical output port;

a second WDM multiplexer function, used to multiplex individual wavelengths for the second optical output port;
a first optical wavelength switching function; and
a second optical wavelength switching function,
wherein the first optical wavelength switching function is used to switch individual wavelengths from the first WDM de-multiplexer function to the first WDM multiplexer function, and wherein the first optical wavelength switching function is used to switch individual wavelengths from the first WDM de-multiplexer function to the second optical wavelength switching function, and wherein the second optical wavelength switching function is used to switch individual wavelengths from the first optical wavelength switching function to the second WDM multiplexer function, and wherein the second optical wavelength switching function is used to switch individual wavelengths from the second WDM de-multiplexer function to the second WDM multiplexer function.

13. The optical device of claim 12, wherein the variable optical attenuator function comprises a plurality of variable optical attenuators.

14. An optical device comprising:
a first optical input port, used to input a first wavelength division multiplexed (WDM) optical signal;
a second optical input port, used to input a second WDM optical signal;
a first optical output port;
a second optical output port;
a first WDM de-multiplexer function, used to de-multiplex the first WDM optical signal into individual wavelengths;
a second WDM de-multiplexer function, used to de-multiplex the second WDM optical signal into individual wavelengths;
a first WDM multiplexer function, used to multiplex individual wavelengths for the first optical output port;
a second WDM multiplexer function, used to multiplex individual wavelengths for the second optical output port;
a first optical wavelength switching function; and
a second optical wavelength switching function,
wherein the first optical wavelength switching function is used to switch individual wavelengths from the first WDM de-multiplexer function to the first WDM multiplexer function, and wherein the first optical wavelength switching function is used to switch individual wavelengths from the first WDM de-multiplexer function to the second optical wavelength switching function, and wherein the second optical wavelength switching function is used to switch individual wavelengths from the first optical wavelength switching function to the second WDM multiplexer function, and wherein the second optical wavelength switching function is used to switch individual wavelengths from the second WDM de-multiplexer function to the second WDM multiplexer function, and wherein the first optical wavelength switching function is comprised of a first plurality of optical switches having one optical input and two optical outputs, and wherein the second optical wavelength switching function is comprised of a second plurality of optical switches having two optical inputs and one optical output.

15. An optical device comprising:
a first optical input port, used to input a first wavelength division multiplexed (WDM) optical signal;
a second optical input port, used to input a second WDM optical signal;
a first optical output port;
a second optical output port;
a third optical input port, used to input a third WDM optical signal;
a third optical output port;
a first WDM de-multiplexer function, used to de-multiplex the first WDM optical signal into individual wavelengths;
a second WDM de-multiplexer function, used to de-multiplex the second WDM optical signal into individual wavelengths;
a third WDM de-multiplexer function, used to de-multiplex the third WDM optical signal into individual wavelengths;
a first WDM multiplexer function, used to multiplex individual wavelengths for the first optical output port;
a second WDM multiplexer function, used to multiplex individual wavelengths for the second optical output port;
a third WDM multiplexer function, used to multiplex individual wavelengths for the third optical output port;
a first optical wavelength switching function;
a second optical wavelength switching function; and
a third optical wavelength switching function,
wherein the first optical wavelength switching function is used to switch individual wavelengths from the first WDM de-multiplexer function to the first WDM multiplexer function, and wherein the first optical wavelength switching function is used to switch individual wavelengths from the first WDM de-multiplexer function to the second optical wavelength switching function, and wherein the second optical wavelength switching function is used to switch individual wavelengths from the first optical wavelength switching function to the second WDM multiplexer function, and wherein the second optical wavelength switching function is used to switch individual wavelengths from the second WDM de-multiplexer function to the second WDM multiplexer function, and wherein the second optical wavelength switching function is used to switch individual wavelengths from the first optical wavelength switching function to the third optical wavelength switching function, and wherein the second optical wavelength switching function is used to switch individual wavelengths from the second WDM de-multiplexer function to the third optical wavelength switching function, and wherein the third optical wavelength switching function is used to switch individual wavelengths from the second optical wavelength switching function to the third WDM multiplexer function, and wherein the third optical wavelength switching function is used to switch individual wavelengths from the third WDM de-multiplexer function to the third WDM multiplexer function.

16. The optical device of claim 15, wherein the first optical wavelength switching function is comprised of a first plurality of optical switches having one optical input and two optical outputs, and wherein the second optical wavelength switching function is comprised of a second plurality of optical switches having two optical inputs and two optical outputs, and wherein the third optical wavelength switching function is comprised of a third plurality of optical switches having two optical inputs and one optical output.

17. An optical device comprising:
- a first optical input port, used to input a first wavelength division multiplexed (WDM) optical signal;
- a second optical input port, used to input a second WDM optical signal;
- a first optical output port;
- a second optical output port;
- a first WDM de-multiplexer function, used to de-multiplex the first WDM optical signal into individual wavelengths;
- a second WDM de-multiplexer function, used to de-multiplex the second WDM optical signal into individual wavelengths;
- a third WDM de-multiplexer function, used to de-multiplex the second WDM optical signal into individual wavelengths;
- a waveguide switch, used to switch all wavelengths of the second WDM optical signal to the second WDM de-multiplexer function, and used to switch all wavelengths of the second WDM optical signal to the third WDM de-multiplexer function;
- a first WDM multiplexer function, used to multiplex individual wavelengths for the first optical output port;
- a second WDM multiplexer function, used to multiplex individual wavelengths for the second optical output port; and
- an optical wavelength switching function,
- wherein the optical wavelength switching function is used to switch individual wavelengths from the first WDM de-multiplexer function to the first WDM multiplexer function, and wherein the optical wavelength switching function is used to switch individual wavelengths from the second WDM de-multiplexer function to the first WDM multiplexer function, and wherein the individual wavelengths from the third WDM de-multiplexer function are directed to the second WDM multiplexer function.

18. The optical device of claim 17, wherein the optical wavelength switching function is comprised of a plurality of optical switches having two optical inputs and one optical output.

19. The optical device of claim 17, wherein the waveguide switch comprises:
- an optical input;
- a first optical output;
- a second optical output;
- a first optical state; and
- a second optical state,
- wherein when set to the first optical state, all wavelengths of the second WDM optical signal are directed to the first optical output, and no wavelengths of the second WDM optical signal are directed to the second optical output, and wherein when set to the second optical state, all wavelengths of the second WDM optical signal are directed to the second optical output, and no wavelengths of the second WDM optical signal are directed to the first optical output.

20. The optical device of claim 17, further comprising a variable optical attenuator function, used to attenuate individual wavelengths within the first WDM optical signal and within the second WDM optical signal.

21. The optical device of claim 20, wherein the variable optical attenuator function comprises a plurality of variable optical attenuators.

22. The optical device of claim 20, wherein the variable optical attenuator function comprises:
- a first plurality of variable optical attenuators, residing between the optical wavelength switching function and the first WDM multiplexer function; and
- a second plurality of variable optical attenuators, residing between the third WDM de-multiplexer function and the second WDM multiplexer function.

* * * * *